United States Patent
Chelminski

(10) Patent No.: US 9,804,280 B2
(45) Date of Patent: Oct. 31, 2017

(54) METHOD AND APPARATUS FOR TUNING THE RISE TIME OF THE INITIAL PULSE OF AN AIR GUN

(71) Applicant: Stephen Chelminski, Antrim, NH (US)

(72) Inventor: Stephen Chelminski, Antrim, NH (US)

(*) Notice: Subject to any disclaimer, the term of this patent is extended or adjusted under 35 U.S.C. 154(b) by 0 days.

(21) Appl. No.: 15/047,473

(22) Filed: Feb. 18, 2016

(65) Prior Publication Data

US 2017/0108599 A1 Apr. 20, 2017

Related U.S. Application Data

(60) Provisional application No. 62/243,034, filed on Oct. 17, 2015.

(51) Int. Cl.
| | |
|---|---|
| G01V 1/37 | (2006.01) |
| G01V 1/38 | (2006.01) |
| G01V 13/00 | (2006.01) |
| G01V 1/137 | (2006.01) |

(52) U.S. Cl.
CPC .............. *G01V 1/137* (2013.01); *G01V 1/38* (2013.01); *G01V 13/00* (2013.01)

(58) Field of Classification Search
CPC ........... G01V 1/137; G01V 1/38; G01V 13/00
See application file for complete search history.

(56) References Cited

U.S. PATENT DOCUMENTS

| | | |
|---|---|---|
| 3,249,177 A | 5/1966 | Chelminski |
| 3,310,128 A | 3/1967 | Chelminski |
| 3,376,723 A | 4/1968 | Chelminski |
| 3,379,273 A | 4/1968 | Chelminski |
| 3,397,775 A | 8/1968 | Seifer et al. |
| 3,506,085 A | 4/1970 | Loper |
| 3,548,630 A | 12/1970 | Chelminski |
| 3,613,824 A | 10/1971 | Loper |
| 3,653,460 A | 4/1972 | Chelminski |
| 3,707,848 A | 1/1973 | Chelminski |
| 3,793,844 A | 2/1974 | Chelminski |
| 3,808,822 A | 5/1974 | Chelminski |
| 3,808,823 A | 5/1974 | Chelminski |
| 3,997,021 A | 12/1976 | Chelminski |

(Continued)

FOREIGN PATENT DOCUMENTS

WO 2015069813 5/2015

OTHER PUBLICATIONS

International Search Report from corresponding International Application PCT/US2016/057072.

(Continued)

*Primary Examiner* — Daniel Pihulic
(74) *Attorney, Agent, or Firm* — Z IP Law PLLC

(57) ABSTRACT

An air gun intended for use in generating seismic energy impulses, i.e. acoustical waves, in a body of water that provides improved performance by adjusting the length of the firing chamber in order to tune the rise time from zero pressure to peak pressure and to increase or decrease the slope of the initial pulse. By selecting the length of the firing chamber, the rise time of the initial pulse is tuned to increase low frequencies and reduce objectionable high frequencies to help in mitigating damage to marine life and the marine environment and to provide greater penetration of the seismic signal through for example basalt and sub-basalt structures.

46 Claims, 42 Drawing Sheets

(56) References Cited

U.S. PATENT DOCUMENTS

| | | | |
|---|---|---|---|
| 4,038,630 A | 7/1977 | Chelminski | |
| 4,240,518 A | 12/1980 | Chelminski | |
| 4,271,924 A | 6/1981 | Chelminski | |
| 4,472,794 A | 9/1984 | Chelminski | |
| 4,597,464 A | 7/1986 | Chelminski | |
| 4,599,712 A | 7/1986 | Chelminski | |
| 4,608,675 A | 8/1986 | Chelminski | |
| 4,712,202 A | 12/1987 | Chelminski | |
| 4,712,641 A | 12/1987 | Chelminski | |
| 4,713,800 A | 12/1987 | Russell | |
| 4,723,230 A | 2/1988 | Chelminski | |
| 4,739,859 A | 4/1988 | Delano | |
| 4,754,443 A | 6/1988 | Chelminski | |
| 4,757,482 A | 7/1988 | Fiske, Jr. | |
| 4,779,245 A * | 10/1988 | Chelminski | G01V 1/137 367/144 |
| 4,798,261 A | 1/1989 | Chelminski | |
| 4,858,718 A | 8/1989 | Chelminski | |
| 4,939,704 A | 7/1990 | Chelminski | |
| 5,315,917 A | 5/1994 | Mayzes | |
| 5,331,607 A | 7/1994 | Roessler | |
| 5,432,757 A | 7/1995 | Chelminski | |
| 5,836,393 A * | 11/1998 | Johnson | E21B 28/00 166/177.5 |
| 5,978,316 A | 11/1999 | Ambs et al. | |
| 6,464,035 B1 | 10/2002 | Chelminski | |
| 7,139,219 B2 * | 11/2006 | Kolle | E21B 47/14 367/85 |
| 7,269,099 B2 | 9/2007 | Jensen | |
| 7,321,527 B2 | 1/2008 | Hopperstad | |
| 7,414,920 B2 | 8/2008 | Guuion et al. | |
| 7,434,988 B1 | 10/2008 | Kychakoff et al. | |
| 7,457,193 B2 | 11/2008 | Pramik | |
| 8,223,591 B2 | 7/2012 | Chelminski | |
| 8,279,711 B2 | 10/2012 | Nance et al. | |
| 8,971,152 B2 * | 3/2015 | Chelminski | G01V 1/137 367/144 |
| 9,612,349 B2 | 4/2017 | Larsen et al. | |
| 2005/0178558 A1 * | 8/2005 | Kolle | E21B 47/14 166/373 |
| 2006/0050614 A1 | 3/2006 | Hopperstad | |
| 2010/0302902 A1 | 12/2010 | Nance et al. | |
| 2011/0267922 A1 * | 11/2011 | Shampine | E21B 47/0005 367/25 |
| 2014/0238772 A1 * | 8/2014 | Chelminski | G01V 1/38 181/119 |
| 2015/0129349 A1 * | 5/2015 | Chelminski | G01V 1/137 181/119 |
| 2017/0108599 A1 * | 4/2017 | Chelminski | G01V 1/137 |

OTHER PUBLICATIONS

Written Opinion dated Jan. 17, 2017 from corresponding International Application PCT/US2016/057072.

International Search Report dated May 26, 2014 from corresponding International Application PCT/US2014/017875.

International Preliminary Report on Patentability with Written Opinion from corresponding International Application PCT/US2014/017875.

* cited by examiner

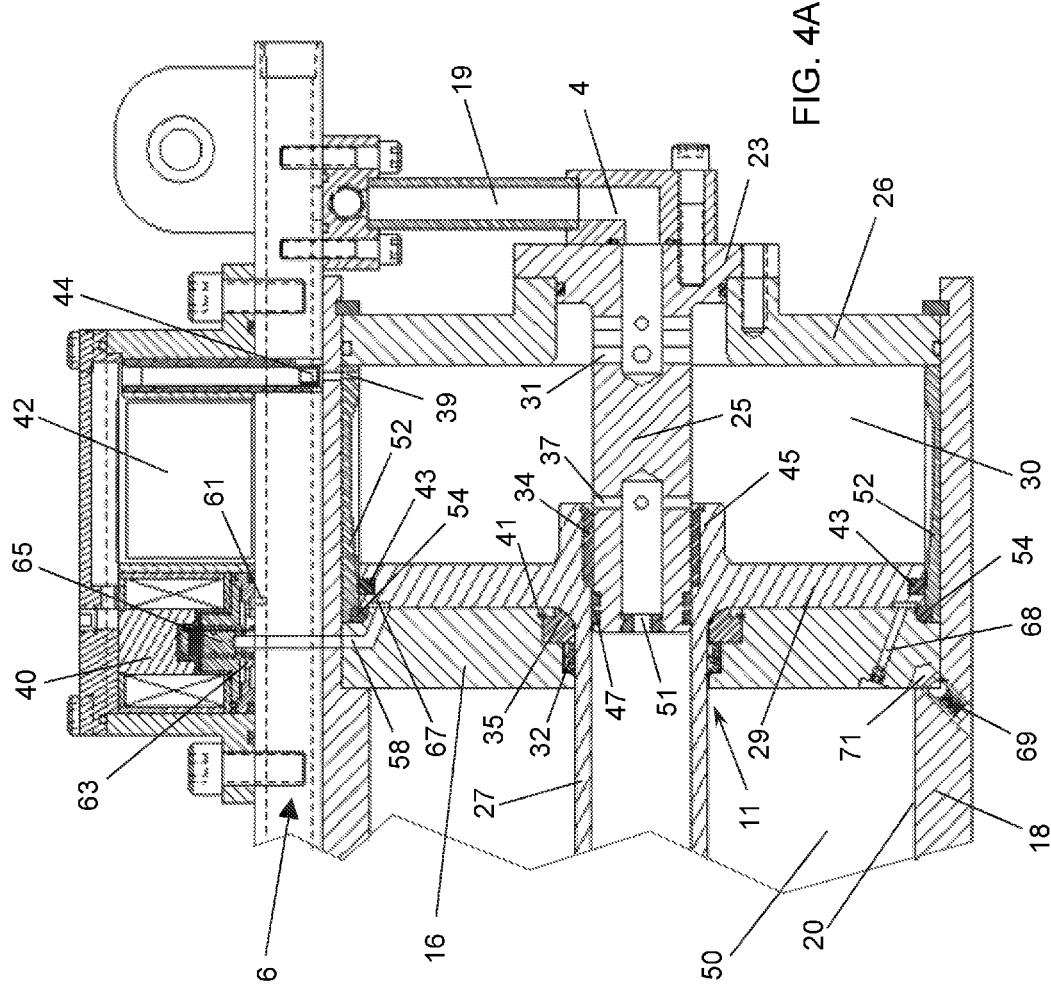

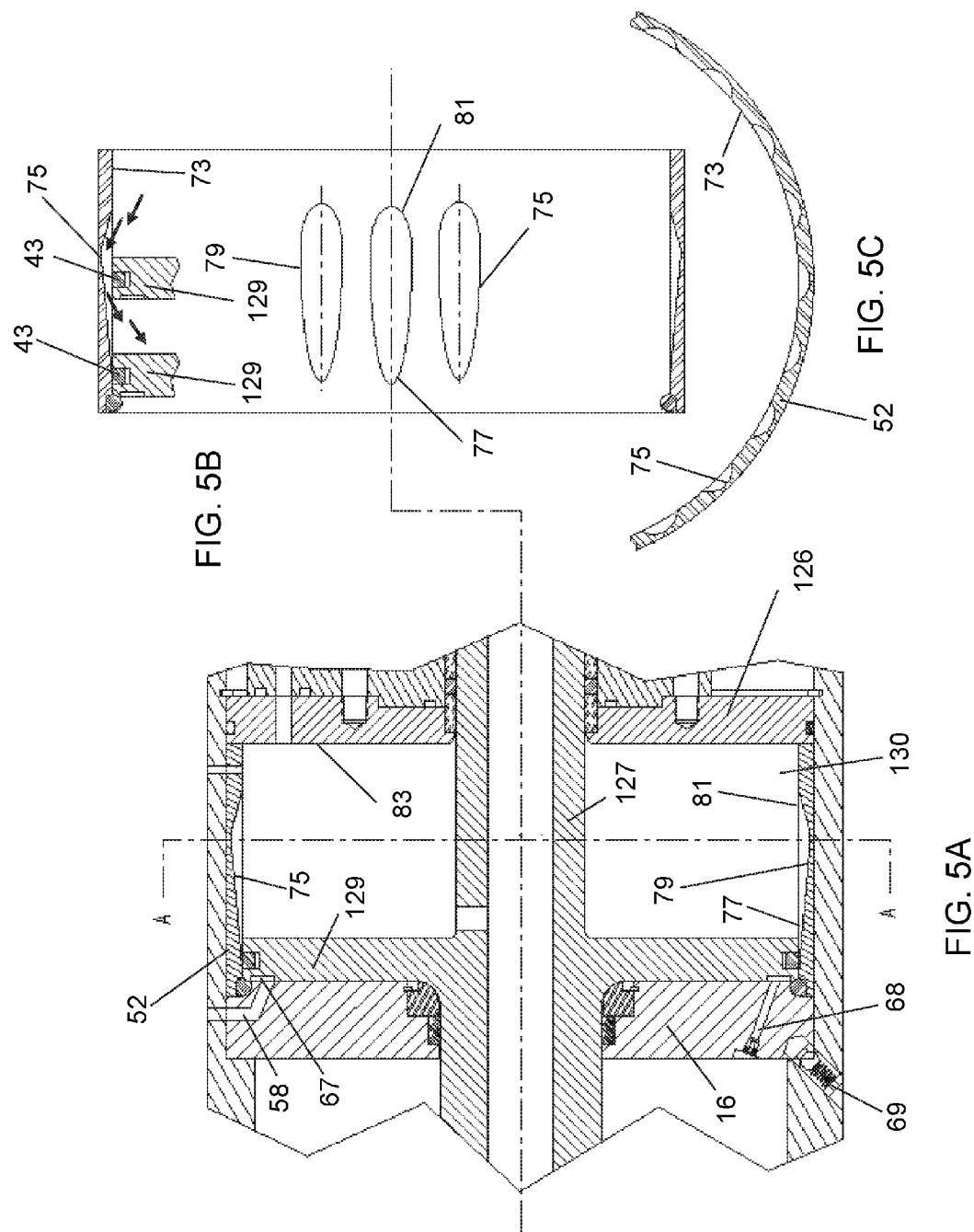

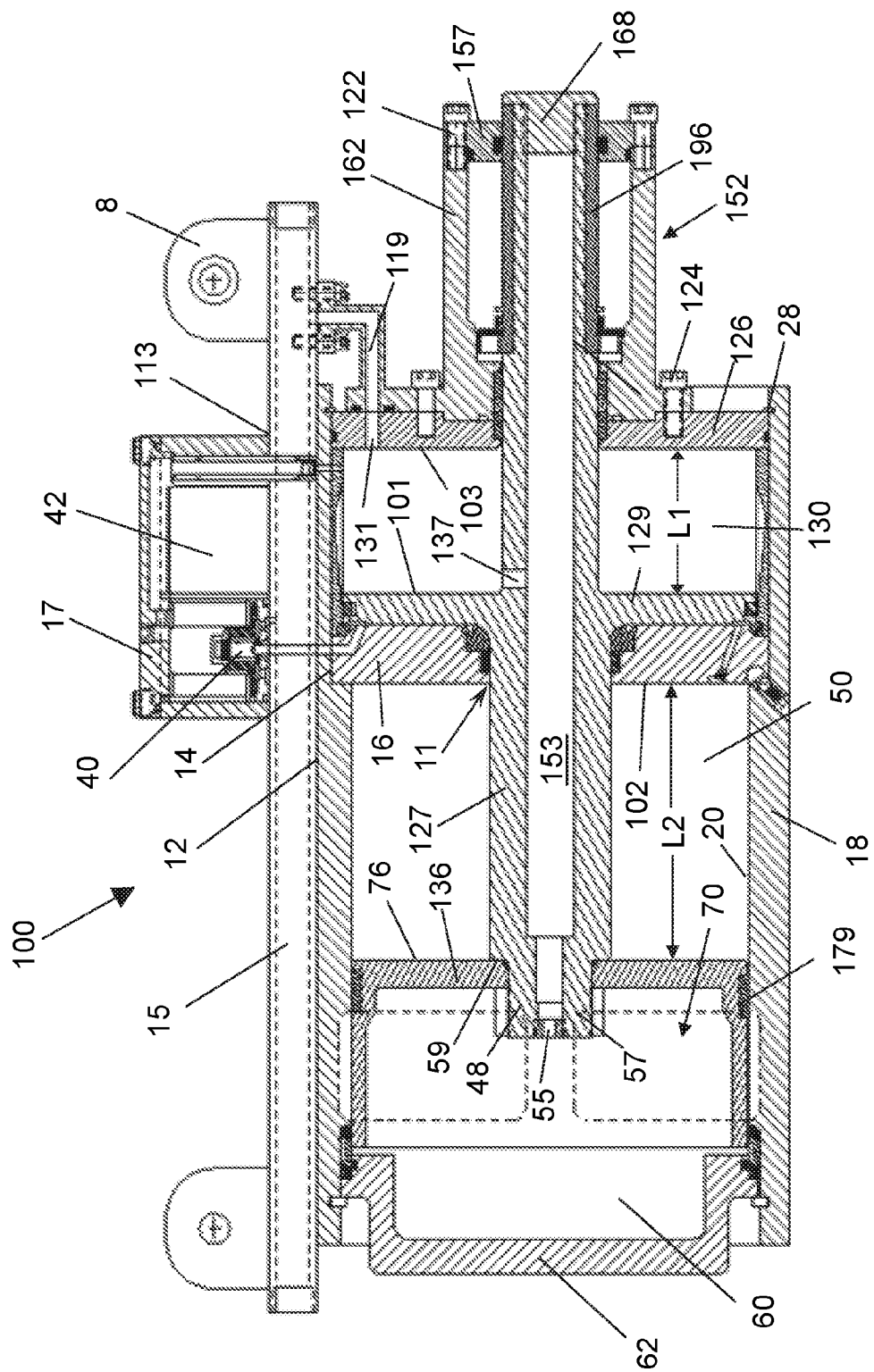

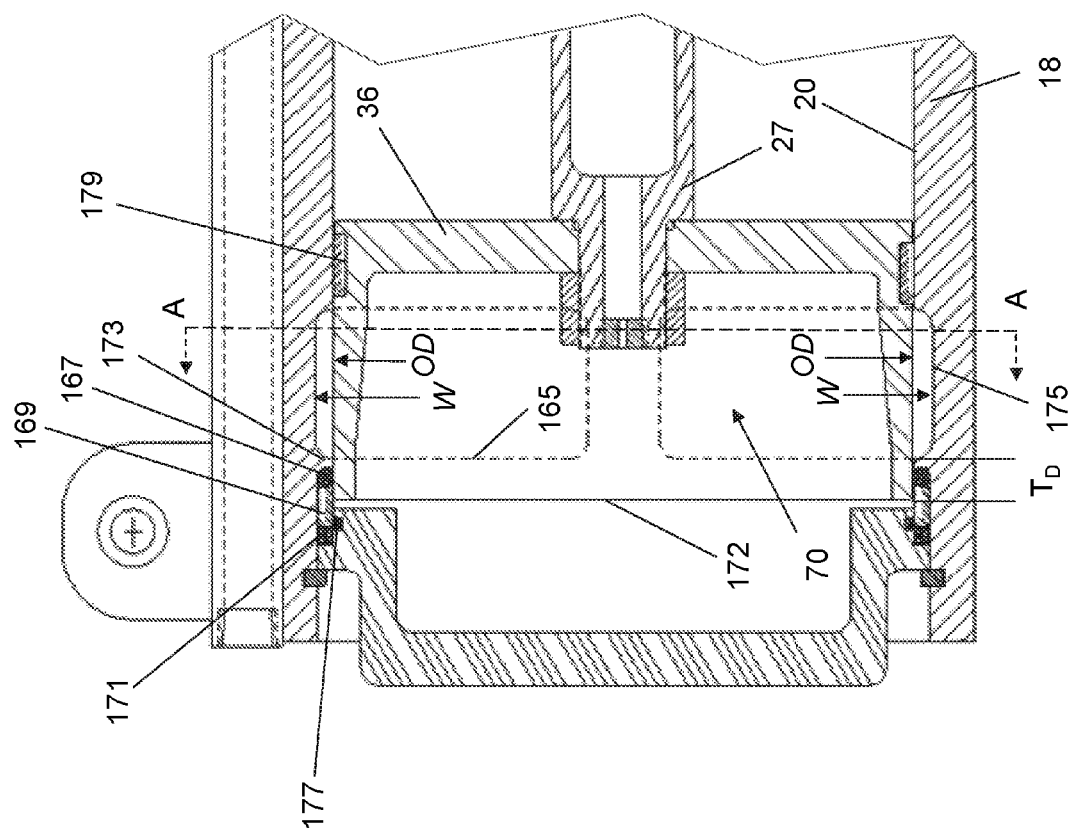

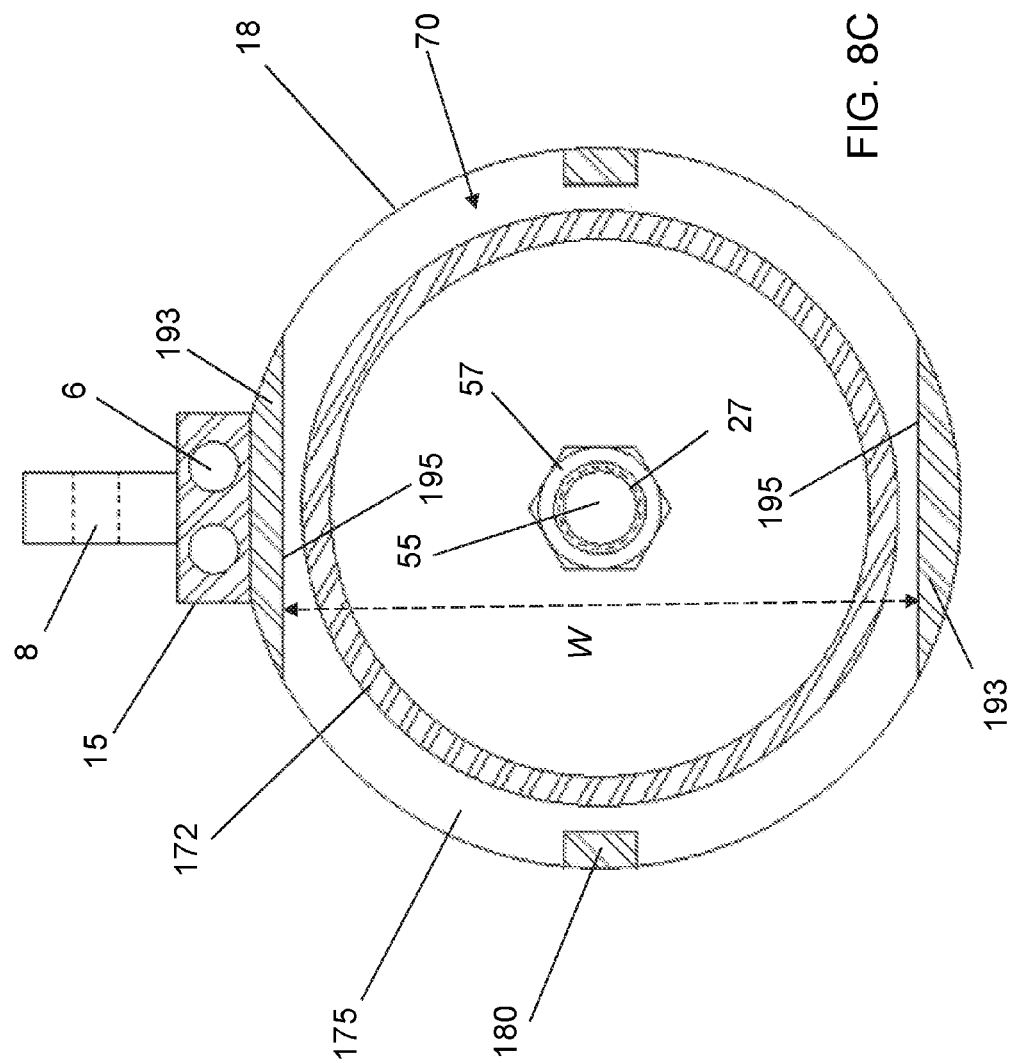

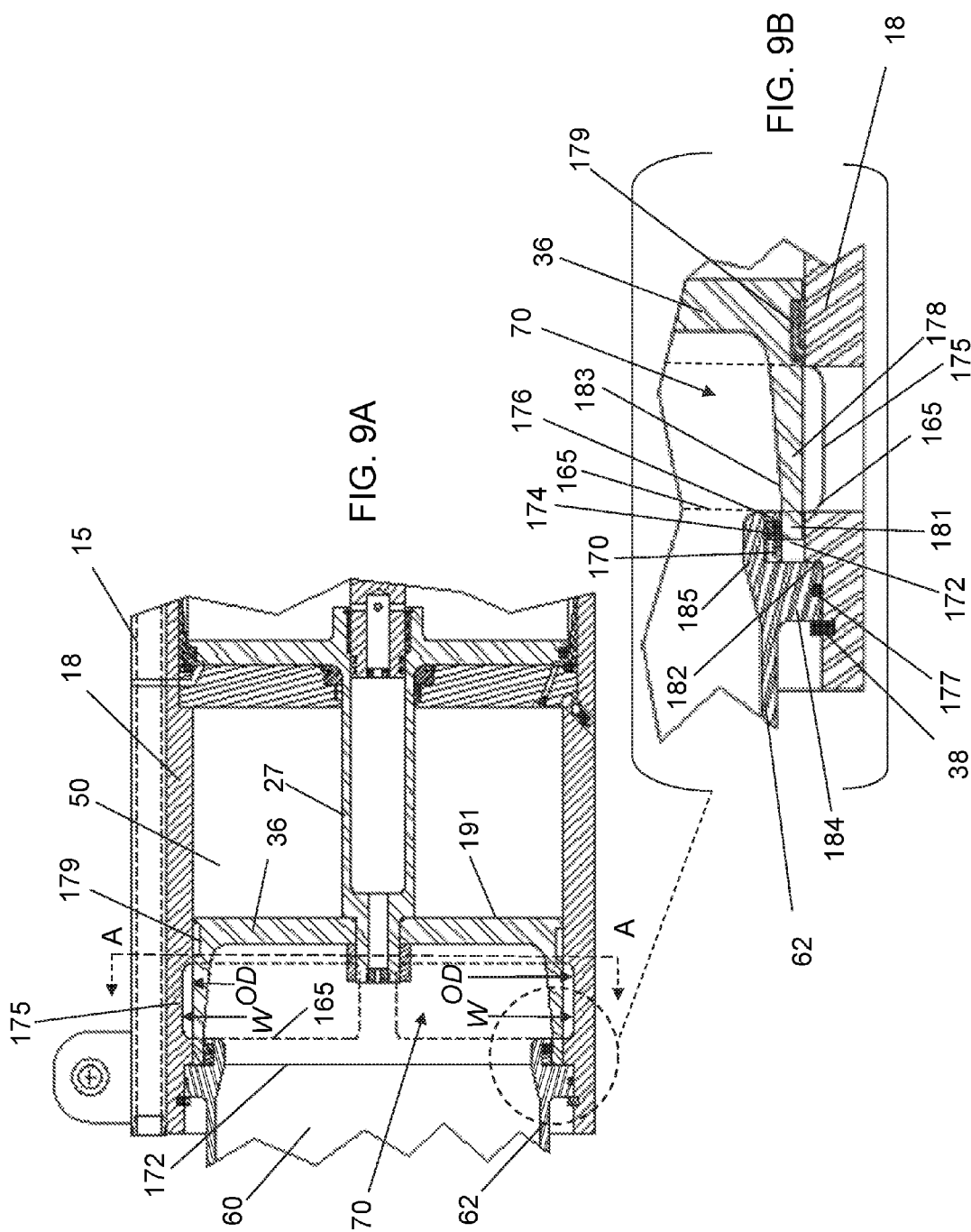

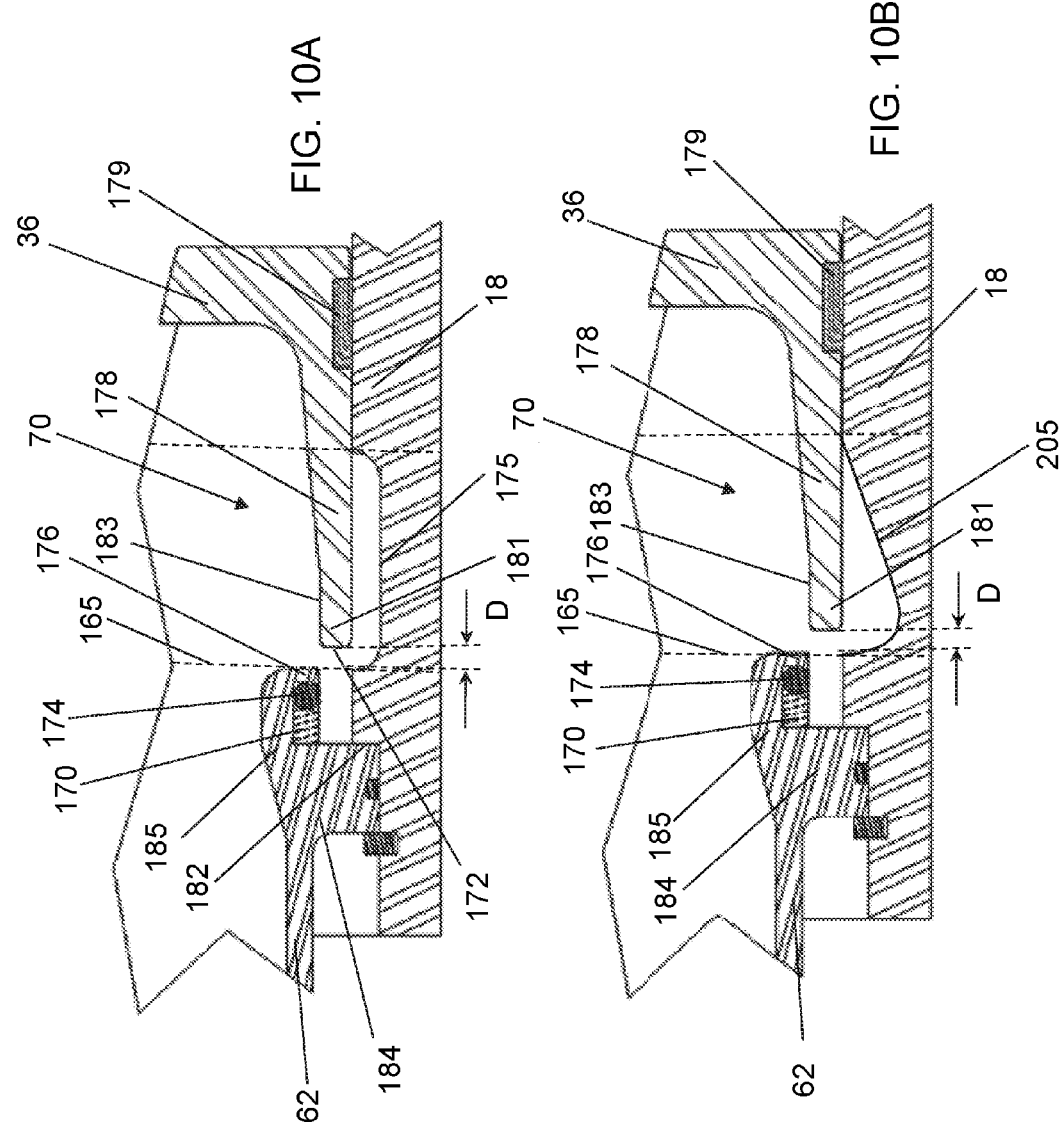

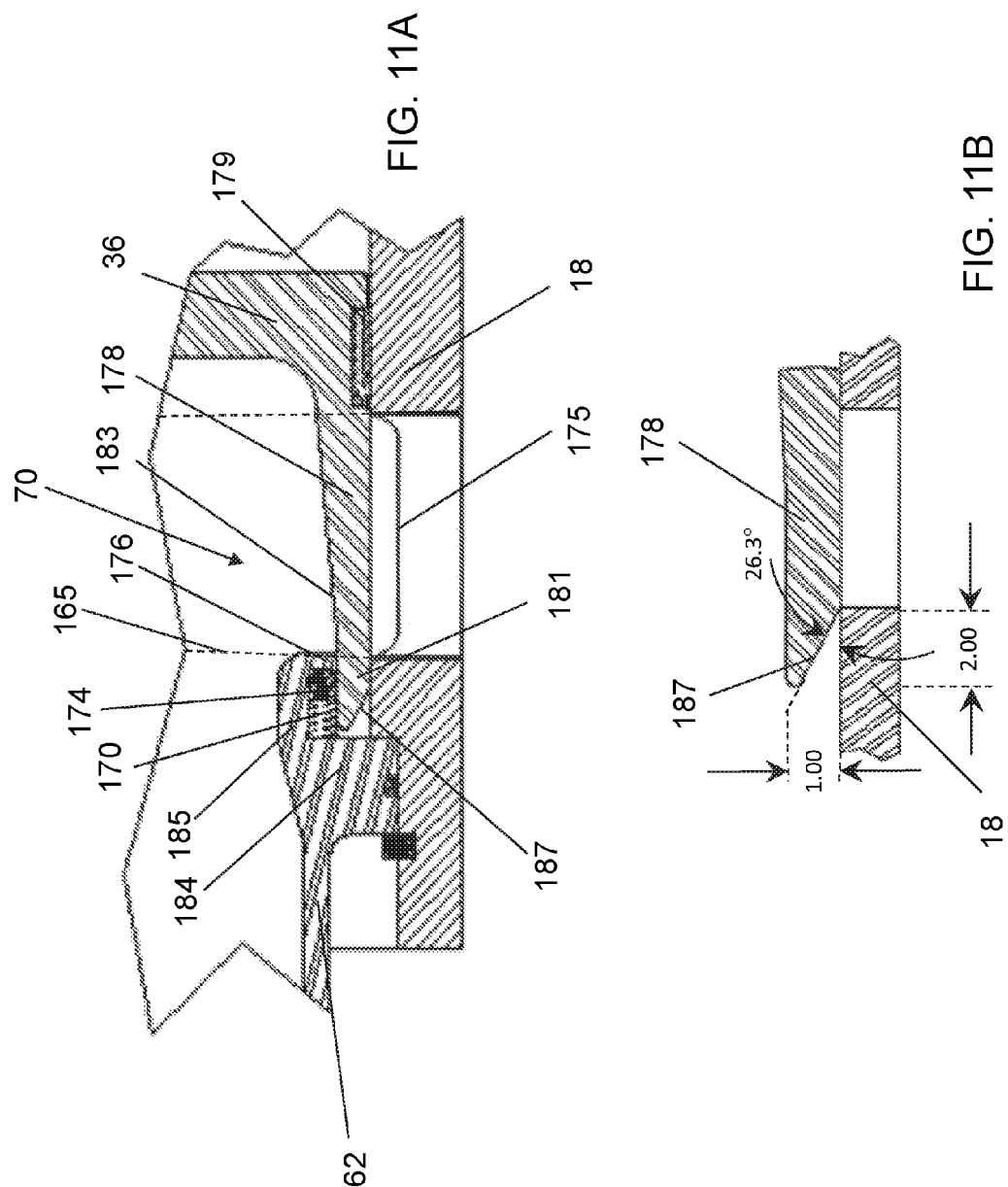

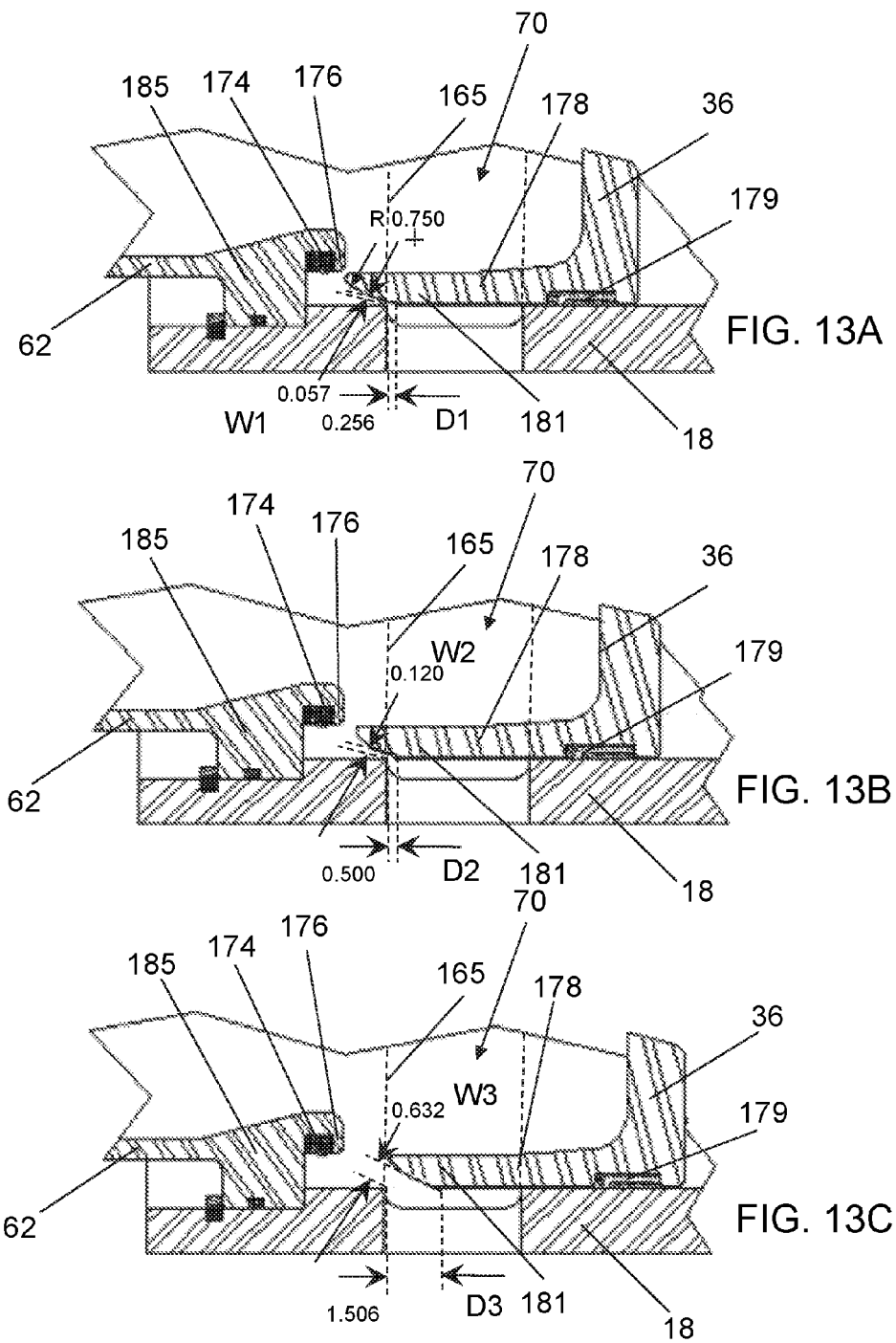

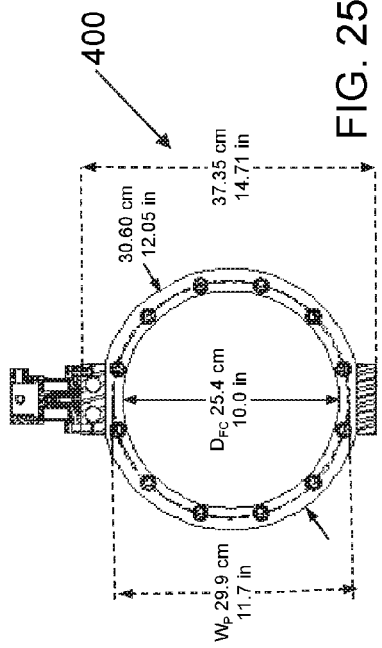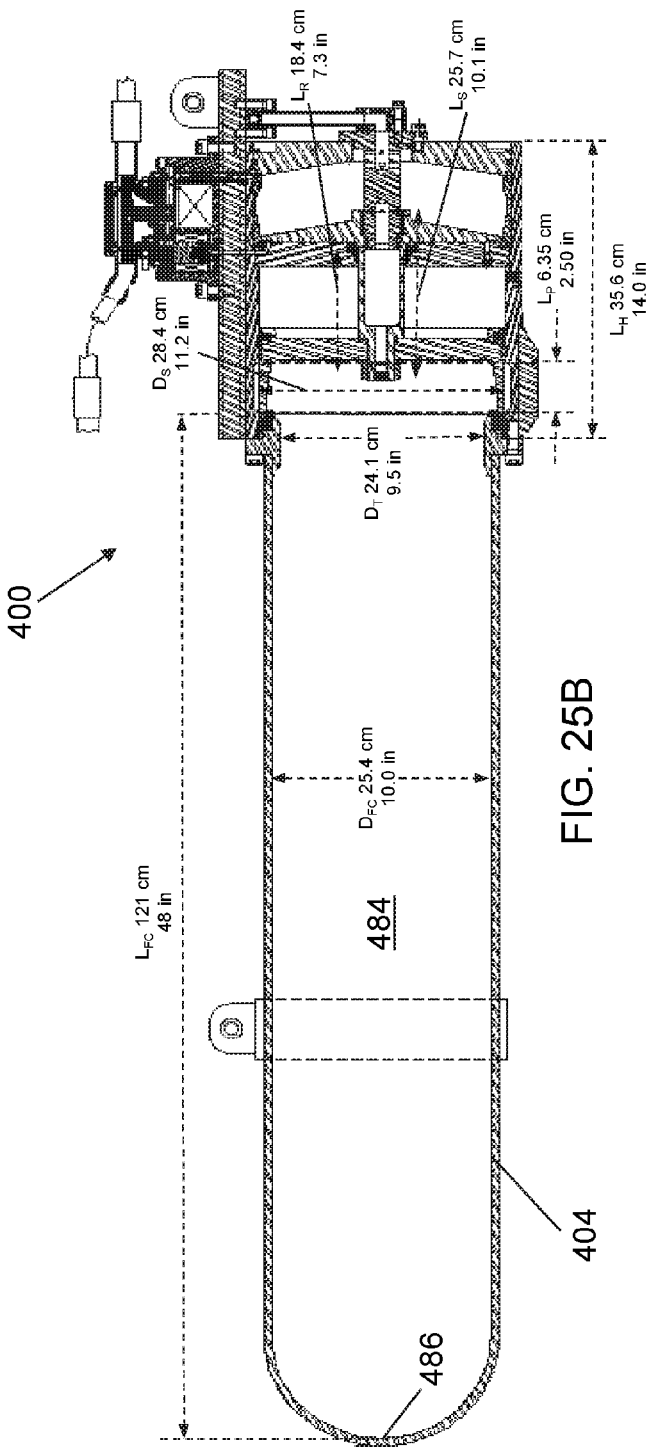
FIG. 25A
FIG. 25B

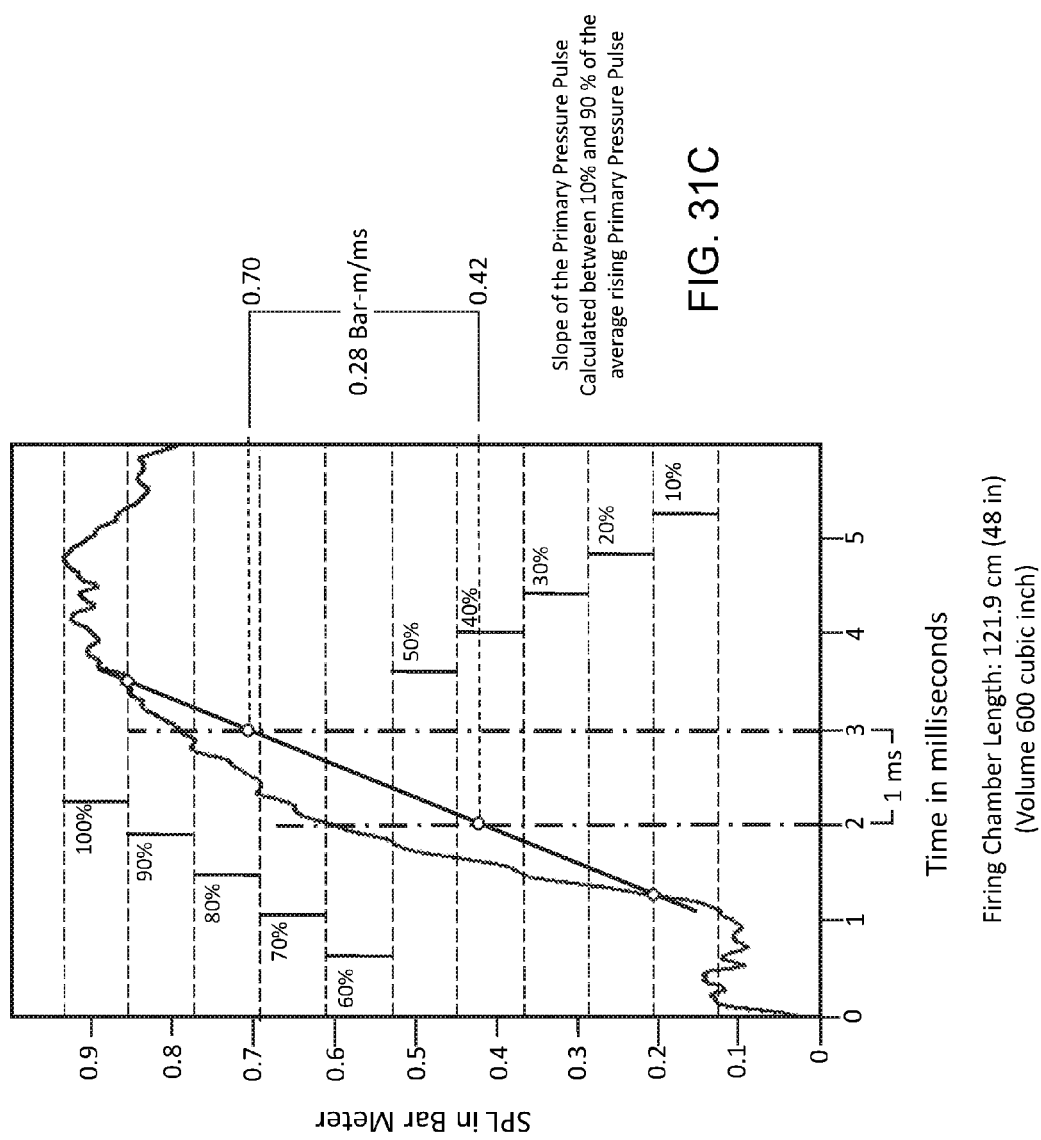

METHOD AND APPARATUS FOR TUNING THE RISE TIME OF THE INITIAL PULSE OF AN AIR GUN

RELATED PATENT APPLICATION

This application claims the benefit of U.S. Provisional Patent Application No. 62/243,034 filed Oct. 17, 2015 entitled METHOD AND APPARATUS FOR TUNING THE INITIAL RISE TIME OF AN AIR GUN PULSE which is hereby incorporated herein by reference in the entirety.

FIELD OF THE INVENTION

The present invention relates to air guns intended for use in generating seismic energy impulses for marine seismic exploration and more specifically to improving the performance of an air gun by adjusting the internal length of the firing chamber in order to tune the rise time from zero pressure to peak pressure and to increase or decrease the slope of the initial pulse. By selecting a specific length of the firing chamber, the rise time may be tuned to increase low frequencies and reduce objectionable high frequencies to help in mitigating damage to marine life and the marine environment and to provide greater penetration of the seismic signal through for example basalt and sub-basalt structures.

BACKGROUND OF THE INVENTION

Air guns, as used herein, are sound sources for marine seismic exploration. The operating components of air guns include a firing chamber holding a charge of gas under high pressure, a two-piston shuttle assembly having a firing piston which retains the charge of pressurized gas within the firing chamber, and an operating piston positioned within an operating chamber where the highly pressurized gas acts against the operating piston to maintain the shuttle assembly in a closed position until firing. A shuttle assembly interconnects the two pistons and provides for pressurized gas to flow from the operating chamber through the shaft of the shuttle assembly to charge the firing chamber. The air gun is triggered using a solenoid operated valve to release pressurized air into the operating chamber actuating the shuttle assembly to cause an abrupt discharge of pressurized air from the firing chamber through discharge ports and directly into the surrounding water creating an acoustic pulse.

Air guns as deep penetration sound sources, produce output frequencies generally between 10 Hz to about 1200 Hz, to identify subsurface geologic layers and define the subsurface structure. Air guns of the prior art are typically fired at compressed air pressures in the range of 2000 psi to 3000 psi. These conventional air guns produce an initial pulse or primary pressure pulse typically of about 1.5 milliseconds (ms) of rise time to reach peak pressure. This very fast rise time produces an abundance of high frequency components in the primary pressure pulse which are outside of the frequency range of interest and therefore may not be beneficial in the identification of subsurface geological structures. High frequencies may further be a source of damage to marine mammals and fish as well as disturbing the habitats and well-being of marine life. There is recently mounting pressure on the exploration industry to eliminate these undesirable high frequencies from the pulses of the air guns used in air gun arrays. The inventor hereof has additional patents such as U.S. Pat. Nos. 3,379,273, 4,038,630, 4,271,924, 4,599,712, 4,712,202, 4,779,245, 5,432,757, and 8,223,591. There are also some other inventors in the same field such as Fiske, U.S. Pat. No. 4,757,482, Mayzes, U.S. Pat. No. 5,315,917, Jensen, U.S. Pat. No. 7,269,099, Hopperstad, U.S. Pat. No. 7,321,527 and others.

OBJECTS AND SUMMARY OF THE INVENTION

The present invention tunes the initial or primary pressure pulse to a desired rise time to peak by adjusting the length of the firing chamber thereby tuning the rise time to a specific increase in time or decrease in time to reach peak pressure resulting in a change to the frequency content of the output pulse. The length of firing chamber is selected based on a length of approximately 0.343 meters per millisecond (m/ms) (1.126 feet per millisecond (ft/ms)). Embodiments of the air gun of the present invention provide an average rising slope of the primary pressure pulse of less than 0.4 bar-m/ms and more specifically in a range of 0.05 bar-m/ms to 0.30 bar-m/ms. Embodiments of the air gun of the present invention provide a port exit area that is created at a rate greater than or equal to 50 square centimeters per millisecond. Embodiments of the present invention include an inner port structure that immediately opens when the air gun is fired, therefore the air gun has zero acceleration distance thereby providing large coupling of the surface area of the compressed air from the firing chamber to water when fired. In embodiments of the present invention a continuous smooth throat of a uniform and similar diameter to the firing chamber with little or no restrictions connecting to the discharge ports is provided reducing turbulence and cavitation as the air exits the discharge ports and improving the acoustic efficiency of the air gun. Embodiments of the present invention include rectangular discharge ports of constant width along the length of the ports to reduce a source of high frequencies and improve the efficiency of the air gun. Embodiments of the present invention include a firing seal adjacent to the inner edge of the discharge ports to eliminate the acceleration distance. Embodiments of the present invention include a sealed air cushion chamber. The air cushion chamber reduces high frequencies and cavitation by eliminating the ejection of water when the air gun fires. Embodiments of the air gun of the present invention may operate at a range of pressures from 200 psi to 3000 psi and more preferably at pressures from 400 psi to 1000 psi. The lower operating pressures may remove a possible source of undesirable high frequencies. These and other features of the air gun of the present invention provide a significant improvement over air guns of the prior art particularly in simultaneously providing an exit area of the port at an exposure rate that is greater than 50 cm2/ms and a slope that is less than 0.4 bar-m/mS thereby improving low frequency content and quality of the seismic energy output pulse.

The present invention has dramatic and critically important differences over air guns of the prior art, particularly in tuning the rise time of the initial or primary pressure pulse by adjusting the length of the firing chamber. In air guns of the prior art, three different approaches to tune the rise time of the initial pulse are disclosed. The first approach changes the shape of the discharge port, the second approach changes the internal diameter of the operating chamber, and the third approach changes the diameter of the firing chamber as it approaches the port exit area. In each of these approaches the port exit area is a non-linear function of the shuttle position over the gas-release cycle. The first approach, a change to the shape of the discharge ports is described in the first issued patent for an air gun to the present inventor, Chelminski U.S. Pat. No. 3,379,273 where a vent configuration having a diverging end is disclosed in order to reduce the initial portion of the discharge flow. Chelminski discloses that various shapes and configurations of vents may be used to provide different effective rates of discharge. In a much later patent to Hopperstad, U.S. Pat. No. 7,321,527, a similar V or angular shaped port is shown that also increases in dimension as the shuttle firing piston opens in order to provide a non-linear rate of change of the port exit area as a function of the position of the shuttle flange. Hopperstad states that "to suppress the transmission of high frequencies, a slow increase in port exit area as a function of time is required." However, releasing air through an increasing port dimension causes cavitation and high frequency hissing as air from the firing chamber is forced through a small opening that then enlarges.

The second approach is a change to the internal diameter of the operating chamber using a sleeve liner as disclosed by Chelminski, U.S. Pat. No. 4,779,245. The sleeve liner as described provides an outwardly upwardly taper to increase a portion of the diameter of the operating chamber. By increasing the diameter, a corresponding progressive increase in the velocity of travel of the shuttle assembly is disclosed. Chelminski also describes a progressive decrease in diameter that dampens and decelerates the shuttle assembly. Chelminski notes that the sleeve liner can be made in any desired configuration with various sloping regions that can be short or long or inbetween as may be desired in order to modify the velocity profile of the shuttle to provide a non-linear rate of change of the port exit area as a function of the position of the shuttle flange. The third approach, an increase in the inside diameter of the firing chamber as it approaches the edge of the discharge port is disclosed by Hopperstad U.S. Pat. No. 7,321,527. The increase in diameter is between the firing chamber seal and the discharge ports thereby increasing the acceleration distance. The longer acceleration distance causes the firing piston of the shuttle assembly to accelerate while still within the cylindrical housing without the release of air except for leakage between the firing piston and the housing before the air is released through the discharge ports. The air leakage is a source of undesirable high frequency hissing when firing the air gun. Each of these approaches may not be as effective at adjusting the rise time of the initial or primary pressure pulse when compared to the air gun of the present invention as described herein. In contrast to air guns of the prior art, the present invention provides zero acceleration distance, a port area that is a linear function of the shuttle position over the gas-release cycle and the capability to tune the rise time of the initial pulse by adjusting the length of the firing chamber to a length of approximately 0.343 meters per millisecond (m/ms) (1.126 feet per millisecond (ft/ms)).

The air gun of the present invention the rate of exposing the exit area of the port is faster than the air guns of the prior art with an average rising slope that is appreciably less than that disclosed in for example Hopperstad. Hopperstad discloses having an average rising slope that is less than 2.9 bar-m/ms and more specifically in the interval of 0.5 to 1.5 bar-m/ms with exposure rates of less than 49 $cm^2$/ms. The improvements of the present invention provide a better than two times reduction in the average rising slope meaning a greater reduction in high frequencies. The measurements from the air gun of the present invention show an average rising slope of less than 0.4 bar-m/ms and more specifically in a range of 0.05 to 0.30 bar-m/ms at port exposures rates that exceed 50 $cm^2$/ms. The quality of low frequency sound pulses produced from the air gun of the present invention as shown by these measurements may improve results for example in deep penetration exploration.

The prior art also discloses selecting the parameters for an air gun based on the desired stored energy (E) of the output pulse which is determined by the operating pressure (P) and the volume (V) of the firing chamber, using the formula $E=PV$. As described by Chelminski, U.S. Pat. No. 3,379,273, "the amplitude (source level) of the repeater acoustical pulse may be varied . . . by adjusting the pressure in or volume of the charge containing chamber" which enables two characteristics of the pulse source level and frequency content to be varied independently of each other. An operating pressure of 2000 psi is most commonly used in air guns of the prior art. The selection of particular volumes of firing chambers to adjust the energy output level is well known and commonly in use where multiple air guns used within an array will have a range of different volumes of firing chambers creating different energy levels and frequency content to achieve the desired array performance. However, the selection of air gun parameters based on the length of the firing chamber for the purpose of tuning the rise time of the primary pressure pulse is not known. In the present invention, the air gun is tuned to a desired rise time of the primary pressure pulse by selecting a specific length for the firing chamber based on a length of approximately 0.343 meters per millisecond (m/ms) (1.126 feet per millisecond (ft/ms)). The rise time from zero pressure to peak pressure of the initial or primary pressure pulse may therefore be tuned to a specific increase in time or decrease in time to reach peak pressure based on the length of the firing chamber. Embodiments of the air gun of the present invention may be run at a range of operating pressures from about 200 psi to 2000 psi or more. The operating pressure of the air gun of the present invention has minimal effect on the rise time of the primary pressure pulse for a given length of the firing chamber. The present invention provides for the parameters of an air gun to not just be based on the desired energy output level, but also based on a desired rise time of the primary pressure pulse. A selected length of firing chamber will provide a desired rise time and a selected volume of firing chamber based on the diameter will provide the desired energy output level for a desired operating pressure. Through the selection of a specific length of the firing chamber, the tuning of the rise time of the primary pressure pulse may produce an increase in low frequencies and reduce objectionable or undesirable high frequencies.

Embodiments of the present invention include an integrated communications connector that is separable from the air gun housing for improved control, easier access to components and easier replacement of air guns that have failures or defects. In embodiments of the present invention, the hollow in-line integrated communications connector may provide control of the air gun through electronics to control a solenoid operated valve that triggers the firing of the air gun. The hollow in-line integrated communications connector may further transmit the time instant when the air gun has fired to the exploration vessel and may further monitor the wave shape character of the air gun sound pulse. The temperature and pressure of the surrounding water may also be monitored through the integrated communications connector to assist in determining the effect on the marine environment and depth where the air gun is being operated.

The communications connector assembly may be horizontally oriented to connect with the solenoid valve assembly. The connector includes electrical cables that pass into and through an internal chamber of the valve housing for the purpose of making electrical connections to internal electronic circuit boards. The electrical cables of the connector supply electric power and control lines to the solenoid valve firing circuit and supply power to the sensors. These sensors may be a time break transducer to signal the time instant when the air gun has fired, temperature and pressure sensors as well as one or more hydrophones to monitor the wave shape character of the air gun sound pulse. The modular length heavy duty communications and power cables of the hollow in-line integrated connector system provides for the quick replacement of the air gun or cable-connector assemblies resulting in less ship down time in the case where it is necessary to change out any of those components.

It is an object and advantage of the present invention to adjust the rise time from zero pressure to peak pressure of the first or primary pressure pulse to reduce undesirable high frequencies.

It is an object and advantage of the present invention to adjust the rise time from zero pressure to peak pressure of the first or primary pressure pulse by varying the length of the firing chamber.

It is an object and advantage of the invention to adjust the rise time from zero pressure to peak pressure of the first or primary pressure pulse to a desired rise time by selecting a specific length for the firing chamber, the length set to approximately 0.343 meters per millisecond (m/ms) (1.126 feet per millisecond (ft/ms)) of desired rise time.

It is an object and advantage of the present invention to provide embodiments of an air gun that operates at a range of operating pressures from 200 psi to 2000 psi or more.

It is another object and advantage of the invention to provide embodiments of an air gun which reduces or eliminates harmful and unusable high frequencies.

It is another object and advantage of the invention to provide embodiments of an air gun which lowers high frequency content and produces increased low frequency content in the output pulse.

It is another object and advantage of the invention to provide embodiments of an air gun which reduces cavitation and undesirable high frequency air gun emissions to limit the disruption of the marine ecosystem.

It is another object and advantage of the present invention to control the rise time from zero pressure to peak pressure of the first or primary pressure pulse to increase the time to reach peak pressure to reduce or eliminate objectionable high frequencies.

It is another object and advantage of the invention to provide embodiments of an air gun which will produce more low frequency energy and less undesirable high frequencies than conventional air guns.

It is another object and advantage of the present invention to produce embodiments of an air gun having no acceleration distance and the release of compressed air is as soon as the shuttle assembly starts to move.

It is another object and advantage of the present invention to produce embodiments of an air gun with the release of compressed air being through a 360° inner port structure.

It is another object and advantage of the invention to provide embodiments of an air gun having a circumferential annular seal to expel as much air as possible from the firing chamber for the shortest distance traveled by the shuttle assembly improving the overall efficiency of the air gun.

It is another object and advantage of the present invention to assemble embodiments of an air gun that may use a snap ring to affix the firing chamber to the cylindrical housing of the air gun housing.

It is another object and advantage of the present invention to assemble embodiments of an air gun that may use a snap ring to affix the operating chamber head to the cylindrical housing of the air gun housing.

It is another object and advantage of the present invention to assemble embodiments of an air gun that may have shuttle assembly flanges that are thinner and proportionately lighter than conventional air guns.

It is another object and advantage of the present invention to assemble embodiments of an air gun that may have a sliding firing seal that is directly adjacent to the ports to release air from the firing chamber when the firing piston starts to move.

It is another object and advantage of the present invention to assemble embodiments of an air gun that may have a spring loaded firing seal that seals along an inner diameter of the firing piston flange preventing the release of air from the firing chamber until the firing piston starts to move.

It is another object and advantage of the invention to assemble embodiments of an air gun that may have a sliding seal on the outside diameter of the firing piston of the shuttle assembly to prevent contamination or water leakage into the air cushion chamber.

It is another object and advantage of the present invention to provide embodiments of an air gun with a firing chamber that may have an internal bore of uniform diameter and flush or nearly so all the way to the ports with little or no throat restriction.

It is another object and advantage of the present invention to have embodiments of the air gun that have the inside diameter of the firing chamber be no more than 1.2 times the throat diameter located between the firing chamber and the air gun discharge ports.

It is another object and advantage of the present invention to have embodiments of the air gun that have the width of the ports extend beyond the outer diameter of the firing piston providing a larger communication area of air expelled to the outside water for the least amount of travel of the shuttle assembly.

It is another object and advantage of the present invention to improve the firing precision of embodiments of an air gun by providing a shortened trigger air passage, the air passage at a length shorter than the radius of the operating flange.

It is another object and advantage of the invention to provide in embodiments of an air gun, an air cushion chamber of a length that is approximately 20% longer in length than the length of the operating chamber thereby reducing pressure buildup in the air cushion chamber that may decrease the length of the stroke of the shuttle assembly.

It is another object and advantage of the invention to provide embodiments of an air gun having the firing piston open the discharge ports fully at a range of pressures from 200 psi to over 2000 psi.

It is another object and advantage of the invention to provide embodiments of an air gun which has rectangular discharge ports of constant width along the length of the ports providing large coupling of the surface area of the firing chamber compressed air to water when fired.

It is another object and advantage of the invention to provide embodiments of an air gun with a port exit area that is created at rates of greater than or equal to 50 $cm^2$/ms and a pulse rise time slope of less than 0.4 bar-m/ms and more specifically at less than 0.05 to 0.30 bar-m/ms.

It is another object and advantage of the invention to provide embodiments of an air gun that from a set position the distance from the inner face of the firing piston to the bulkhead wall is longer than the distance from the face of the operating flange to the operating chamber head.

It is another object and advantage of the invention to assemble embodiments of an air gun having a piston ring on the outside diameter of the shuttle assembly operating flange.

It is another object and advantage of the invention to provide embodiments of an air gun that provide control the speed of the shuttle assembly through adjustment of the geometry of grooves by adjusting the depth, width, length, and slope of grooves within a fluted sleeve within the operating chamber.

It is another object and advantage of the present invention to assemble embodiments of an air gun that may use vacuum oven brazing at mating surfaces to affix a reinforcing backbone to the cylindrical housing, the back bone having air passages for providing compressed air to the air gun.

It is another object and advantage of the present invention to assemble embodiments of an air gun that may use vacuum oven brazing to affix a bulkhead wall within the cylindrical housing of the air gun.

It is another object and advantage of the present invention to control of the rate of release of air at the discharge ports through adjustments to the length, angle, and/or profile of the firing flange to slow or shape the rise rate of the initial or primary pressure pulse of the air gun.

It is another object and advantage of the present invention to produce embodiments of an air gun solenoid valve and firing circuit hollow in-line integrated communications connector assembly which includes an air gun pulse signature hydrophone symmetrically facing the ports of the air gun for an accurate rendition of the near-field pulse of the air gun as well as including a water pressure sensor as well as a water temperature sensor.

It is another object and advantage of the present invention is the inclusion of the near-field hydrophone sensor with the in-line integrated communications connector assembly that is directed towards and at an equal distance from the discharge ports.

It is another object and advantage of the present invention to produce embodiments of an air gun having a firing circuit and solenoid valve assembly and a connector assembly which is bolted on horizontally in the direction of towing of the air gun by the exploration vessel and wherein the main firing control cable passes through the connector assembly with electric wire branch connections leading to control circuits for controlling the solenoid valve and to connect pressure, temperature, and hydrophone sensors.

It is yet another object and advantage of the present invention to produce embodiments of an air gun firing circuit and solenoid valve assembly as well as a connector assembly which can be removed from the firing circuit and solenoid valve assembly wherein either assembly may be replaced independently of the other without disturbing any wiring.

The present invention is related to embodiments of an air gun, comprising a housing having an operating chamber and discharge ports; a firing piston movable within the housing; a firing chamber attached to the housing; and the average rising slope of the primary pressure pulse from firing the air gun is less than 0.4 bar-m/ms. In embodiments of the air gun, the average rising slope of the primary pressure pulse is in a range of 0.05 bar-m/ms to 0.30 bar-m/ms. In embodiments of the air gun, the port exit area is created at a rate greater than or equal to 50 square centimeters per millisecond. In embodiments of the air gun, the average rising slope of the primary pressure pulse is in a range of 0.05 bar-m/ms to 0.30 bar-m/ms and the port exit area is created at a rate greater than or equal to 50 square centimeters per millisecond. In embodiments of the air gun, the rise time from zero to peak pressure of the primary pressure pulse is greater than 1.2 milliseconds. In embodiments of the air gun, the average rising slope of the primary pressure pulse is in a range of 0.05 bar-m/ms to 0.30 bar-m/ms and the rise time from zero to peak pressure of the primary pressure pulse is greater than 1.2 milliseconds. In embodiments of the air gun, the port exit area is created at a rate greater than or equal to 50 square centimeters per millisecond and the rise time from zero to peak pressure of the primary pressure pulse is greater than 1.2 milliseconds. In embodiments of the air gun, the average rising slope of the primary pressure pulse is in a range of 0.05 bar-m/ms to 0.30 bar-m/ms, the port exit area is created at a rate greater than or equal to 50 square centimeters per millisecond, and the rise time from zero to peak pressure of the primary pressure pulse is greater than 1.2 milliseconds. In embodiments of the air gun, the rise time of the primary pressure pulse is tuned by selecting a specific length of the firing chamber based on a length of approximately 0.343 meters per millisecond (1.126 feet per millisecond) of desired rise time to peak of the primary pressure pulse. In embodiments of the air gun, the average rising slope of the primary pressure pulse is in a range of 0.05 bar-m/ms to 0.30 bar-m/ms and the rise time of the primary pressure pulse is tuned by selecting a specific length of the firing chamber based on a length of approximately 0.343 meters per millisecond (1.126 feet per millisecond) of desired rise time to peak of the primary pressure pulse. In embodiments of the air gun, the port exit area is created at a rate greater than or equal to 50 square centimeters per millisecond and the rise time of the primary pressure pulse is tuned by selecting a specific length of the firing chamber based on a length of approximately 0.343 meters per millisecond (1.126 feet per millisecond) of desired rise time to peak of the primary pressure pulse. In embodiments of the air gun, the average rising slope of the primary pressure pulse is in a range of 0.05 bar-m/ms to 0.30 bar-m/ms, the port exit area is created at a rate greater than or equal to 50 square centimeters per millisecond and the rise time of the primary pressure pulse is tuned by selecting a specific length of the firing chamber based on a length of approximately 0.343 meters per millisecond (1.126 feet per millisecond) of desired rise time to peak of the primary pressure pulse. In embodiments of the air gun, the average rising slope of the primary pressure pulse is in a range of 0.05 bar-m/ms to 0.30 bar-m/ms, the port exit area is created at a rate greater than or equal to 50 square centimeters per millisecond, the rise time from zero to peak pressure of the primary pressure pulse is greater than 1.2 milliseconds, and the rise time of the primary pressure pulse is tuned by selecting a specific length of the firing chamber based on a length of approximately 0.343 meters per millisecond (1.126 feet per millisecond) of desired rise time to peak of the primary pressure pulse. In embodiments of the air gun, the average rising slope of the primary pressure pulse is in a range of 0.05 bar-m/ms to 0.30 bar-m/ms, the rise time from zero to peak pressure of the primary pressure pulse is greater than 1.2 milliseconds, and the rise time of the primary pressure pulse is tuned by selecting a specific length of the firing chamber based on a length of approximately 0.343 meters per millisecond (1.126 feet per millisecond) of desired rise time to peak of the primary pressure pulse. In embodiments of the air gun, the port exit area is created at a rate greater than or equal to 50 square centimeters per millisecond, the rise time from zero to peak pressure of the primary pressure pulse is greater than 1.2 milliseconds, and the rise time of the primary pressure pulse is tuned by selecting a specific length of the firing chamber based on a length of approximately 0.343 meters per millisecond (1.126 feet per millisecond) of desired rise time to peak of the primary pressure pulse. In embodiments of the air gun, the rise time from zero to peak pressure of the primary pressure pulse is greater than 1.2 milliseconds, and the rise time of the primary pressure pulse is tuned by selecting a specific length of the firing chamber based on a length of approximately 0.343 meters per millisecond (1.126 feet per millisecond) of desired rise time to peak of the primary pressure pulse. In embodiments of the air gun, the rise time of the primary pressure pulse is tuned by selecting a specific length of the firing chamber based on a length of approximately 0.343 meters per millisecond (1.126 feet per millisecond) of desired rise time to peak of the primary pressure pulse and the rise time remains constant at operating pressures from 200 psi to 1000 psi. In embodiments of the air gun, the length of the firing chamber is measured from the discharge ports of the firing chamber to the longest internal length of the firing chamber. In embodiments of the air gun, the average rising slope of the primary pressure pulse is in a range of 0.05 bar-m/ms to 0.30 bar-m/ms, the port exit area is created at a rate greater than or equal to 50 square centimeters per millisecond, the rise time from zero to peak pressure of the primary pressure pulse is greater than 1.2 milliseconds, the rise time of the primary pressure pulse is tuned by selecting a specific length of the firing chamber based on a length of approximately 0.343 meters per millisecond (1.126 feet per millisecond) of desired rise time to peak of the primary pressure pulse and the length of the firing chamber is measured from the discharge ports of the firing chamber to the longest internal length of the firing chamber. In embodiments of the air gun, the port exit area is a linear function of the position of the shuttle assembly over the gas-release cycle. In embodiments of the air gun, the discharge ports have constant width along the length of the discharge ports. In embodiments of the air gun, the discharge ports are rectangular in shape when viewed from the side of the air gun. In embodiments of the air gun, the discharge ports have a width that is wider than the diameter of the firing piston. In embodiments of the air gun, a firing chamber seal is adjacent an inner edge of the discharge ports providing zero acceleration distance. In embodiments of the air gun, a firing chamber seal seals on the inside diameter of the firing piston. In embodiments of the air gun, the air gun has an air cushion chamber and a sliding seal on the outside diameter of the firing piston to seal the air cushion chamber. In embodiments of the air gun, the diameter of the firing chamber is no more than 1.2 times the throat diameter where the firing chamber attaches to the housing.

The present invention is related to an air gun for seismic exploration, comprising an air gun having a firing chamber; and wherein the rise time to peak of the initial pulse is tuned by varying the length of the firing chamber. Embodiments of the air gun for seismic exploration comprising discharge ports; and wherein a specific length of the firing chamber is selected based on a length of approximately 0.343 meters per millisecond (1.126 feet per millisecond) of desired rise time to peak of the initial pulse. In embodiments of the air gun for seismic exploration, the rise time remains constant at operating pressures from 200 psi to 1000 psi. In embodiments of the air gun for seismic exploration, the length of the firing chamber is measured from the discharge ports to the longest internal length of the firing chamber. In embodiments of the air gun for seismic exploration, by increasing the internal length of the firing chamber of the air gun, the rise time of the initial pulse to reach peak pressure increases. In embodiments of the air gun for seismic exploration, by shortening the internal length of the firing chamber, the rise time of the initial pulse to reach peak pressure decreases. In embodiments of the air gun for seismic exploration the length of the firing chamber is at least two times the diameter of the firing chamber. In embodiments of the air gun for seismic exploration, the firing chamber is of uniform diameter and flush all the way to the discharge ports with little or no restriction. Embodiments of the air gun for seismic exploration comprise a shuttle assembly having a firing piston and the length of the shuttle assembly is shorter than the diameter of the firing piston. In embodiments of the air gun, the firing piston may have a cup shaped shuttle piston flange. Embodiments of the air gun for seismic exploration may comprise an air cushion chamber and a sliding seal on the outside diameter of the firing piston flange to seal the air cushion chamber. In embodiments of the air gun the sliding seal may be placed in a groove along the outside diameter of the firing piston.

The present invention is related to a method of adjusting the rise time and the frequency content of the initial pulse of an air gun comprising tuning the rise time of the initial pulse by selecting a length of the firing chamber to a length approximately 0.343 meters per millisecond (1.126 feet per millisecond) of desired rise time to peak of the initial pulse. Embodiments of the method of adjusting the rise time and the frequency content of the initial pulse of an air gun comprises producing an average rising slope of the initial pulse from firing the air gun that is less than 0.4 bar-m/ms. Embodiments of the method of adjusting the rise time and the frequency content of the initial pulse of an air gun, comprises producing an average rising slope of the primary pressure pulse from firing the air gun in a range of 0.05 bar-m/ms to 0.30 bar-m/ms. Embodiments of the method of adjusting the rise time and the frequency content of the initial pulse of an air gun, comprises producing a port exit area that is created at a rate greater than or equal to 50 square centimeters per millisecond. Embodiments of the method of adjusting the rise time and the frequency content of the initial pulse of an air gun, comprises producing a rise time from zero to peak pressure of the primary pressure pulse that is greater than 1.2 milliseconds. Embodiments of the method of adjusting the rise time and the frequency content of the initial pulse of an air gun, comprises producing a port exit area that is a linear function of the position of the shuttle assembly over the gas-release cycle. Embodiments of the method of adjusting the rise time and the frequency content of the initial pulse of an air gun, comprises producing an average rising slope of the primary pressure pulse from firing the air gun in a range of 0.05 bar-m/ms to 0.30 bar-m/ms, producing a port exit area that is created at a rate greater than or equal to 50 square centimeters per millisecond, and producing a rise time from zero to peak pressure of the primary pressure pulse that is greater than 1.2 milliseconds. Embodiments of the method of adjusting the rise time and the frequency content of the initial pulse of an air gun, wherein the rise time remains constant at operating pressures from 200 psi to 1000 psi.

The present invention is related to a method of tuning the rise time of the primary pressure pulse of an air gun comprising producing an average rising slope of the primary pressure pulse from firing the air gun in a range of 0.05 bar-m/ms to 0.30 bar-m/ms, producing a port exit area at a rate greater than or equal to 50 square centimeters per millisecond, and producing a rise time from zero to peak pressure of the primary pressure pulse that is greater than 1.2 milliseconds. Embodiments of the method of tuning the rise time of the primary pressure pulse of an air gun comprising selecting a length of the firing chamber to a length approximately 0.343 meters per millisecond (1.126 feet per millisecond) of desired rise time to peak of the primary pressure pulse.

These and other features, advantages and improvements according to this invention will be better understood by reference to the following detailed description and accompanying drawings. While references may be made to upper, lower, vertical and horizontal, these terms are used merely to describe the relationship of components and not to limit the operation of the present invention to any one orientation.

BRIEF DESCRIPTION OF THE DRAWINGS

The invention, together with further objects, features, aspects and advantages thereof will be more fully understood and appreciated by consideration of the following description in conjunction with the accompanying drawings in which the respective elements bear the same reference numerals throughout the various views.

FIG. 4A is a longitudinal cross sectional view of an embodiment of the solenoid valve housing and operating chamber of the air gun of the present invention;

FIG. 5A is a longitudinal cross sectional view of an embodiment of the liner sleeve of the operating chamber of the air gun of the present invention;

FIG. 5B is a longitudinal cross sectional view of an embodiment of the liner sleeve of the operating chamber of the air gun of the present invention;

FIG. 5C is a cross sectional view along section A-A of FIG. 5A of an embodiment of the liner sleeve of the operating chamber of the air gun of the present invention;

FIG. 6 is a longitudinal cross sectional view of a further embodiment of the air gun of the present invention;

FIG. 8A is a longitudinal cross sectional view of an embodiment of the firing chamber and discharge ports of the air gun of the present invention;

FIG. 8C is a cross sectional view along section A-A of FIG. 8A of an embodiment of the firing chamber, horizontal milled channel, and discharge ports of the air gun of the present invention;

FIG. 9A is a longitudinal cross sectional view of a further embodiment of the firing chamber and cup shaped flange of the firing piston of the air gun of the present invention;

FIG. 9B is an inset of the longitudinal cross sectional view of the further embodiment of the firing chamber and cup shaped flange of the firing piston of the air gun of the present invention;

FIG. 10A is an inset of the longitudinal cross sectional view of the further embodiment of the firing chamber and an embodiment of the cup shaped flange of the firing piston of the air gun of the present invention;

FIG. 10B is an inset of the longitudinal cross sectional view of the further embodiment of the horizontal milled channel of the firing chamber and an embodiment of the cup shaped flange of the firing piston of the air gun of the present invention;

FIG. 11A is an inset of the longitudinal cross sectional view of the further embodiment of the firing chamber and a further embodiment of the cup shaped flange of the firing piston of the air gun of the present invention;

FIG. 11B is an inset of the longitudinal cross sectional view of the further embodiment of the firing chamber and the further embodiment of the cup shaped flange of the firing piston of the air gun of the present invention;

FIG. 13A is an inset of the longitudinal cross sectional view of the further embodiment of the firing chamber and a still further embodiment of the cup shaped flange of the firing piston of the air gun of the present invention;

FIG. 13B is an inset of the longitudinal cross sectional view of the further embodiment of the firing chamber and the still further embodiment of the cup shaped flange of the firing piston of the air gun of the present invention;

FIG. 13C is an inset of the longitudinal cross sectional view of the further embodiment of the firing chamber and the still further embodiment of the cup shaped flange of the firing piston of the air gun of the present invention;

FIG. 25A is a cross sectional view of an embodiment of the firing chamber showing the outer flange having bolts for the attachment of firing chambers having various lengths to tune the rise time of the primary pressure pulse in embodiments of the air gun of the present invention;

FIG. 25B is an embodiment of an air gun of the present invention with a firing chamber having a length of 121.92 cm (48 inches);

FIG. 31C is a graph of the plotted slope of the initial pulse recorded from an embodiment of air gun of the present invention.

DETAILED DESCRIPTION OF THE DRAWINGS

Figure 1:
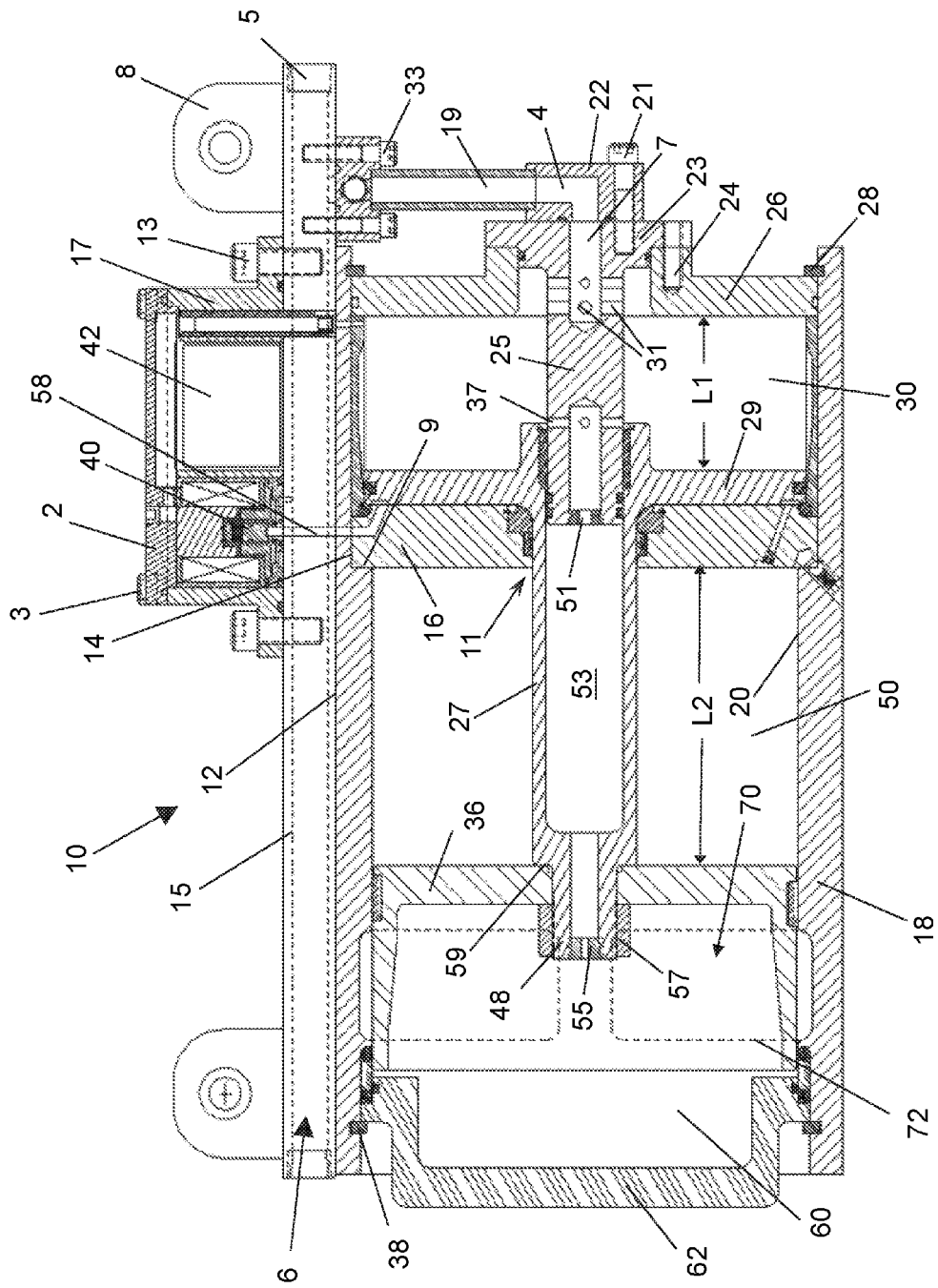
FIG. 1 is a longitudinal cross sectional view of an embodiment of the air gun of the present invention.

In some embodiments of the present invention, an air gun 10, as shown in FIG. 1, comprises a dual purpose reinforcing backbone air passage manifold 15 to strengthen the housing 18 to supply and distribute compressed air through one or more passages 6 by connecting a supply line to a connector 5 on either end of the backbone 15. The backbone 15 may have one or more tow ears 8 that may be brazed into the backbone 15 for towing the air gun 10. The backbone 15 may be secured to the air gun housing 18 by vacuum oven brazing at mating surfaces 12 between the bottom of the backbone and the air gun cylindrical housing providing a flattened top for mounting a solenoid operated air gun firing valve, which may make the air gun more reliable and lighter. Bulkhead wall 16 is may also brazed into air gun housing 18 at joint 14 instead of the housing being machined out of a single billet of stainless steel thus saving material costs, machine time, and labor. The bulkhead wall 16 may be seated against a shoulder 9 formed in the housing 18 where the diameter of the housing 18 is enlarged to secure the bulkhead wall 16 and form the tubular structure of the operating chamber 30. Because some embodiments of the air gun 10 may be run at low pressures, the housing 18 may have a dimensioned wall thickness that is thinner than high pressure air guns of the prior art, reducing the overall weight and costs of the air gun 10. The shuttle assembly includes a shuttle assembly shaft 27 and an operating flange 29. The shuttle assembly shaft 27 is inserted through the opening to the operating chamber 30 and through a center hole 11 in the bulkhead wall 16 with the sealing face of the operating flange 29 aligning against the bulkhead wall 16. Instead of using bolts or clamping rings, the operating chamber 30 may be enclosed by securing in place the operating chamber head 26 using a retaining ring 28. The shuttle assembly support spindle 25 is inserted into the hollow shuttle assembly shaft and the shuttle assembly support spindle flange 23 is secured to the operating chamber head 26 using bolt circle 24. An air channel block 22 is secured to the shuttle assembly support spindle flange 23 using bolt circle 21. The air channel block 22 has a 90° passage 4 to direct air flow through the air input fitting 19 and through the spindle air passage 7 to inlet openings 31 to provide air to the operating chamber 30. The compressed air input fitting 19 is secured to the backbone 15 using air input line retainer bolts 33 to communicate with compressed air passage 6.

The shuttle assembly shaft 27 extends through the bulkhead wall 16 to the air cushion chamber 50. The shaft 27 may be hollow to reduce the overall weight of the air gun 10 and act as an air supply passage for the air volume 60 within the firing chamber 62. The hollow shaft 27 also makes the shuttle assembly lighter so that a lower amount of force is needed to move the shuttle assembly. An air inlet orifice 51 controls the flow rate of air entering the shaft interior bore 53 and an outlet orifice 55 controls the rate of flow of air entering the volume 60 of the firing chamber 62. Air is supplied from the operating chamber 30 through inlet holes 37 in the shuttle assembly support spindle 25. The shaft end 48 of the shuttle assembly shaft 27 is threaded to attach the firing piston 36 which may be cup shaped. The firing piston 36 is attached to the shaft end 48 using a nut 57 to lock the firing piston 36 against a shoulder 59 formed at the base of the shaft 27. Rider bearings 179 are installed along the outer diameter of the cup shaped firing piston 36 to provide for the piston to freely slide along the inner walls 20 of the low pressure air gun cylindrical housing 18. In air guns of the prior art, the ports are positioned behind the firing piston and the space behind the firing piston is filled with water, therefore the water is displaced as the gun fires which may be a cause of cavitation when firing the air gun that could disrupt the marine ecosystem. The air gun of the present invention has an air cushion chamber 50 that traps ambient air behind the firing piston 36. The displacement of water is therefore reduced limiting a source of cavitation when the air gun 10 is fired. The ports 70 are formed through the housing 18 near the firing chamber 62 as indicated by dotted lines 72 showing the openings. A specific length for the firing chamber 62 may be selected in order to tune the rise time and slope of the primary pressure pulse. From the selected length, the diameter of the firing chamber is selected to provide a volume that with the selected operating pressure produces the desired energy output. The firing chamber 62 may be secured to the air gun housing 18 using retainer ring 38 or in some embodiments using bolts. By using snap type retainer rings instead of bolts, the cylindrical walls of the housing 18 may be thinner where there is no necessity to thicken the wall to install bolts or clamping rings.

Figure 2:
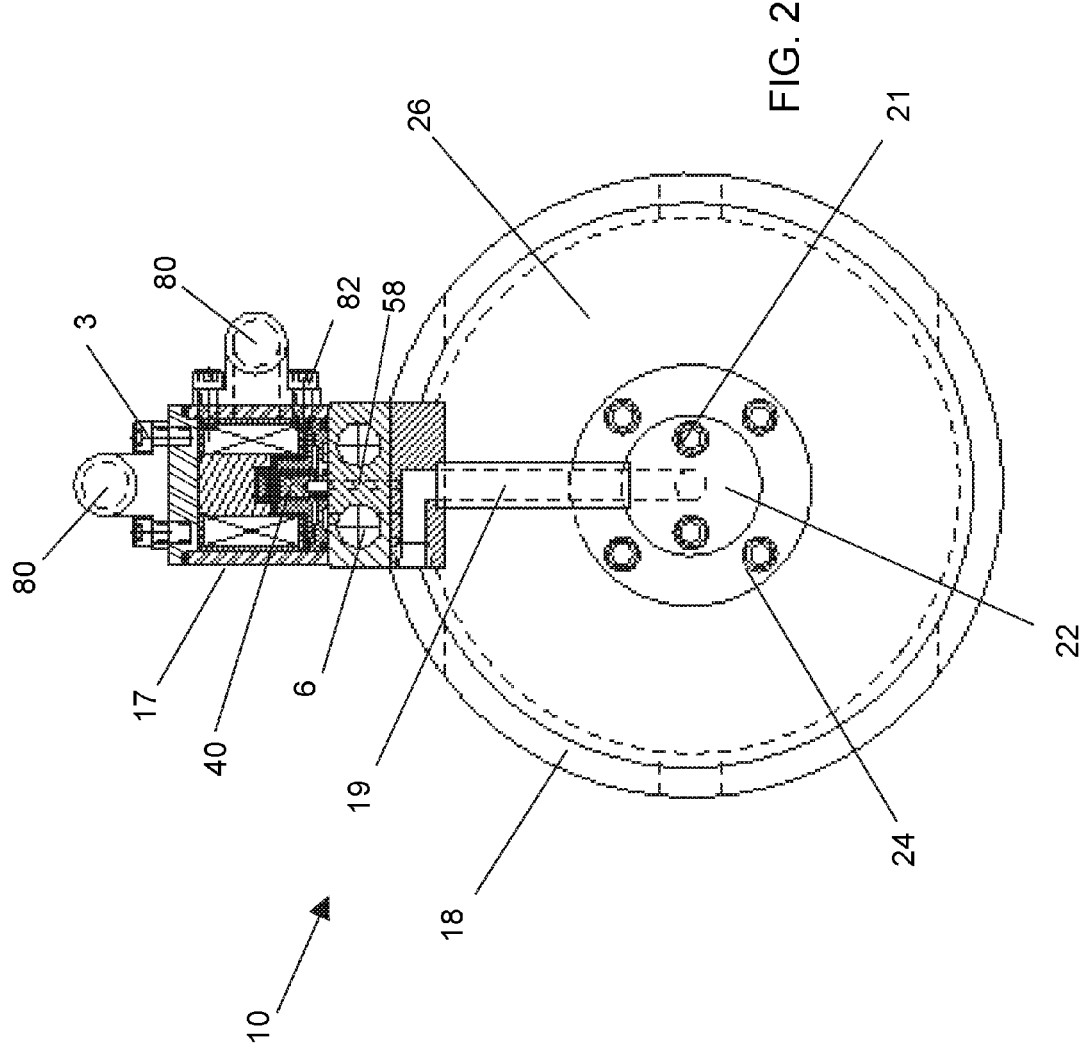
FIG. 2 is an end view of an embodiment of the air gun of the present invention showing an electrical cable block connector that may be optionally on the top or side of the solenoid valve housing of the present invention.

A solenoid valve housing 17 may be bolted using bolts 13 or be brazed to the backbone 15. The solenoid valve housing 17 may enclose only a solenoid valve 40 or a solenoid valve and control circuit 42 based on the specification requirements of the air gun system. An electrical cable block connector 80 extends either from the top or side of the solenoid valve housing 17, as shown in FIG. 2. A multi-pin cable connector (not shown) provides for the cable block connector 80 to be electrically connected to the solenoid valve 40 or control circuit 42. The block connector 80 may then be bolted to the solenoid valve housing 17 using bolts 82. The cable block connector 80 may be detached to replace the entire solenoid valve housing 17 with the solenoid valve 40 and control circuit 42 as a unit. Alternatively, an access cover 2 attached to the solenoid valve housing 17 using bolts 3 may be provided to provide access to repair or replace the solenoid valve housing 17 solenoid valve 40, control circuit 42 or other internal components. In this manner a defective control circuit or solenoid valve can be repaired or replaced without removal of the solenoid valve housing 17 from the backbone 15. The cable block connector 80 further provides for a faulty air gun 10 to be replaced by only disconnecting the electrical cable block connector 80 from the solenoid valve housing and the air supply line from the backbone 15 and attaching the cable block connector 80 and air supply line to a new air gun 10, greatly reducing down time for failures during deployment of an array of air guns. As shown the trigger air passage 58 extends between the air passages 6 directly through the backbone 15 to provide for more precise firing of the air gun 10 where the air trigger passage is of a substantially shortened length as compared to air guns of the prior art.

Figure 3:
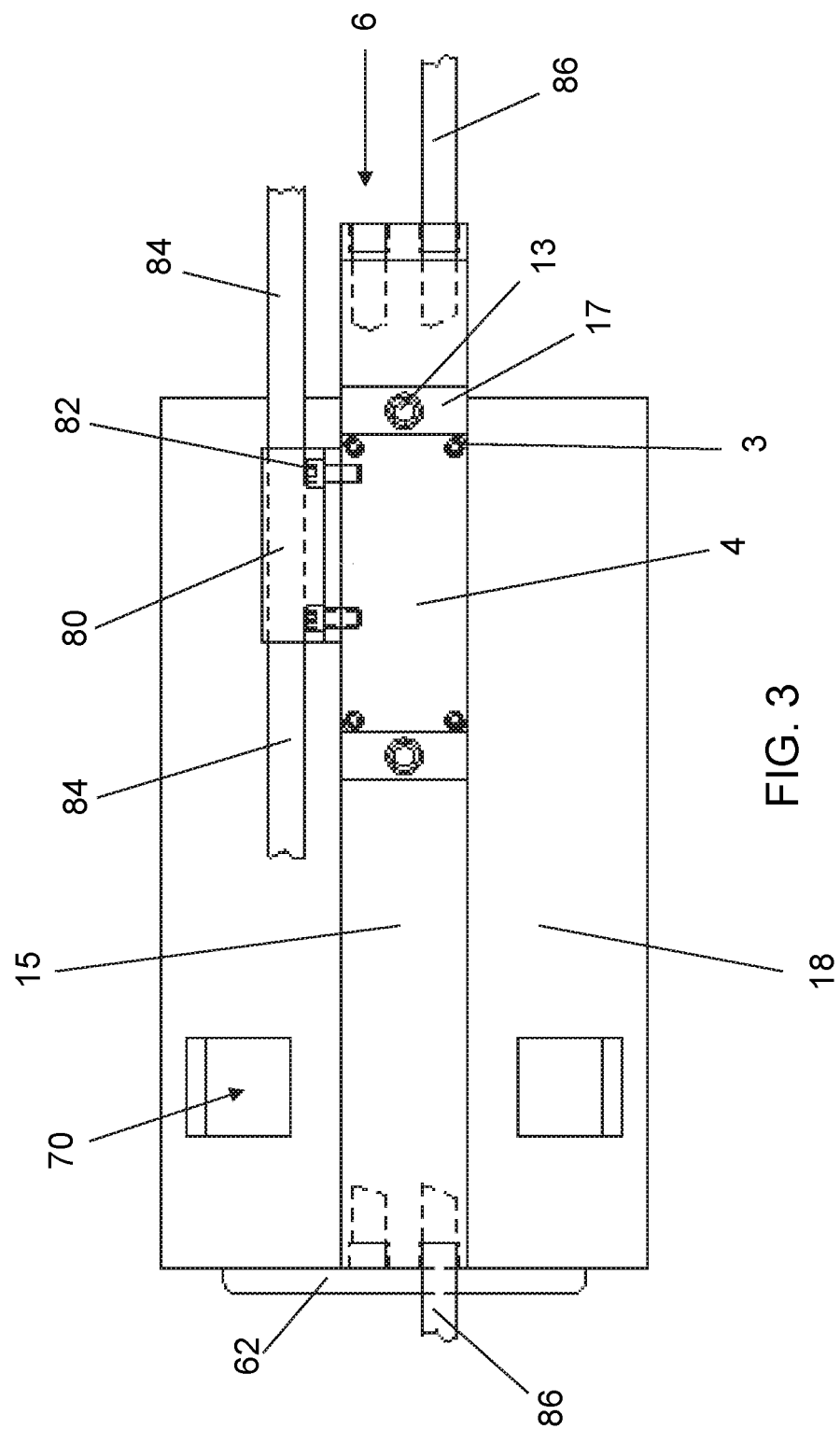
FIG. 3 is a top view of an embodiment of the air gun of the present invention.

A top view of an embodiment of the air gun 10 is shown in FIG. 3 with the electric cable block connector 80 directed off to the side of the solenoid valve housing 17 and electrical cables 84 extending from the block connector 80 to the exploration vessel or other similar air guns. Air supply lines 86 extend from each end of the backbone 15. A second air passage 6 may be provided for additional air supply lines if a number of air guns 10 are used in a single array. The trigger air passage 58 directs air flow to a grooved annular space 67 around the inner face of the operating flange 29 as shown in FIG. 4A.

Figure 4B:
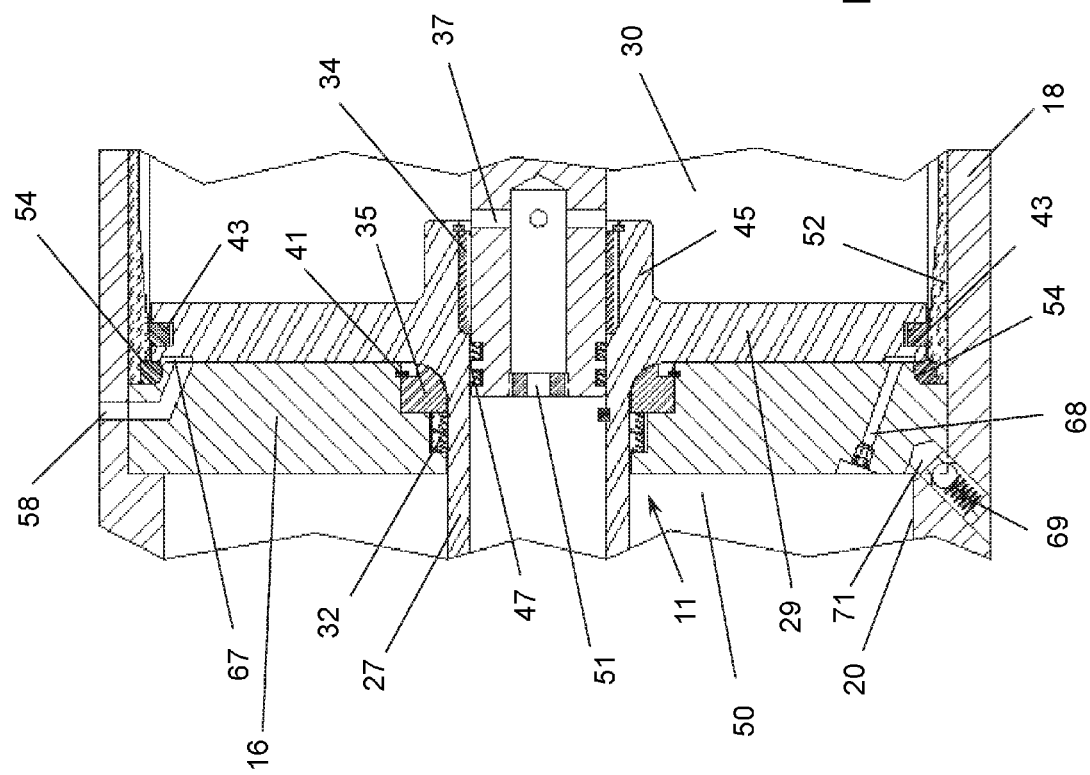
FIG. 4B is a longitudinal cross sectional view of an embodiment of the operating chamber of the air gun of the present invention.

The present invention does not require holes to be drilled through the bulkhead wall 16 to allow water to flow to lubricate the shaft seals because the shuttle assembly shaft 27 is sealed using two close fitting self-lubricating shaft seal rings 32, as shown in FIG. 4B, that seal the operating chamber 30 from the air cushion chamber 50 and allow the shuttle shaft 27 to move freely through the center hole 11 of the bulkhead wall 16 without leakage. A retainer ring 35 holds the shaft seal rings 32 in place with the retainer ring 35 being held in place using a snap ring 41. A sliding sleeve bearing 34 is installed within a recess 45 where the shuttle assembly shaft 27 is installed along the shuttle assembly support spindle 25 with two piston rings 47 sealing the shaft 27 from the operating chamber 30. A piston ring 43 surrounds the operating flange 29 to travel along a liner sleeve 52 which retains the operating seal 54.

A trigger valve air supply hole 61 is drilled through the top wall of air passage 6 into the trigger valve air input chamber 63, enabling solenoid operated trigger valve 65 to be supplied with air as shown in FIG. 4A. When the trigger valve 65 is actuated by an electric pulse from the firing circuit 42, a shot of air flows rapidly through trigger air passage 58 into annular space 67 to trigger the air gun by breaking the seal between the outside diameter of operating flange 29 and operating seal 54 allowing the shuttle assembly to start its firing movement as pushed by the air pressure within the firing chamber 62 across the cross sectional area of the cup shaped firing piston 36. Air vent passage 68 is drilled through bulkhead wall 16 near the bottom of operating chamber 30 and air cushion chamber 50, thus allowing the air pressure in the annular space 67 to be at ambient water pressure when the operating flange 29 has returned to the set position. Check valve 69 positioned for outward flow, vents water or air from ambient air cushion chamber 50 through drilled port 71. If any water seeps into the ambient air cushion chamber 50 between air gun shots, the water is purged out through port 71 and check valve 69 by the temporary air pressure build up in ambient air cushion chamber 50 during the time the cup shaped firing piston 36 is moving from the set position as shown in FIGS. 1, 4A and 4B, to the right and back again, compressing the air from approximate ambient water pressure and allowing some of the air to flow from operating chamber 30 through drilled passage 68 into air cushion chamber 50 thus pressurizing the chamber 50 and pushing any water which may have collected in the bottom of the air cushion chamber 50 out through check valve 69 and between the clearance of the cup shaped firing piston rider bearing 179 and the cylindrical wall 20 of the housing 18. Recessed within the bulkhead wall 16, close fitting shaft seal rings 32 and retainer ring 35 prevent air from the operating chamber 30 from leaking through the center hole 11 of the bulkhead wall 16 and the outside diameter of shuttle assembly shaft 27 when the operating flange 29 is not in the set or cocked position.

In some embodiments, the air gun includes a liner sleeve 52 within the operating chamber 30, as shown in FIG. 5A. The liner sleeve controls the air flow around the operating flange 29 to control the speed of the operating flange 29 as described in patent, U.S. Pat. No. 4,779,245 to the same inventor. However, different from the described conical tapered surface of revolution that would extend completely along the inner surface 73 of the liner sleeve 52, some embodiments of the present invention may include a series of non-contiguous flutes or grooves 75 shown in FIGS. 5B and 5C as cross sections of the operating chamber 30 along section A-A shown in FIG. 5A. The grooves 75 are machined into the sleeve 52 and are formed as a shallow narrow groove at a first end 77, that expands to a deeper rounded channel along a middle area 79 and tapers to a less deep rounded channel 81 closer to the inner wall 83 of the operating chamber head 26.

When the operating flange 129 is in the set to fire position shown in FIG. 5A, there is none or very little air leakage around the piston ring 43. When the trigger valve 65 is actuated by an electric pulse from the firing circuit 42, the operating flange 129 accelerates and the compressed air created by the movement of the flange 129 creates a pressure spike which enters the time break transducer passage 39, as shown in FIG. 4A, causing a time break transducer 44 installed at the passage to produce a signal to the control circuit 42 that the air gun 10 has fired. As shown in FIG. 5B, arrows indicate air flow as the piston ring 43 of the flange 129 rides along the lands 73 of the inner surface of the liner sleeve 52 between the grooves 75. The lands 73 guide the piston ring 43 within the operating flange 129. By restricting air flow initially through the formation of the shallow narrow shape of the groove 75 at the first end 77, a non-linear rate of change in the velocity of the shuttle assembly is provided and the rise time of the first primary or primary pressure pulse may be slowed until the operating flange 129 reaches the widened portion of the channel in the middle 79 of the groove 75. The operating flange 129 then progressively accelerates until passing the widened and deepened middle section 79 when flange 129 nears the end 81 where the slope and width of the grooves start to close off the air flow, the flange 129 is slowed by compressing the air within the operating chamber 130 to slow and stop the flange 129 prior to hitting the inner wall 83 of the operating chamber head 126. This is the point where the pressure peaks triggering the time break transducer 44 which puts out the signal that the gun has fired. In some embodiments, the speed of the shuttle assembly may be controlled by the geometry of the grooves where the shape, width, length, slope and depth of the groove will all contribute to control of the rise time of the initial pulse. By slowing the rise time, the time for the primary pressure pulse to reach peak pressure is increased which may reduce some high frequencies. Therefore, the appropriate groove geometry may remove a source of undesirable frequencies that may cause damage to marine mammals and fish.

In a further embodiment of the low pressure air gun 100, as shown in FIG. 6, the solenoid valve housing 17 may be affixed to the backbone 15 by vacuum oven brazing at mating surfaces 113 between the bottom of the housing 17 and backbone 15 thereby eliminating the necessity of using bolts to attach the solenoid valve housing 17. The operating chamber 130 is supplied with compressed air directly from the air supply line 119 through inlet 131 and the hollow interior bore 153 of the shaft 127 is supplied with air through inlet holes 137. The shuttle assembly shaft 127 extends through an opening in the operating chamber head 126. The air cushion chamber 50 may be of a length L2 that is at least 1.2 times longer in length along the axis of the shuttle assembly as measured in a set position from the inner face 76 of the firing piston 136 to the inner surface 102 of the bulkhead wall 16 than the length L1 within the operating chamber 130 along the axis of the shuttle assembly as measured in a set position from the inner face 101 of the operating flange 129 to the inner surface 103 of the operating chamber head 126. By increasing the length of the distance from the inner face 76 of the cup shaped firing piston 36 to the bulkhead wall 16, there is less buildup of air pressure within the air cushion chamber 50 when firing the air gun and therefore the speed and travel distance of the cup shaped firing piston 36 is less impeded. This provides for the discharge ports 70 to be opened more fully. In some embodiments, a fluid filled speed controller 152 may be affixed to the operating chamber head 126 using bolts 124.

Figure 7A:
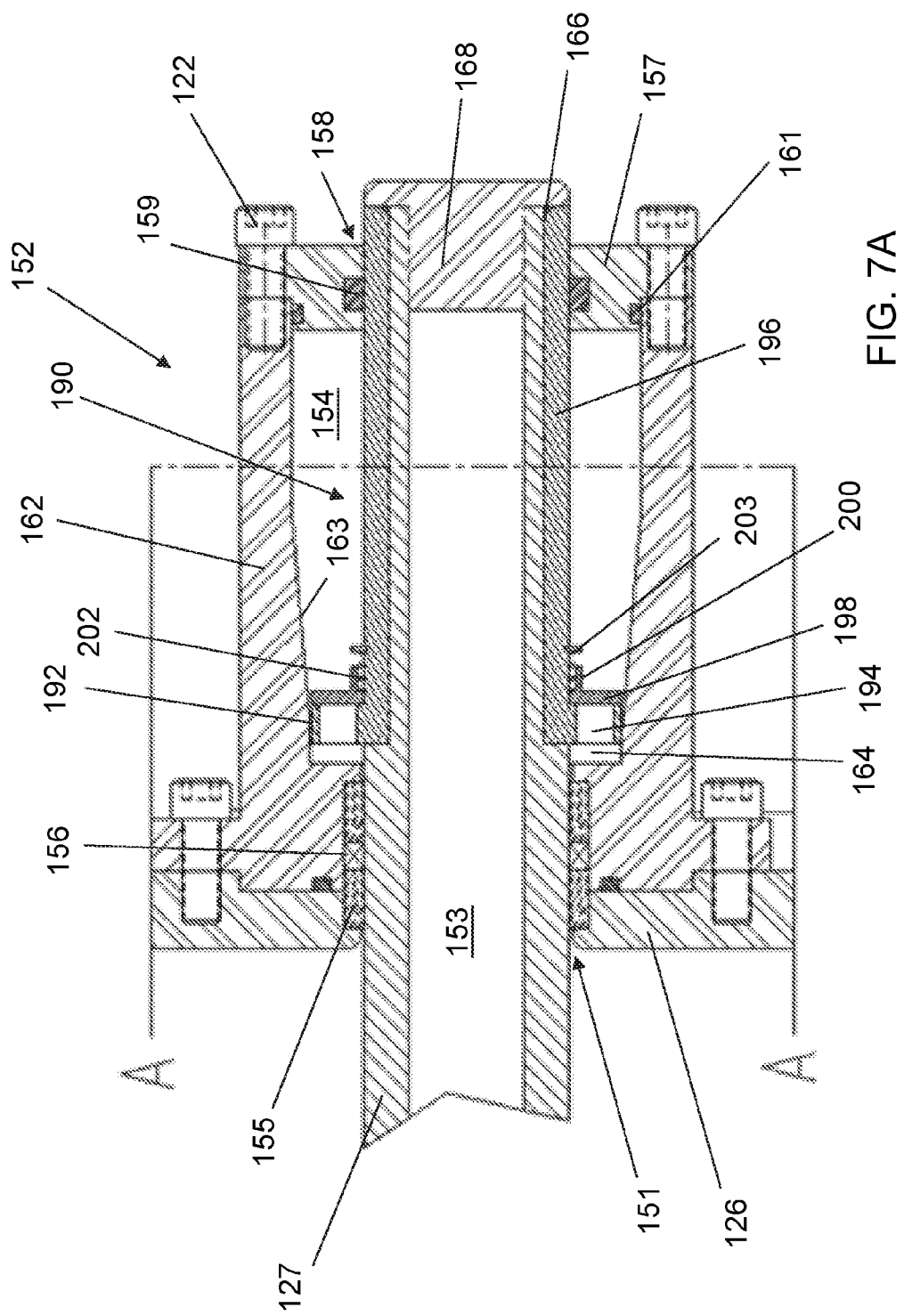
FIG. 7A is a longitudinal cross sectional view of an embodiment of a fluid filled speed controller in the further embodiment of the air gun of the present invention.
Figure 7B:
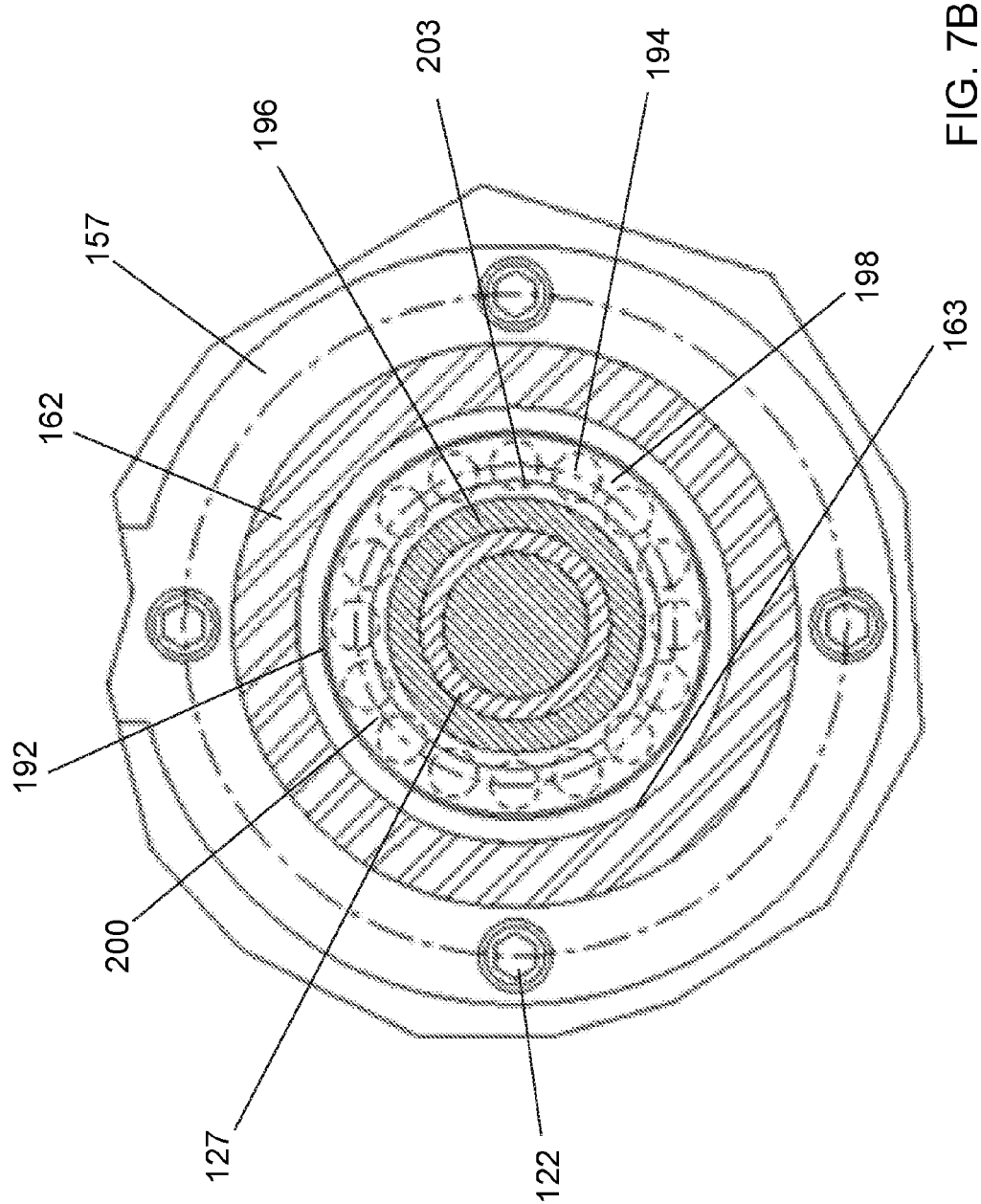
FIG. 7B is a cross sectional view along section A-A of FIG. 7A of an embodiment of a fluid filled speed controller in the further embodiment of the air gun of the present invention.

In this further embodiment which may be in addition to the operating chamber speed controller 52, a hydraulic speed controller 152 may be installed to an extended portion of the shuttle assembly shaft 127 of the air gun 100. The hydraulic speed controller 152 is bolted using bolts 124 to the outside center of the firing chamber head 126 of the air gun 100 to control the speed the shuttle assembly travels after the air gun 100 is triggered. The hydraulic speed controller 152 as shown in FIG. 7A includes an oil filled chamber 154 with the shaft assembly 127 of uniform diameter entering the opening 151 of the chamber 154 through two plastic bearings 155 with a shaft seal 156 retained between the two bearings 155. A check valve piston assembly 190 is installed to the shaft 127 and a speed controller housing head 157 is bolted to the top of the oil filled chamber 154 using bolts 122 with an opening 158 for the end of the shaft 127 to extend through the head 157. An internal shaft seal 159 seals the outside diameter of the shaft 127 within the speed controller head 157 and an O-ring seal 161 seals the head 157 to the housing 162. A threaded retainer cap 168 with an O-ring seal 166 is inserted into the hollow bore 153 to seal the shaft 127 and retain the check valve piston assembly 190 that surrounds the shuttle assembly shaft 127. The check valve piston assembly 190 includes a piston 192 with a ring of holes 194. The piston 192 is held in place within a bore 164 of the housing 162 by a tubular retainer 196 running through the speed controller housing head 157 and shaft seal 159. There is check valve plate 198 shaped like a circular washer biased against the check valve piston 192 by a spring 202 to cover the piston holes 194 causing the piston 192 with holes 194 and the spring biased ring plate 198 to become a check valve to remain closed when the shuttle assembly shaft 127 is accelerating upon triggering of the air gun 100. A spring retainer 200 retains the spring 202 and a ring plate 203 stops the spring biased ring plate 198 and sets the distance that the spring biased ring plate 198 moves when the check valve is opened. A cross sectional view of the speed controller 152 along section A-A of FIG. 7A is shown in FIG. 7B.

Figure 7C:
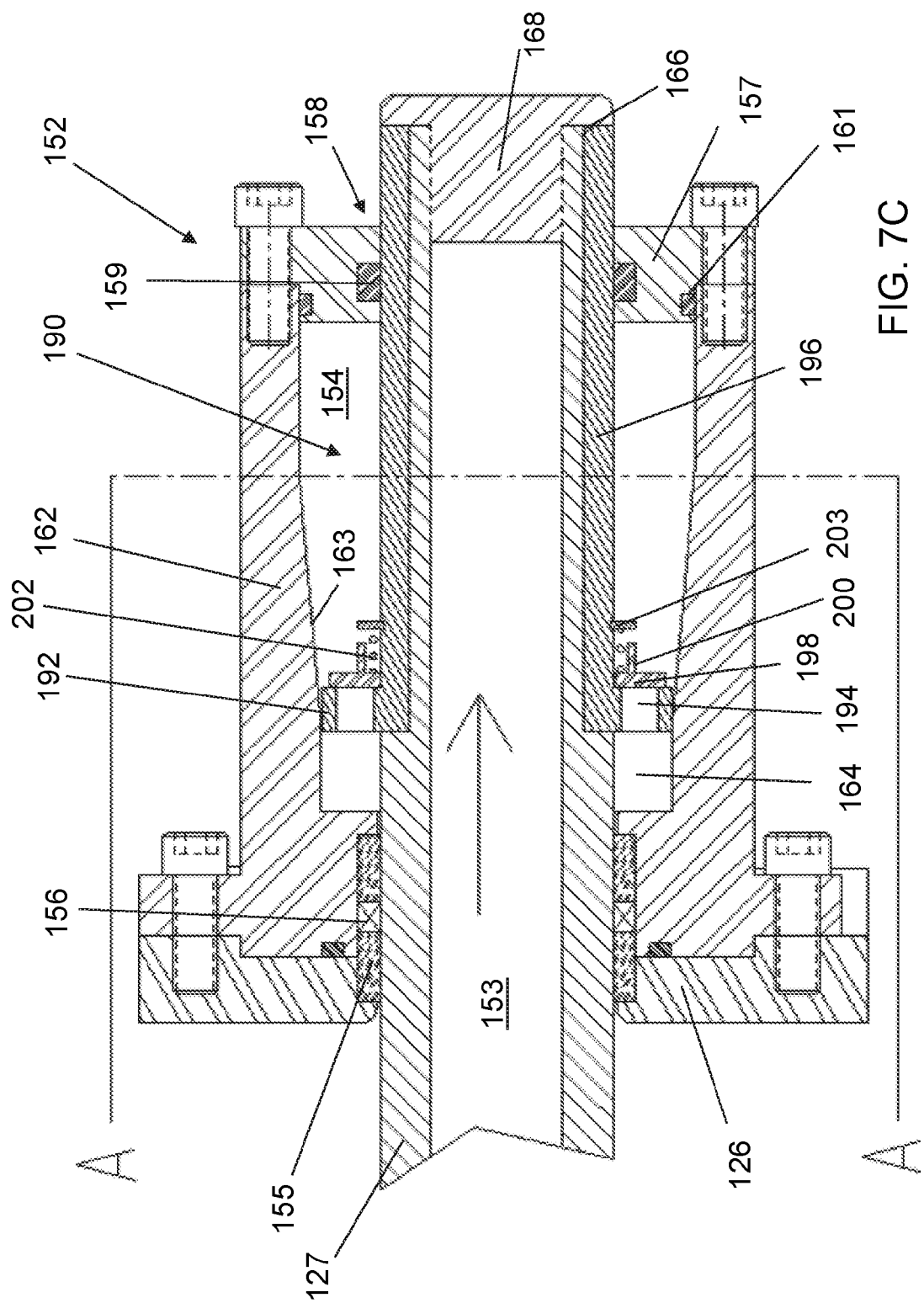
FIG. 7C is a longitudinal cross sectional view of an embodiment of a fluid filled speed controller in the firing position in the further embodiment of the air gun of the present invention.
Figure 7D:
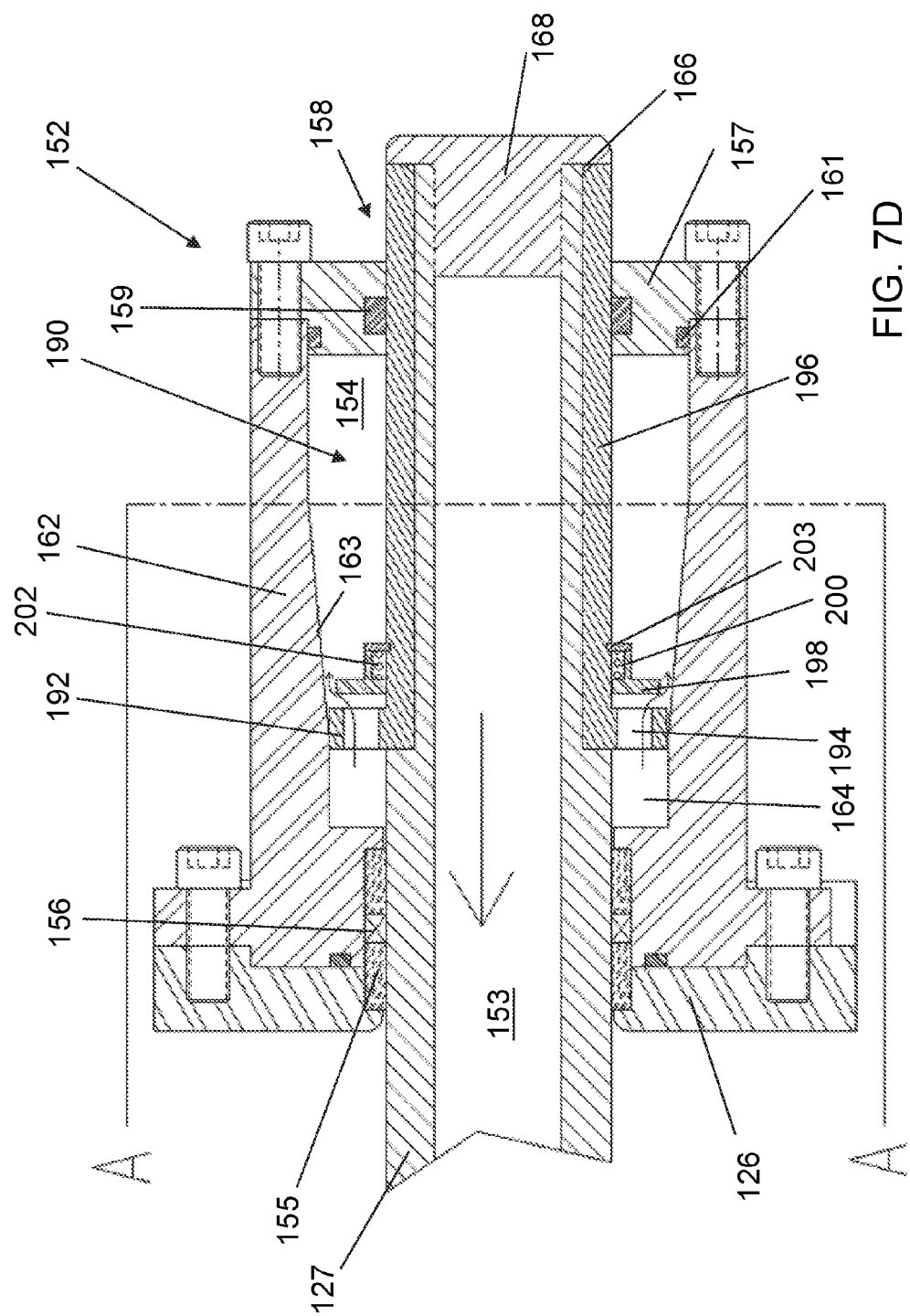
FIG. 7D is a longitudinal cross sectional view of an embodiment of a fluid filled speed controller in the set position in the further embodiment of the air gun of the present invention.
Figure 8B:
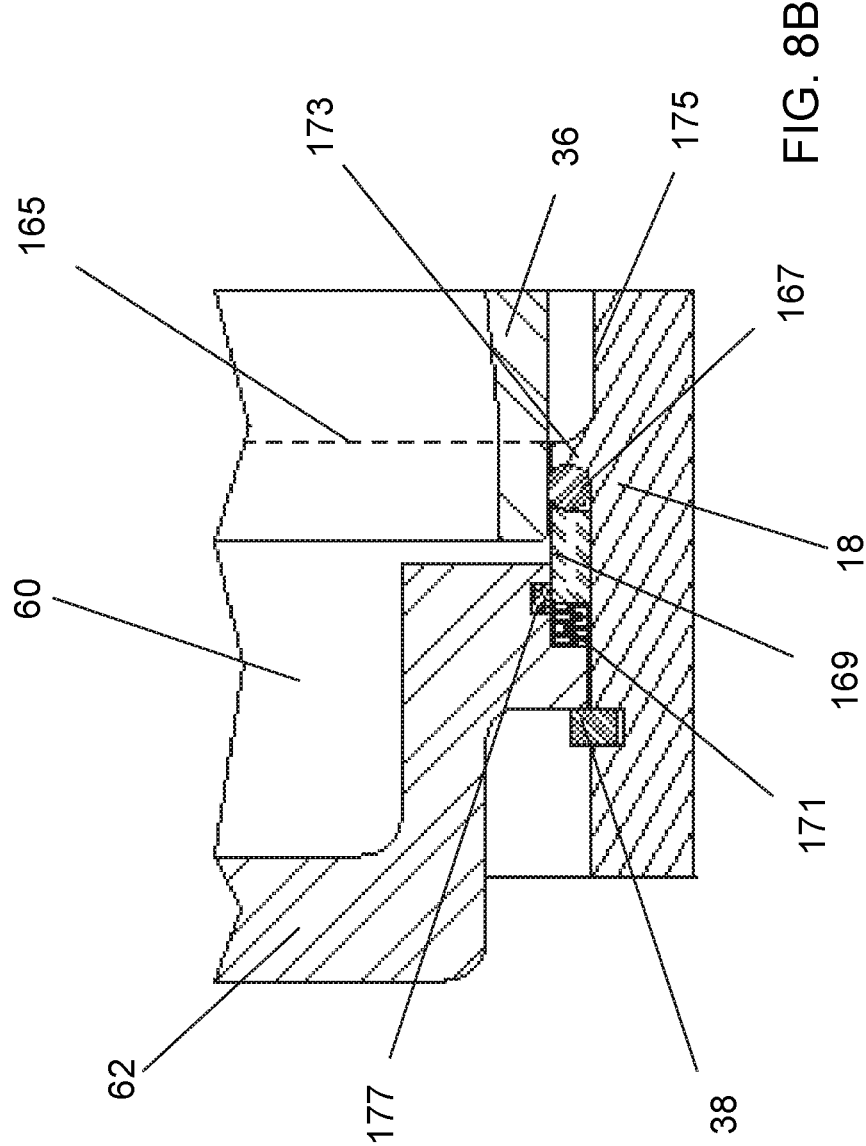
FIG. 8B is a cut away cross sectional view of an embodiment of the sliding firing seal and assembly of the air gun of the present invention.

When the air gun shuttle assembly shaft 127 is in the set position before triggering, the check valve piston assembly 190 is at the bottom of the speed controller housing 162 as shown in FIG. 7A where the clearance between the piston 192 and housing 162 is small. After triggering the shuttle assembly shaft 127 moves a short distance building pressure up in the housing 162 which acts against the top of the piston 192 and check valve plate 198 closing the holes 194 to retard and control the speed of the shuttle assembly as shown in FIG. 7C. The piston 192 starts to move with the shaft 127 over the outwardly tapered slope 163 of the housing bore 164 and as the shuttle assembly moves a greater distance, the diameter around the piston 192 increases which allows the shuttle assembly to move faster until a terminal velocity is reached by the designed clearance between the piston 192 and housing 162. Thus the speed of the shuttle assembly can be controlled by the length of the bore and contour of the slope of the speed controller housing 162. After the shuttle assembly halts its movement after firing it reverses itself to return to the set position and during the return stroke the check valve plate 192 of the hydraulic piston assembly 190 opens to allow free hydraulic fluid such as oil to flow so that the shuttle assembly can return freely to its set position, as shown in FIG. 7D. By controlling the speed of the shuttle assembly shaft 127 through the geometry of the hydraulic speed controller bore 164 and slope 163 of the housing 162 the rise time of the primary pressure or sound pulse of the air gun may be adjusted to control the frequency content of the outgoing pulse in order to eliminate undesired high frequencies from the pulse Another source of undesirable high frequencies may be due to an extended acceleration distance between the firing chamber seal and the discharge ports in air guns of the prior art. In some embodiments of the air gun of the present invention high frequencies may be reduced by providing a sliding firing seal 167 that is installed on the outer diameter of the cup shaped shuttle assembly flange 36 to minimize the acceleration distance and prevent the leakage of air prior to the end surface 172 of the cup 36 clearing the edge 165 of the port 70, as shown in FIG. 8A. The sliding firing seal 167, as shown in FIG. 8B is held securely between the contoured spring loaded back ring 169 and contoured shoulder 173 of the housing 18. A spring 171 is positioned within the spring loaded back ring 169 to provide the force to hold the firing seal 169 against the shoulder 173. In the set position the sliding firing seal 167 seals the outside diameter of the cup shaped firing piston 36 to retain the air within the firing chamber 62. A seal 177 seals the inside diameter of the spring loaded backup ring 169. The firing piston 36 rider bearing 179 is installed around the outer diameter of the upper portion of the cup shaped firing piston 36.

In embodiments of the present invention, the ports 70 are formed as a horizontal flat milled channel 175 that passes through each side of the housing 18. The width W of the ports 70 extends beyond the outer diameter OD of the cup shaped firing piston 36, as shown in FIG. 8A. By extending the width W of the milled channels 175 to form the ports 70 beyond the outer diameter OD of the firing piston 36 more air is expelled from the firing chamber for the shortest distance of travel of the shuttle assembly shaft 27, thereby minimizing the acceleration distance $T_D$ and improving the overall efficiency of the air gun 10.

In operation the shuttle assembly shaft 27 accelerates when the air gun 10 is triggered and the bottom outside diameter surface 163 of the cup shaped firing piston 36 moves until it passes the sealing surface of the sliding firing seal 167, as shown in FIG. 8B. The spring loaded backup ring 169 maintains force on the sliding firing seal 167 to prevent any leakage from around the outer diameter of the cup shaped firing piston 36. Therefore, while moving toward the edge of the ports 165 within the air gun housing 18 no compressed air is released from the compression chamber 30 during the acceleration distance $T_D$. The reduction of air leakage and lower velocity of air as it accelerates out of the ports 70 reduces the content of high frequencies in the outgoing pulse and differently from conventional air guns, may reduce cavitation in the water that may disrupt the marine ecosystem and cause damage to marine mammals. Between the ports 70 are strengthening horizontal divider posts 180 to give the air gun housing 18 rigidity between each of the four ports, as shown in FIG. 8C in cross section of section A-A shown in FIG. 8A. The non-machined out portions 193 of the cylindrical housing 18 form the flattened top and bottom inner surfaces 195 of the milled out channel 175 forming the discharge ports 70.

In further embodiments as shown in FIG. 9A, the upper portion of the firing chamber 62 is formed with an outer ring 184 and an inner rim 185 having a retainer lip 176 that holds the sliding O-ring firing seal 174. A spring loaded back ring 170 compresses the firing seal 174 against the retainer lip 176. The outer ring 184 of the firing chamber 62 is mounted against a shoulder 182 of the housing 18 and the inner surface 183 of the cup shaped flange 178 of the firing piston 36 seals against the firing seal 174 along the inner rim 185 of the firing chamber 62 creating a channel for the end portion 181 of the cup shaped flange 178 between the inner rim 185 of the firing chamber 62 and the housing 18, as shown in FIG. 9B. The rider bearing 179 positioned along a rear portion of the outer edge of the firing piston 36 creates clearance between the flange 178 and the housing 18 centering the firing piston 36 and guiding the cup shaped flange 178 around the inner rim 185 to seal against the firing seal 174 of the firing chamber 62. The bearing 179 prevents contact of metal on metal of the flange 178 with the housing 18.

As described herein, in the operation of the air gun 10 as a sound source for geophysical seismic studies and oil exploration there may be advantages gained by slowing and/or shaping the rise rate of the initial or primary pressure pulse. As shown in FIG. 10A, if the edge 172 of the cup shaped flange 178 of the firing piston 36 is formed with a squared nose end portion 181 with radiused corners, air is released through the ports 70 in direct proportion to the opening distance D as the cup shaped flange 178 moves from left to right when the air gun 10 is fired. In some embodiments of the air gun 10, the rise rate of the initial pulse may be slowed and the output characteristics of the output pulse may be adjusted by forming the milled channel 175 at varying depths and/or by having the milled channel 175 be formed in various shapes as shown in FIG. 10B. In further embodiments of the present invention, by sealing the inside surface 183 of the firing piston 36 against the outside diameter of the firing seal 174 of the firing chamber 62, the outer edge 187 of the cup shaped flange 178 may be machined backward at a straight angle, or as a contoured or rounded edge to modify the rise time and shape of the initial pulse. Adjustments to the length, angle or profile of the outer edge 187 may be changed as desired on alternate cup shaped flanges 178 of the firing piston 36. For example, the flow rate of compressed air as it bursts out through the discharge ports 70 may be adjusted to slow the rise time by forming the outer edge 187 with an inwards and backwards taper at an angle of 26.3° to the horizontal, as shown in FIGS. 11A and 11B with the ports in a rotated view from FIGS. 10A and 10B.

Figures 12A, 12B, 12C:
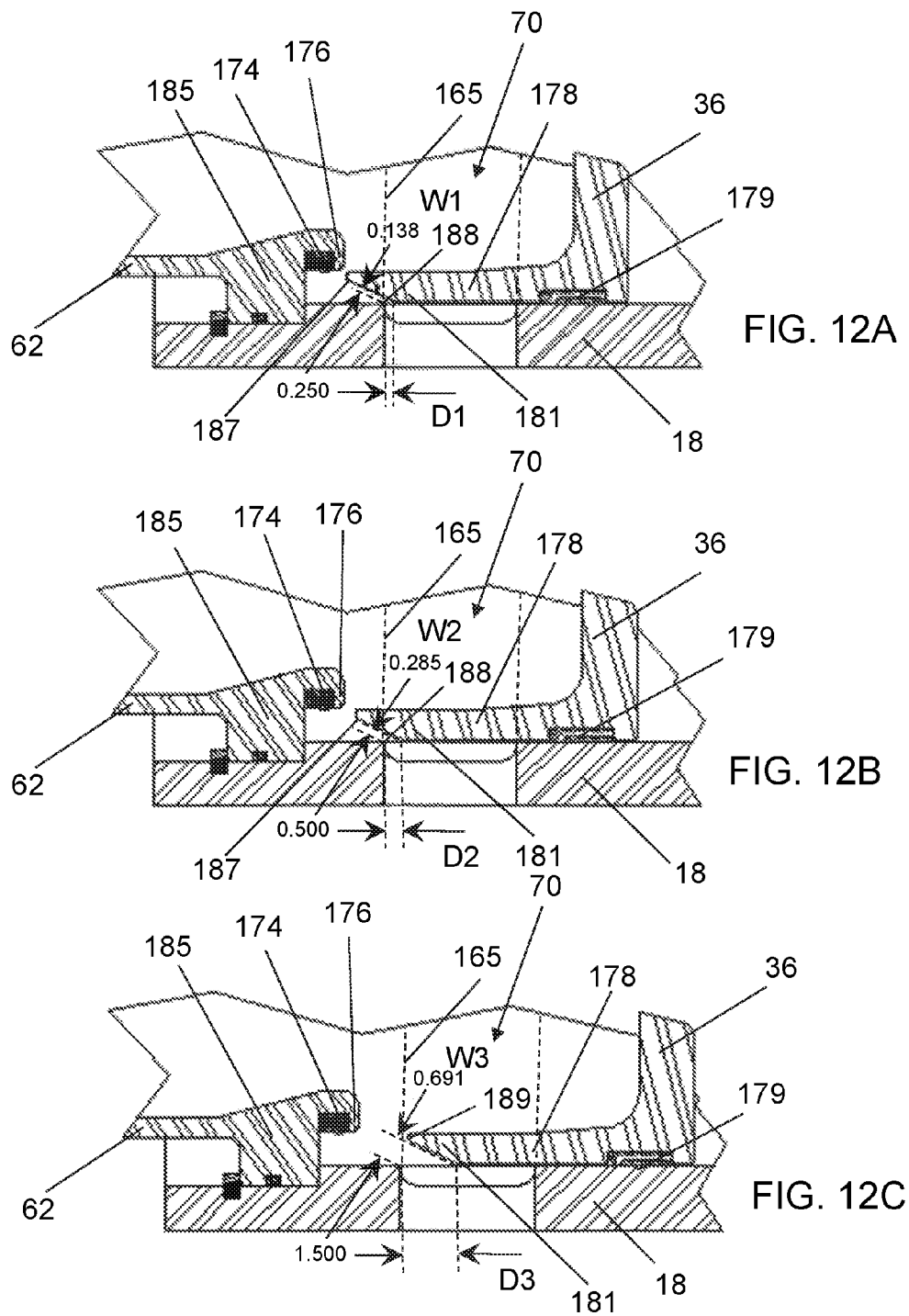
FIG. 12A is an inset of the longitudinal cross sectional view of the further embodiment of the firing chamber and the further embodiment of the cup shaped flange of the firing piston of the air gun of the present invention.
FIG. 12B is an inset of the longitudinal cross sectional view of the further embodiment of the firing chamber and a further embodiment of the cup shaped flange of the firing piston of the air gun of the present invention.
FIG. 12C is an inset of the longitudinal cross sectional view of the further embodiment of the firing chamber and a further embodiment of the cup shaped flange of the firing piston of the air gun of the present invention.

As the firing piston 36 moves from the set position, as shown in FIG. 11A, to the position shown in FIG. 12A a small circular crack D1 is opened up between the angled surface of the outer edge 187 of the cup shaped flange 178 and the top corner 188 of the first face along the opening edge 165 of the discharge ports 70. As shown in FIG. 12B, the small circular crack D1 becomes a larger circular opening D2 and then a much larger circular opening D3, as shown in FIG. 11C, as the firing piston 36 of the shuttle assembly shaft 27 moves left to right. However, for an equal distance traveled the area of the circular orifice is only one half of the area as with a cup shaped firing flange 178 with a squared nose end portion 181. For the straight angled surface 187 at the angle of 26.3° to the horizontal, the flow rate of the compressed air flow through the circular orifice is approximately the distance traveled times the mean circumference of the circular orifice divided by two thus slowing the egress of the compressed air and controlling and slowing the rise rate of the air gun initial or primary pressure pulse until the rounded nose 189 of the cup shaped flange 178 passes the top corner 188 of the first face along the opening edge 165 of the discharge ports 70. Assuming the cylindrical housing 18 of the air gun has a mean diameter of 25.4 cm (10 in) for all of the illustrated examples. In a first example, the circular orifice for the cup shaped firing flange 178 having the straight angled surface 187 at the angle of 26.3° to the horizontal has a width W1 of 0.351 cm (0.138 in.) when the firing piston 36 of the shuttle assembly shaft 27 moves to a distance D1 of 0.635 cm (0.250 in.) and the circular orifice has a cross-sectional area of 27.9 cm$^2$ (4.33 in$^2$) as shown in FIG. 12A, approximately half of the cross-sectional area at the same distance for the cup shaped firing flange 178 having a squared nose end portion 181. At distance D2 of 1.27 cm (0.500 in.), the circular orifice width W2 is 0.724 cm (0.285 in.) and the cross-sectional area is 61.22 cm$^2$ (9.49 in$^2$) as shown in FIG. 12B and for FIG. 12C at distance D3 of 3.81 cm (1.500 in.), the circular orifice width W3 is 1.76 cm (0.691 in.) and the cross-sectional area is 140 cm$^2$ (21.7 in$^2$). In an alternate configuration, as shown in FIG. 13A, the outer edge 187 of the cup shaped flange 178 is instead of a straight angle a sector of a circle having a radius of 1.91 cm (0.75 in) demonstrating the ability to regulate the flow of compressed air through the discharge ports 70 at a non-linear rate with the orifice sizes calculated from a mean diameter of 25.4 cm (10 in) for all of the illustrated examples. The cross-sectional area of the circular orifice is 11.5 cm$^2$ (1.79 in$^2$) at a distance D1 of 0.650 cm (0.256 in.) and width W1 of 1.44 cm (0.057 in.) for the circular orifice. At a distance D2 of 1.27 cm (0.500 in.) and width W1 of 0.304 cm (0.120 in.) for the circular orifice for FIG. 13B the cross-sectional area is 24.32 cm$^2$ (3.77 in$^2$) and at a distance D3 of 3.82 cm (1.506 in.) and a width W3 of the circular orifice of 1.61 cm (0.632 in.) the cross-sectional area is 128.09 cm$^2$ (19.85 in$^2$) for FIG. 13C for the same travel distances as the straight angle outer edge shown in FIGS. 12A, 12B and 12C. For air guns having different sized firing chambers and/or for different desired rise times, by changing the profile of the circular radius of the end portion 181, the length of the taper, and/or angle of the outer edge 172 of the cup shaped flange 178 adjustments may be made to the shape and rise time of the initial or primary pressure pulse. A tapered nose of the firing flange 178 as described herein may also be used as part of an air gun which does not use milled channel 175 such as in the air gun described in U.S. Pat. No. 8,223,591 to the same inventor where the back side 191 of the cup shaped firing flange 178 of the firing piston 36 facing the operating chamber 30 of the air gun reciprocates when operated within the volume of air of the air cushion chamber 50 essentially at a pressure equal to that of the surrounding water in which the air gun is operated.

Figure 14:
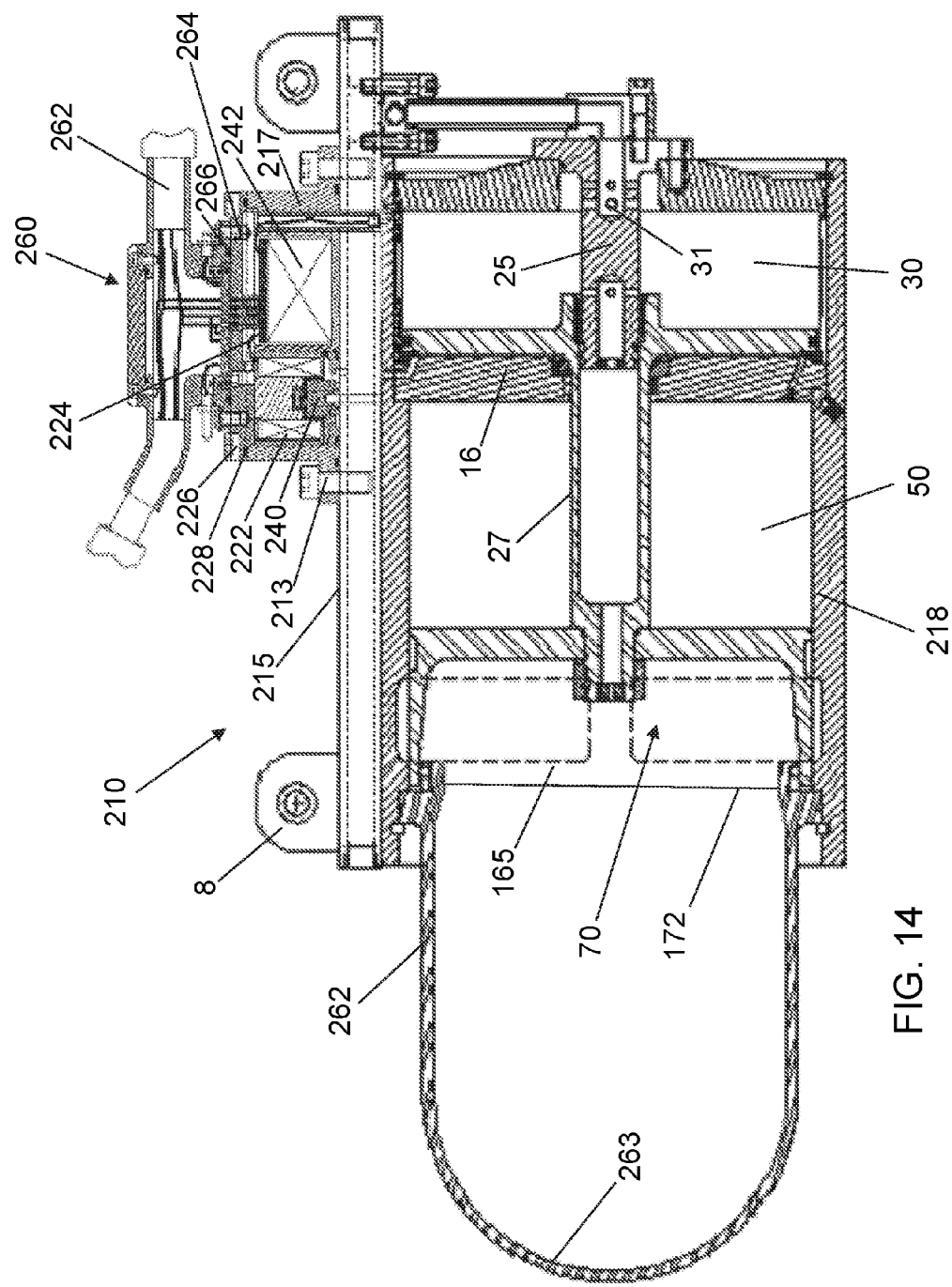
FIG. 14 is a cross-sectional view of a further embodiment of an air gun having a hollow in-line communications connector assembly mounted on the top of the solenoid valve, firing circuit housing assembly and a firing chamber.
Figure 15:
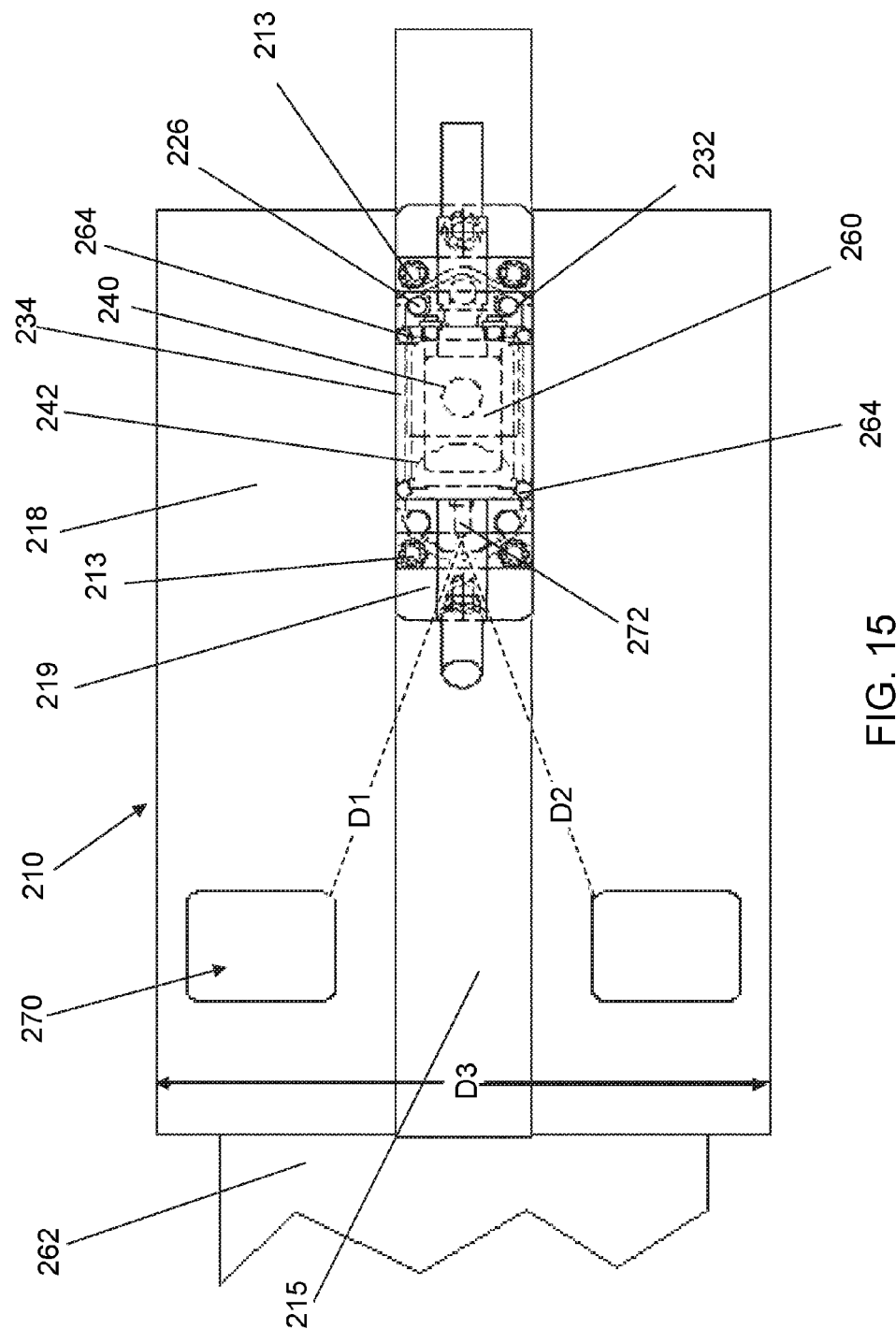
FIG. 15 is a top view of an air gun with the in-line communications connector assembly mounted on the top of the air gun illustrating the positions of the hydrophone the water pressure and water temperature sensors.

In some embodiments of the air gun 210 of the present invention, the reinforcing backbone 215 attached to the air gun housing 218 provides a flat top surface for mounting an air gun triggering solenoid valve housing 217 using mounting bolts 213 as shown in FIG. 14. Within the housing 217, an analog or digitally controlled firing circuit 242 produces an electric firing pulse to energize the solenoid valve assembly 240 through electrical leads 224. The solenoid valve assembly 240 has a cover 222 held in place with cover mounting bolts 226 and sealed with perimeter O-ring seal 228 at threaded plug 232 that allows for empty spaces to be filled with potting material before mounting an integrated communications connector 260. The housing 217 has a mounting flange 234 on its flat top surface for the attachment of the integrated communications connector 260 as shown in a top view of the air gun 210 in FIG. 15. The integrated communications connector 260 is secured by bolts 264 and sealed with perimeter O-ring seal 266.

The hollow in-line integrated communications connector 260 has a hydrophone 272 a water pressure sensor 274 mounted adjacent to a water temperature sensor 276. The temperature sensor 276 monitors the water temperature and the pressure sensor 274 monitors the water pressure that corresponds to the air gun 210 operating depth. The hydrophone 272 is conveniently located facing the air discharge ports 270 symmetrically with no structures between the ports 270 and the hydrophone 272 thus being able to faithfully report the acoustic signature of the air gun pulse. The hydrophone 272 is located symmetrically from top front corners of the air gun pulse output ports 270 making distance D1 equal to distance D2 providing an accurate reception of the near-field signature of the air gun pulse where the equal distances D1 and D2 are also less than the diameter D3 of the air gun housing 218.

Figure 16:
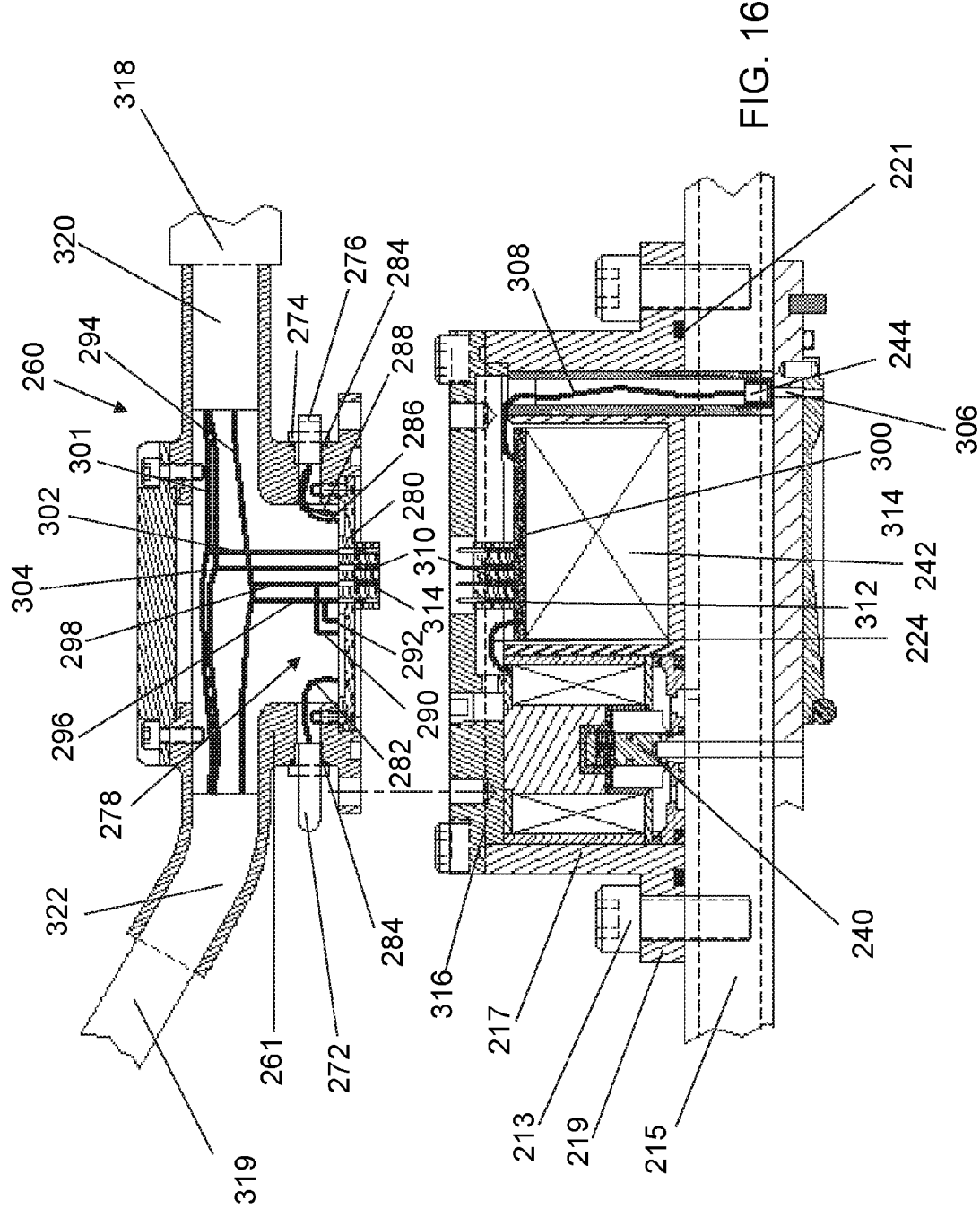
FIG. 16 is a cross-sectional view of the in-line communications connector assembly with the solenoid valve and firing circuit housing assembly.

As shown in FIG. 16, the hydrophone 272 is electrically connected to circuit board 280 by electric lead wires 282 and sealed by the use of O-ring seals 284. The pressure sensor 274 and temperature sensor 276 are similarly sealed using O-ring seals 284 and connected to the circuit board 280 using electric lead wires 286 and 288. There is a rectangular shouldered recess 278 within the integrated communications connector housing 261 in which electronic circuit board 280 is located for processing the signals from the hydrophone 272, the water pressure sensor 274 and the water temperature sensor 276. The electronic circuit board 280 also controls the flow of electric power to the firing circuit 242 through electric lead wires 290 and 292 and the main electric power cable 294 carries electric power to power leads 296 and 298 to supply electricity to the communications connector circuit board 280 and to the circuit board 300 for the firing circuit 242. The firing circuit board 300 receives signals for firing the air gun 210 through a main communication cable 301 to communication lines 302 and 304 and transmits signals to the solenoid valve 240 through electric wire lead 224 for firing. When the air gun 210 fires an air pressure spike enters the time break passage 306 as in other air guns such as air gun U.S. Pat. No. 8,223,591 and acts upon time break transducer assembly 244 causing an electric pulse signal. The firing circuit board 300 processes the time break signal from time-break transducer assembly 244 through electric lead wire 308 and transmits the electric pulse signal through communication lines 302 and 304.

The electronic communication lines 302 and 304 carry and communicate digital or analog signals to and from electronic boards 280 and 300 to digital (such as a CAN BUS electronic communication transmission system circuits) or analog electronic communication system circuits from and to the exploration vessel towing and controlling the air gun or air guns for seismic exploration. A two part multi pin connector 310 with male pins 312 on the bottom half and female sockets 314 on the top for example, enable the connector assembly 310 to be plugged into and electrically connected or removed from the valve cover 316 of the solenoid valve housing 317 without disturbing any electrical wiring.

Figure 17:
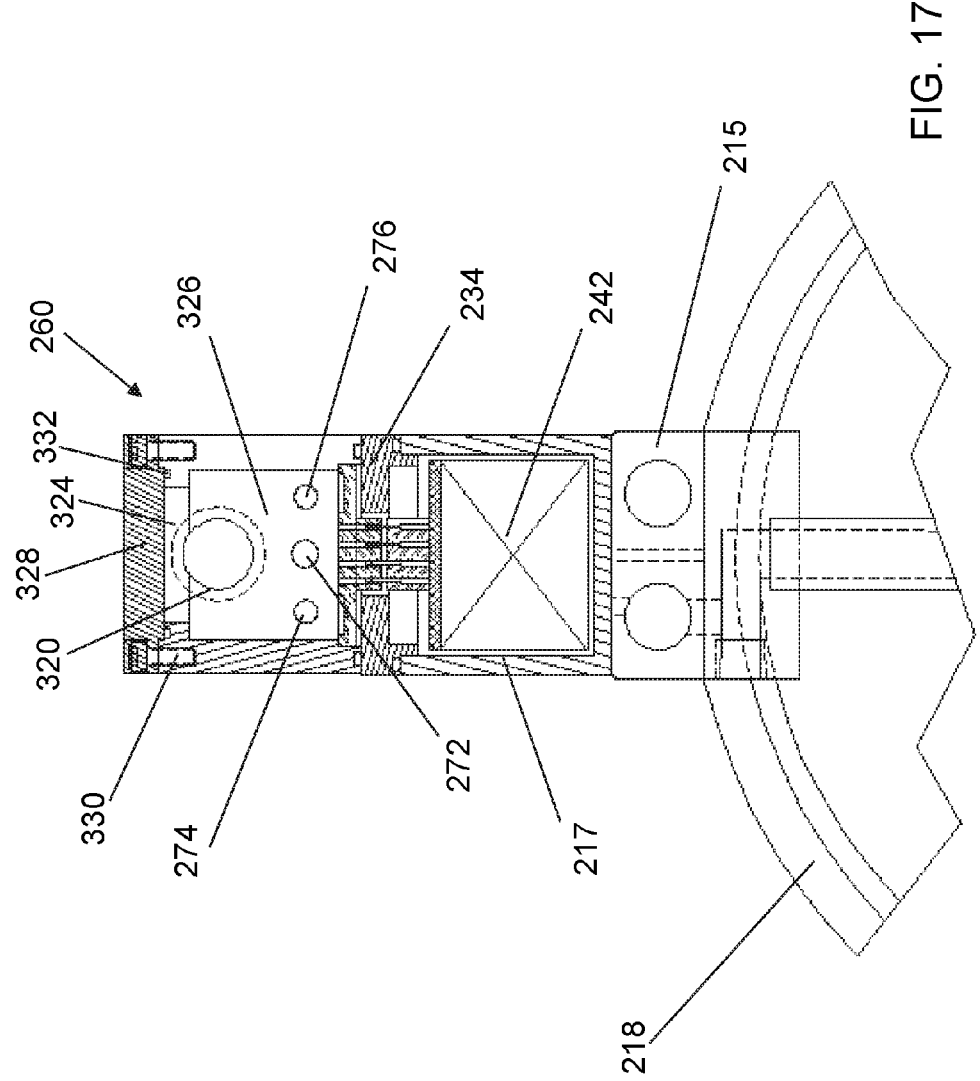
FIG. 17 is a front elevation view of the in-line communications connector assembly mounted on the top of the solenoid valve and firing circuit housing assembly.

A heavy duty rough service electric cable assembly 318 coming from the exploration vessel is secured and fluid sealed at the straight tubular front end 320 of the connector assembly 260. A similar type of rough service cable assembly 319 combines the main electric power cable 294 with the main communications cable 301 in a bundle with the power wire leads 296 and 298 and communications lines 302 and 304 extending from the cable assembly 319 within the integrated communications connector housing 261. The cable assembly 319 shields and seals the main cables 294 and 301 and extends the cables 294 and 301 from the housing 261 through the rigid tubular back end 322 of the connector assembly 260. The back end 322 of the connector assembly 260 may curve upward in order to keep the cable assembly 319 a safe distance above the area where the air bubble comes from the air gun ports 270 when the air gun is fired to prevent the bubble or bubble pulse from damaging the cable assembly 319. As shown in FIG. 17, a rectangular port 324 allows access to the electric connections and wires within the connector chamber 326 and for filling the chamber with potting material to prevent movement of the wires and cables during operation of the air gun. A cover 328 is secured by cap screws 330 and the cover 328 is sealed with O-ring seal 332. Using mounting bolts 213 and sealed with O-ring seal 221, the mounting flange 219 of the solenoid valve housing 217 is secured to the flat top surface of the backbone 215 that is vacuum brazed to the air gun housing 218.

Figure 18:
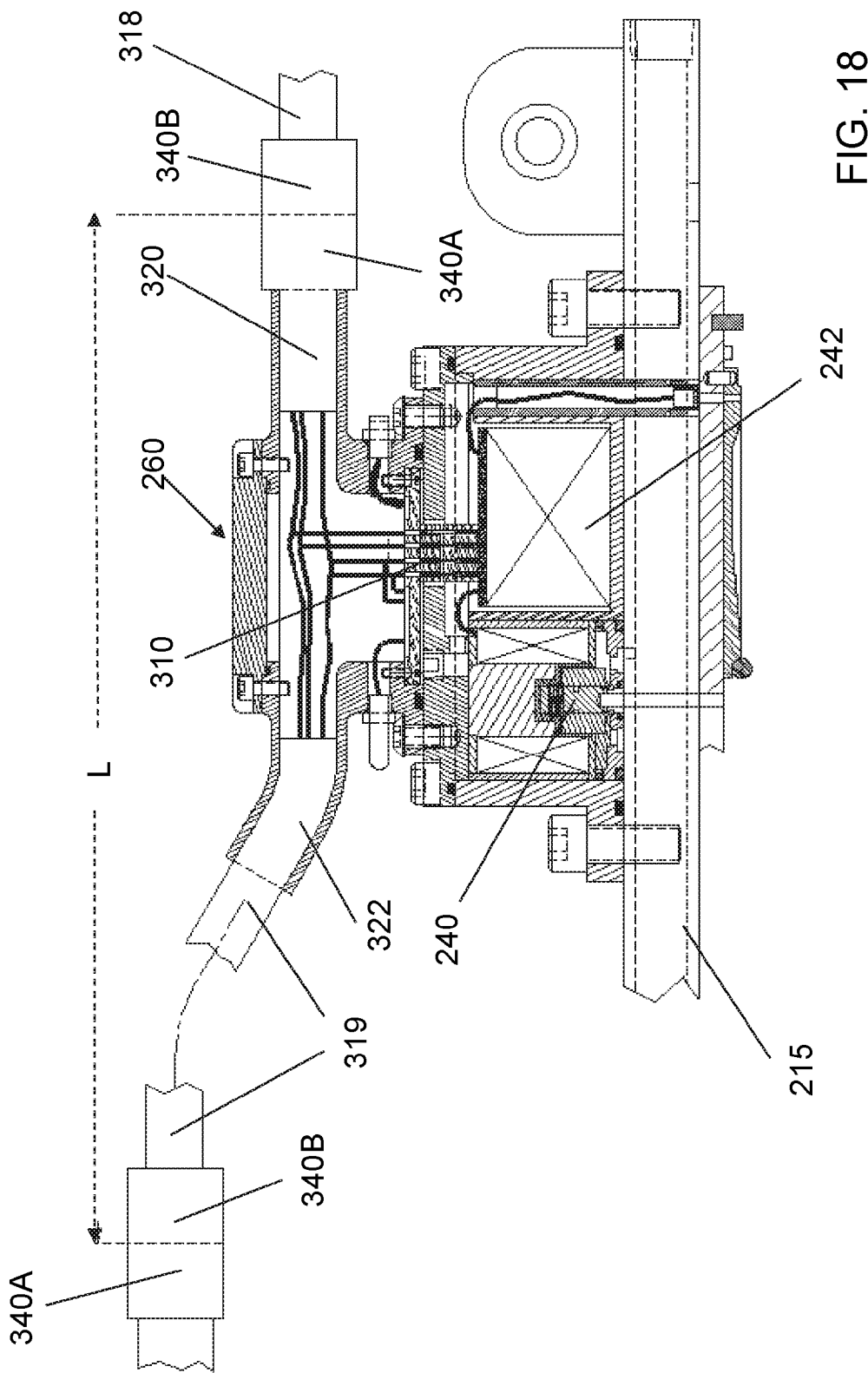
FIG. 18 is a cross-sectional view of the in-line communications connector assembly with cable assembly mounted on the top of the solenoid valve and firing circuit housing assembly.

As shown in FIG. 18, a heavy duty multi-pin sealed in-line electrical connector assembly 340A and 340B having the correct pin configuration to service the cable assembly 318 is shown on the front end 320 of the integrated communications connector assembly 260. The integrated communications connector assembly 260 with the attached cable assembly 319 may be of any appropriate length with the cable assembly 319 extending to a second heavy duty multi-pin sealed in-line electrical connector assembly 340A and 340B. The length of the cable assembly 319 with the in-line connector assembly 260 determines the spacing distance L between separate air guns in an air gun array thus providing for the air guns with the chosen cable and connector lengths to be modular interchangeable parts within the air gun array system making it possible to replace defective air guns or cable sections and redeploy the air gun system without the time consuming need to operate and repair the internals of a defective air gun.

The present invention as described here-in is an improvement over designs of the prior art because commonly the solenoid valve housing including the firing circuit and time break transducer is hard wired through for example a multipurpose manifold assembly making those two parts captive to each other and thus making it necessary to remove and replace both components even if only one would be in need of replacing. The present design allows either the solenoid valve assembly 240 or the connector assembly 260 to be changed independently of the other using the multi-pin connector 310 to separate the communications connector assembly 260 from the solenoid valve housing 217 without disturbing any of the wired assemblies and connections. Another improvement of the integrated communications connector assembly 260 is the inclusion of the near-field hydrophone sensor 272, the water pressure sensor 274, and temperature sensor 276 within one connector assembly providing for ease in mounting sensors to the air gun 210 and in repair and replacement of sensors, the complete connector 260 and/or the complete air gun 210 in the case of failure of components.

Figure 19:
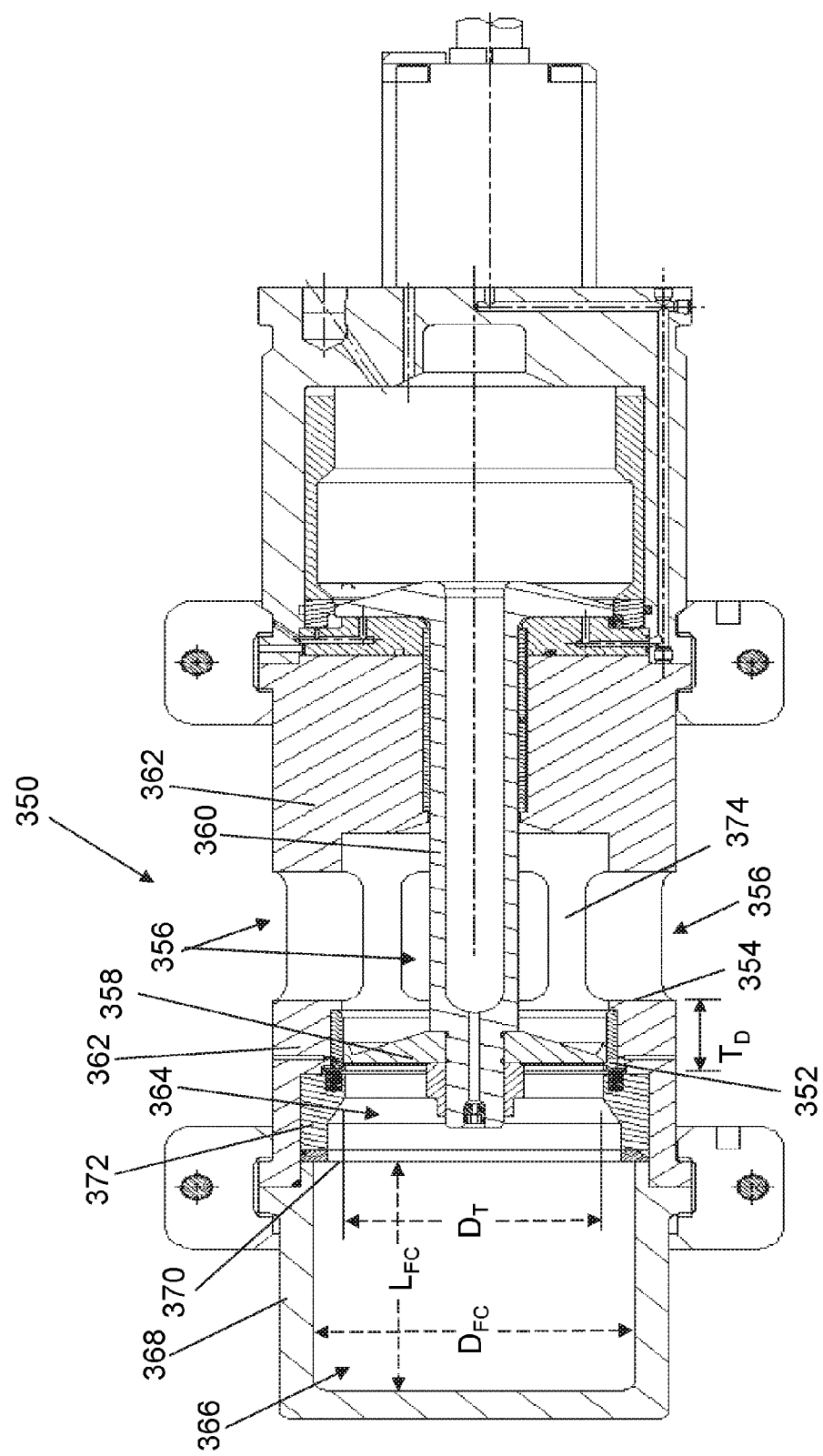
FIG. 19 is an embodiment of a conventional air gun of the prior art.

Other improvements over air guns of the prior art are a unique and beneficial method and apparatus for tuning the primary pressure pulse of the air gun of the present invention by adjusting the length of the firing chamber. Embodiments of the air gun of the present invention also includes zero acceleration distance, elimination of air leakage during shuttle acceleration and the elimination of the water gun effect by not expelling water during firing of the air gun. As shown in FIG. 19, a conventional air gun 350 of the prior art produces undesirable high frequencies during the primary pressure pulse. One of the causes of high frequencies is a longer acceleration distance $T_D$ from the firing seal 352 to the opening edge 354 of the discharge ports 356. The longer acceleration distance causes the firing piston 358 of the shuttle assembly 360 to accelerate while still within the cylindrical housing 362 without the release of air except for leakage between the firing piston 358 and the housing 362 before the air is released through the discharge ports 356. The air leakage produces undesirable high frequency hissing as air escapes around the firing piston 358.

Figure 20:
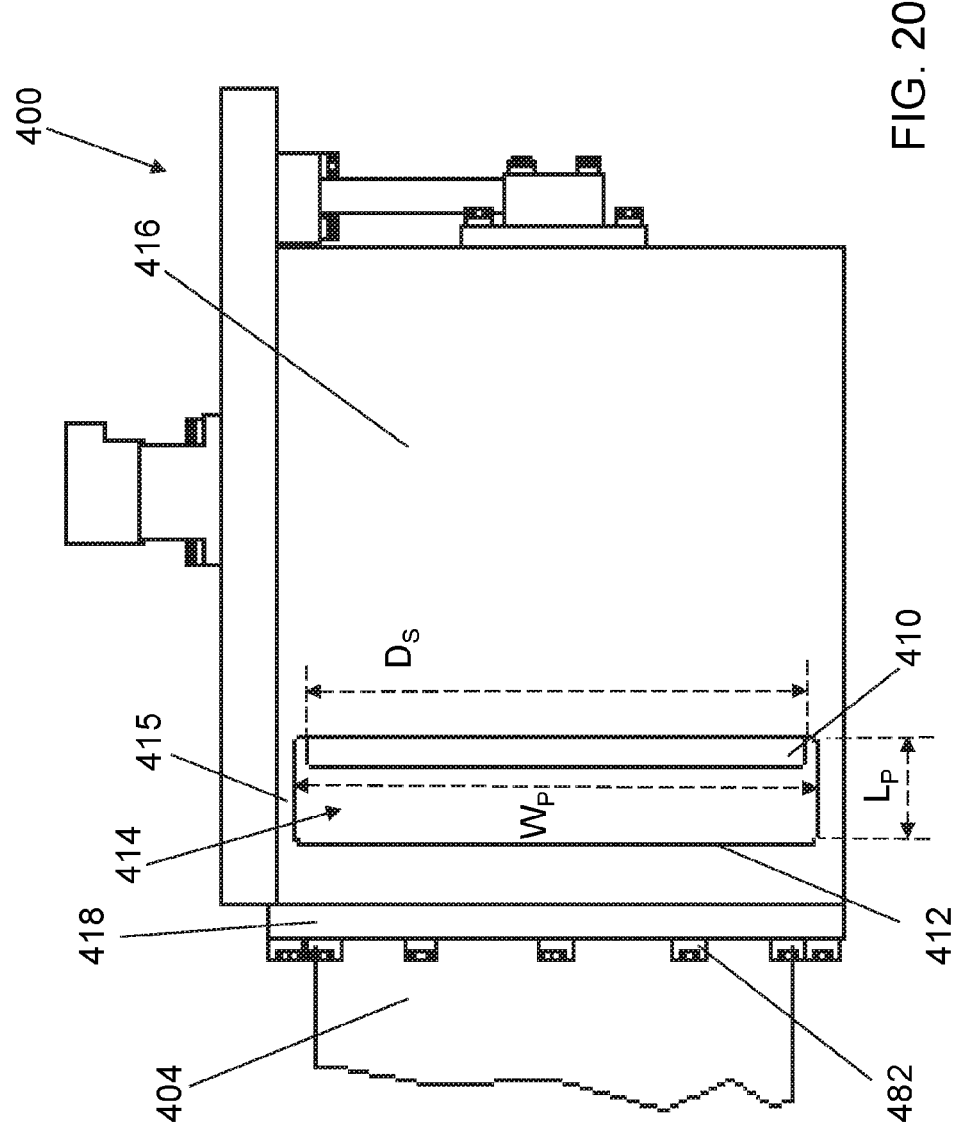
FIG. 20 is an elevation view showing the rectangular shaped discharge ports in an embodiment of the air gun of the present invention.

Another source of cavitation and undesirable high frequencies, as shown in FIG. 19, in conventional air guns of the prior art is having water behind the firing piston 358. instead of an air cushion chamber as shown in embodiments of the present invention. In an air gun of the prior art water is forced out through the ports 356 creating turbulence and cavitation when the air gun 350 is fired. Embodiment of the air gun of the present invention includes an air cushion chamber behind the firing piston reducing turbulence and cavitation when firing the air gun. Undesirable high frequencies may also be due to a narrowing throat 364 between the internal bore 366 of the firing chamber 368 and the discharge ports 356. As shown in FIG. 19, in conventional air guns, the port exit area includes air flow restrictions due to a change from the larger diameter DFC of the firing chamber 368 to the smaller diameter of the throat DT. The throat 364 extends from the port end 370 of the firing chamber 368 to the discharge ports 356. The changes in diameter may be from restriction or protrusions along the cylindrical housing 362 or from the firing seal retainer assembly 372. As shown the in FIG. 19, the throat 364 has a diameter DT that is much less than the inside diameter DFC of the firing chamber 368. As an example, the diameter DFC of the firing chamber of a Bolt Technology Corp model 1500LL air gun is about 1.5 times the diameter of the throat diameter DT and other conventional air guns have similar throat restrictions. When the air gun 350 is fired and the firing piston 358 of the shuttle assembly 360 accelerates, restrictions or protrusions within the throat 364 produce high frequencies by generating turbulence or hissing as the compressed air is redirected as it is forced through the smaller throat opening as it rushes from the firing chamber 368 to exit through the discharge ports 356. High frequencies and cavitation may also be caused by the posts 374 that separate the discharge ports 356 where typically conventional air guns have four separate ports 356. The posts 374 cause turbulence and cavitation by splitting the explosive streams of air when the air gun is fired. As shown in FIG. 20, the discharge ports 414 of the present invention are formed from a milled out channel 415 through the cylindrical housing 416 that forms rectangular shaped discharge ports 414 having a continuous length $L_P$ and a width $W_P$ that extends beyond the outer diameter $D_S$ of the firing piston 410 to provide a larger communication area of air expelled to the outside water for the least amount of travel of the shuttle assembly as compared to conventional air guns. In air guns of the prior art such as in Chelminski U.S. Pat. No. 3,379,273 and Hopperstad U.S. Pat. No. 7,321,527, V or angular shaped ports are disclosed. The width of the non-rectangular ports increases as the firing piston moves past the port. By releasing air out through a small opening that then enlarges cavitation and high frequency hissing is produced, which may in air guns of the prior art be another source of undesirable high frequencies. In contrast, the air gun of the present invention provides a port exit area that is at a linear function of the shuttle position over the gas-release cycle. As shown in FIG. 20 the continuous linear edge 412 and rectangular opening of the discharge port 414 reduces cavitation and undesirable high frequencies.

Figure 21:
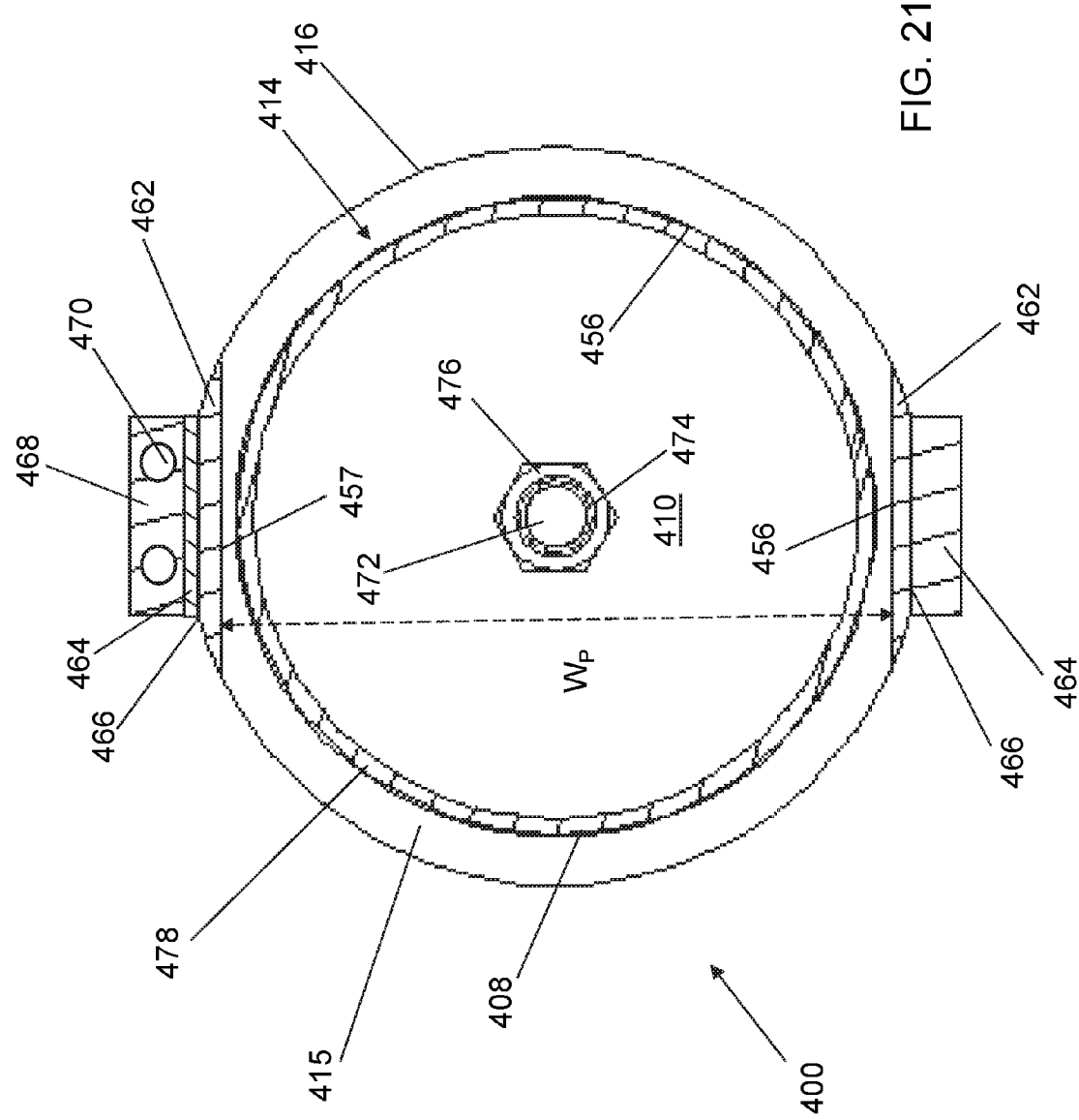
FIG. 21 is a cross sectional view showing the width of the discharge ports in an embodiment of the air gun of the present invention.

As shown in FIG. 21 in some embodiments, the horizontal flat milled channel 415 extends completely through the cylindrical housing 416 forming a 360° port outlet. The non-machined out portions 462 of the cylindrical housing 416 form the flattened top and bottom inner surfaces 457 of the milled out channel 415. A stiffening bar 464 may be vacuum brazed or bolted to the upper and/or lower outer surface 466 of the housing 416. An air passage manifold and backbone 468 may be vacuum brazed or bolted to an upper stiffening bar 464 to provide compressed air to the air gun 400 through air passages 470. A solenoid valve housing (not shown) may be bolted to the backbone to provide a solenoid valve and control circuitry. The rate of air flow to the firing chamber 404 is controlled by an outlet orifice 472 that extends through the shaft 480 of the shuttle assembly 474. The cup-shaped flange 408 of the firing piston 410 is secured to the shuttle assembly 474 using a nut 476. The edge 478 of the cup-shaped flange 408 is surrounded by and sealed against the O-ring firing seal 402 in a closed positioned and exposed to the continuous 360° flat milled channel 415 in an open position. The channel 415 extends through the housing 416 to form the ports 414 providing for as much air as possible to be expelled from the firing chamber with the shortest acceleration distance $T_D$ of travel of the shuttle assembly 474 improving the overall efficiency of the air gun 400.

Figure 22:
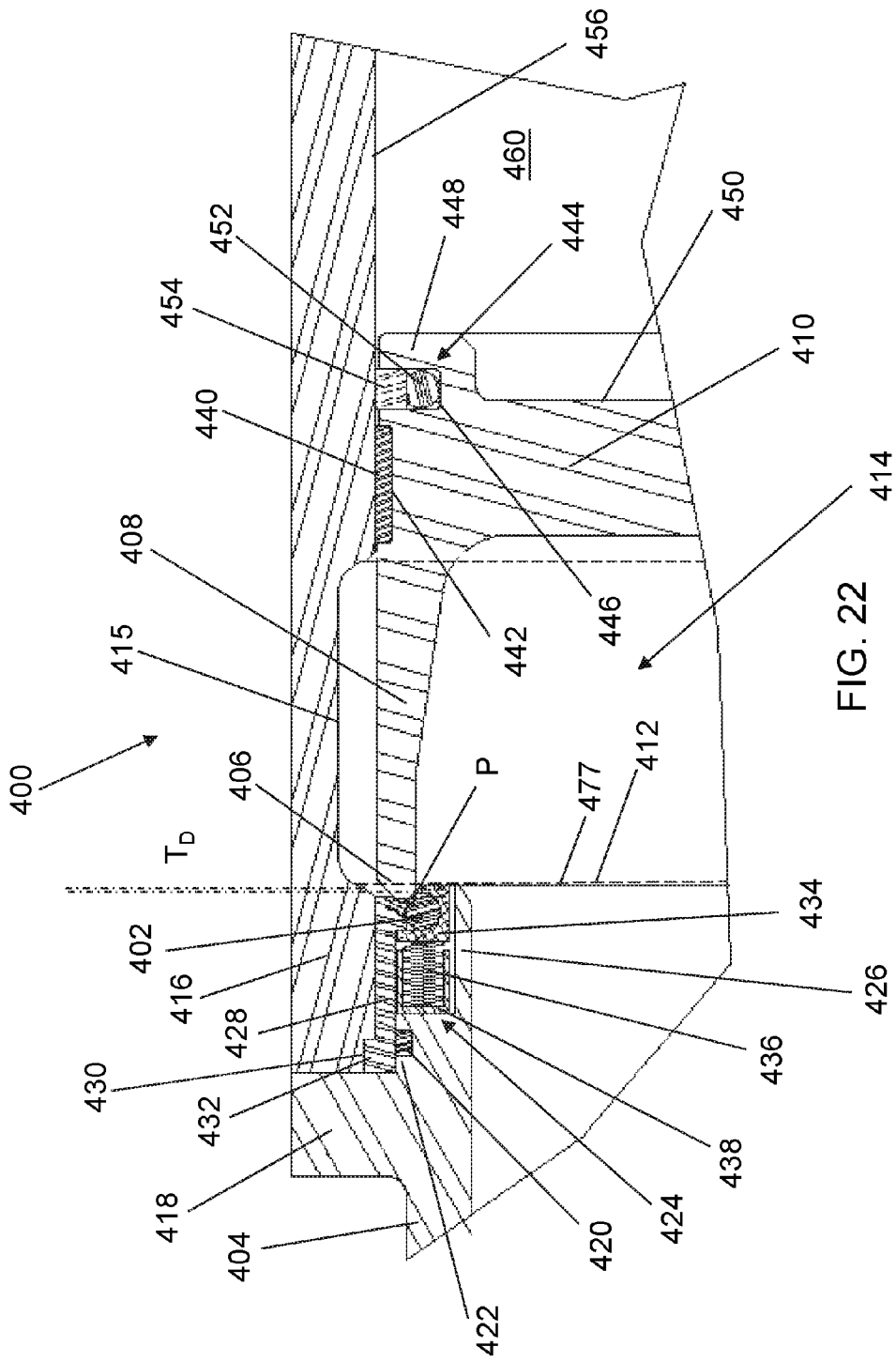
FIG. 22 is the cut away view of the port exit area having zero acceleration distance showing an embodiment of the firing seal retainer assembly and firing seal that seals on the inside corner of the cup shaped flange of the firing piston in an embodiment of the air gun of the present invention.

The inner edge 412 of the discharge ports 414 that is adjacent to the firing seal 402 is a continuous uniform circle around an inner circumference of the housing 416. As shown in the cut away view of the port exit area in FIG. 22, the acceleration distance $T_D$ is completely eliminated, because the point of contact P of the firing seal 402 of the firing chamber 404 is at the inside diameter radius of the end nose 406 along the edge 478 of the cup-shaped flange 408 of the firing piston 410 and the port end of the firing chamber 477 is directly adjacent to the inner edge 412 of the ports 414 of the air gun 400. In the embodiment as shown, the cylindrical housing 416 of the air gun 400 abuts the firing chamber 404 along an outer flange 418. A firing chamber O-ring seal 420 is provided within a groove 422 of the firing chamber 404 and a circular seal retainer assembly 424 is positioned around a boss extension 426 of the firing chamber 404. An adaptor ring 428 locks against and holds the seal retainer assembly 424 in place. A recess 430 within the cylindrical housing 416 may be provided to seat a rim 432 of the adaptor ring 428 against the housing 416. The circular seal retainer assembly 424 has springs that align and hold the O-ring firing seal 402 against the radius of the inner diameter of the end nose 406 of the cup-shaped flange 408 of the firing piston 410 until the air gun 400 is fired. The seal retainer assembly 424 comprises an O-ring firing seal 402 installed around a contoured seal retainer 434 and springs 436 within a circular spring retainer 438. The circular seal retainer 434 rests against and is supported on the springs 436 so that the compression springs 436 press against the seal retainer 434 and force the firing seal 402 to push against the firing piston 410 to prevent the release of air from the firing chamber 404 until the firing piston 410 moves past the opening edge 412 of the ports 414 when the air gun 20 is fired. By forming a smooth rounded contour within the seal retainer 434, the lifetime of the O-ring firing seal 402 may be prolonged as sharp edges that may damage the firing seal 402 are removed. The contoured seal retainer 434 also positions the firing seal 402 along the outer, upper edge of the firing chamber 404 so that the boss extension 426 extends slightly into the cup shaped flange 408 and housing 416 to seal the firing chamber 404 to the firing piston 410 directly adjacent to the inner edge 412 of the discharge ports 414 to eliminate the acceleration distance $T_D$.

As shown in the embodiment of the air gun 400, a shuttle guide bearing 440 is positioned within a groove 442 along the outer diameter of the firing piston 410. The shuttle guide bearing 440 aligns the firing piston 410 within the cylindrical housing 416 of the air gun 400. The air gun 400 may also have a sliding seal assembly 444 placed within a groove 446 of an extended boss 448 that extends from the rear surface 450 of the firing piston 410. The groove 446 is formed along the outer diameter of the firing piston 410. The sliding seal assembly 444 has an O-ring 452 within an inner portion of the groove 446 that supports and presses a sliding seal ring 454 along the inner surface 456 of the cylindrical housing 416. By having the sliding seal assembly 444 along the outer diameter of the firing piston 410, the air within the air cushion chamber 460 is retained as the firing piston 410 moves along the inner surface 456 of the cylindrical housing 416. As the firing piston 410 moves, the sliding seal assembly 444 prevents compressed air within the air cushion chamber 460 from moving past the shuttle guide bearing 440 and out through the discharge ports 414. The sliding seal assembly 444 also serves as a seal against water, oil or other contaminants from leaking past the shuttle guide bearing 440 and into the air cushion chamber 460 as might happen if the air gun 400 is left submerged without being fired. The air gun 400 may at times be fired within water or oil wells where there may be mud sand or other types of gritty material entrained within the fluid in the well. If water, oil or other contaminants fills or partially fills the air cushion chamber 460 it might interfere with the air gun 400 properly firing by blocking the firing piston 410 from completing its full stroke. The sliding seal assembly 444 on the outside diameter of the firing piston 410 can prevent the grit or other material from working its way into the air cushion chamber 460. The sliding seal assembly 444 may also act as a wiper to remove contaminants and prevent the grit from coating along the inner surface 456 of the cylindrical housing 416 thereby allowing the firing piston 410 to ride freely within the bore of the air cushion chamber 460 which is advantageous in the case where the air gun 400 may be operated in dirty sea water or accidentally dragged along the water bottom when being fired.

Figure 23:
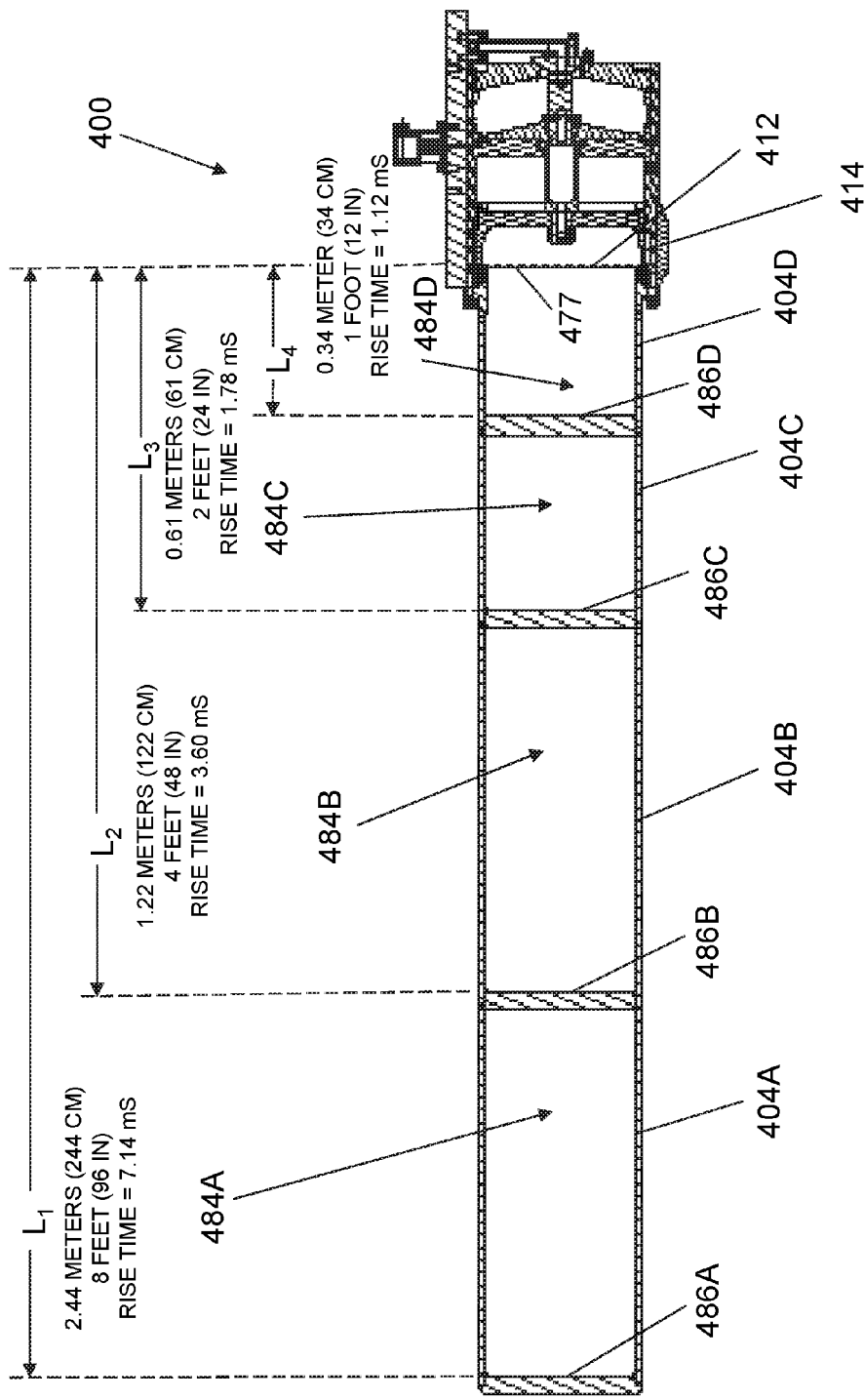
FIG. 23 is an illustration of different length firing chambers that may be attached to embodiments of an air gun of the present invention showing the calculated rise time for each firing chamber length.

In contrast to the prior art, control of the air gun pulse rise time and slope is accomplished by selecting a firing chamber of a specific length A firing chamber 404 of a desired length may be attached using bolts 482 to attach the outer flange 418 of the firing chamber 404 to the cylindrical housing 416 of an air gun 400. The firing chamber 404 may be permanently attached or be removed and replaced with a firing chamber 404 of a different length to adjust the rise time as desired based on the requirements of a seismic survey. Air guns 400 having different length firing chambers 404 may be used within an array to tune the amplitude and frequency content of the array to suit survey requirements. In order to adjust the rise time of the primary pressure pulse, the firing chamber 404 is chosen to a length that is based on the speed of sound in air accepted as 0.343 meters per millisecond (m/ms) (1.126 feet per millisecond (ft/ms)). The rise time of the primary pressure pulse may therefore be adjusted by one millisecond for every 0.343 m (1.126 feet) of length L of the internal length of the bore 484 as measured from the longest length from the internal end surface 486 to the edge of the discharge ports 412. In some embodiments, the port end 477 of the firing chamber 404 is adjacent to the edge of the discharge ports 412 providing zero acceleration distance. As shown in FIG. 23, the calculated adjustment of the rise time based on the internal length of the bores 484A-484D is shown for four firing chambers 404A-404D having lengths $L_1$ to $L_4$ respectfully. The rise time is calculated by dividing the length L of the firing chamber 404 by the speed of sound in air. For example, by attaching a firing chamber 404A having an internal length $L_1$ of 2.44 m (8 ft) will produce an initial pulse having a rise time of approximately 7.11 milliseconds. The calculated rise time is determined by dividing the length of 2.44 m (8 ft) of the firing chamber by 0.343 m/ms (1.126 ft/ms) the speed of sound in air. Using a firing chamber 404B having an internal length $L_2$ of 1.22 meters (4 feet), the calculated rise time of the initial pulse is 3.55 milliseconds. Using a firing chamber 404C with a length $L_3$ of 0.61 m (2 feet), will produce a primary pressure pulse having a rise time to peak of approximately 1.78 milliseconds and a firing chamber 404C having a length $L_4$ of 0.30 m (1 foot), will produce a primary pressure pulse having a rise time to peak of approximately 0.89 milliseconds. Therefore, embodiments of the air gun 400 of the present invention provide for the selection of a firing chamber 404 having a specific length to tune the rise time of the primary pressure pulse which also adjusts the slope and frequency content of the output pulse. While the selection of a firing chamber based on volume is well known based on the desired stored energy and operating pressure of the air gun, the present invention provides for the selection of the parameters of an air gun to also be based on the length of the firing chamber thereby tuning the rise time of the primary pressure pulse as desired.

Figure 24A:
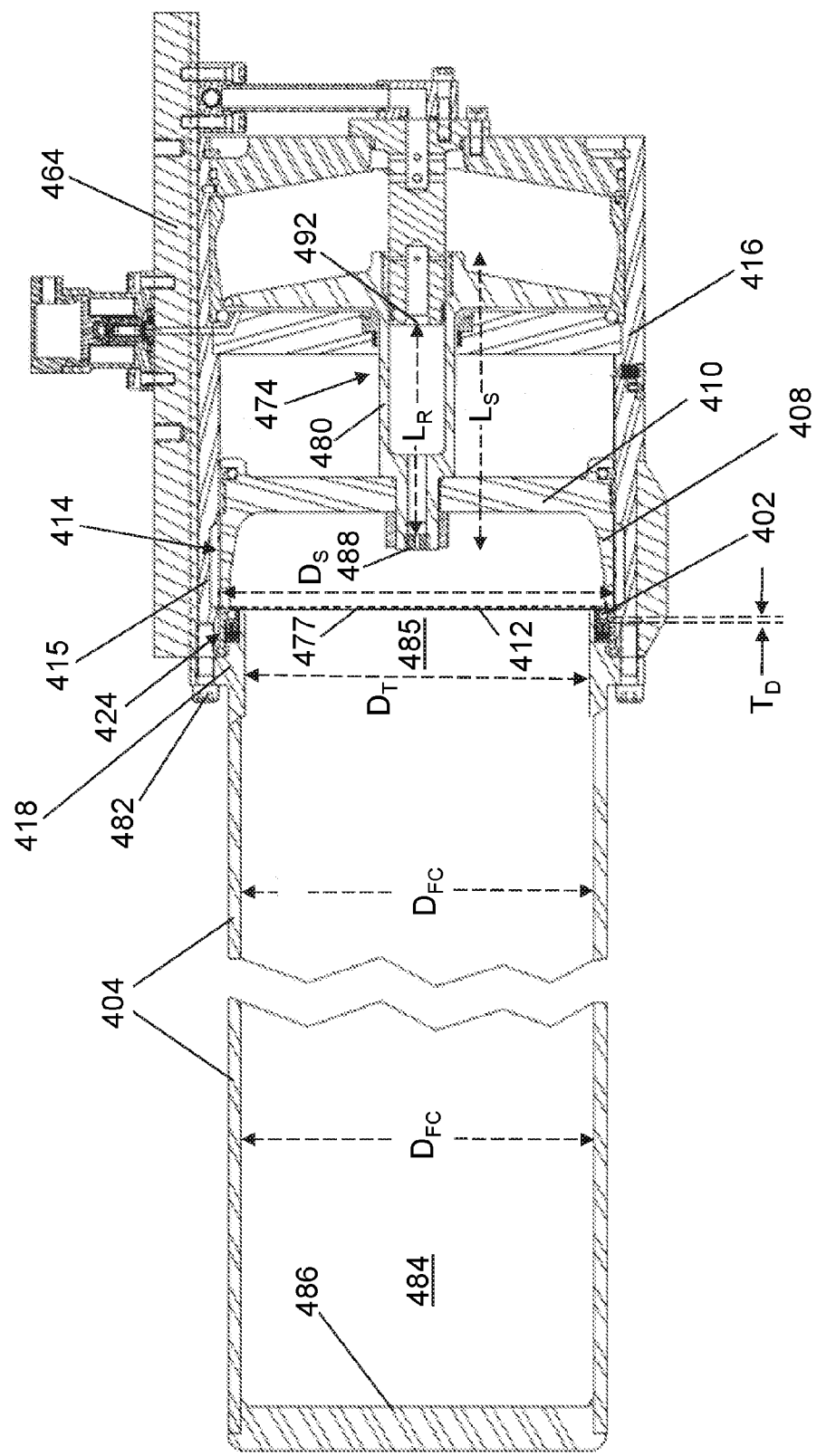
FIG. 24A is an embodiment of an air gun of the present invention in the closed ready to trigger position.
Figure 24B:
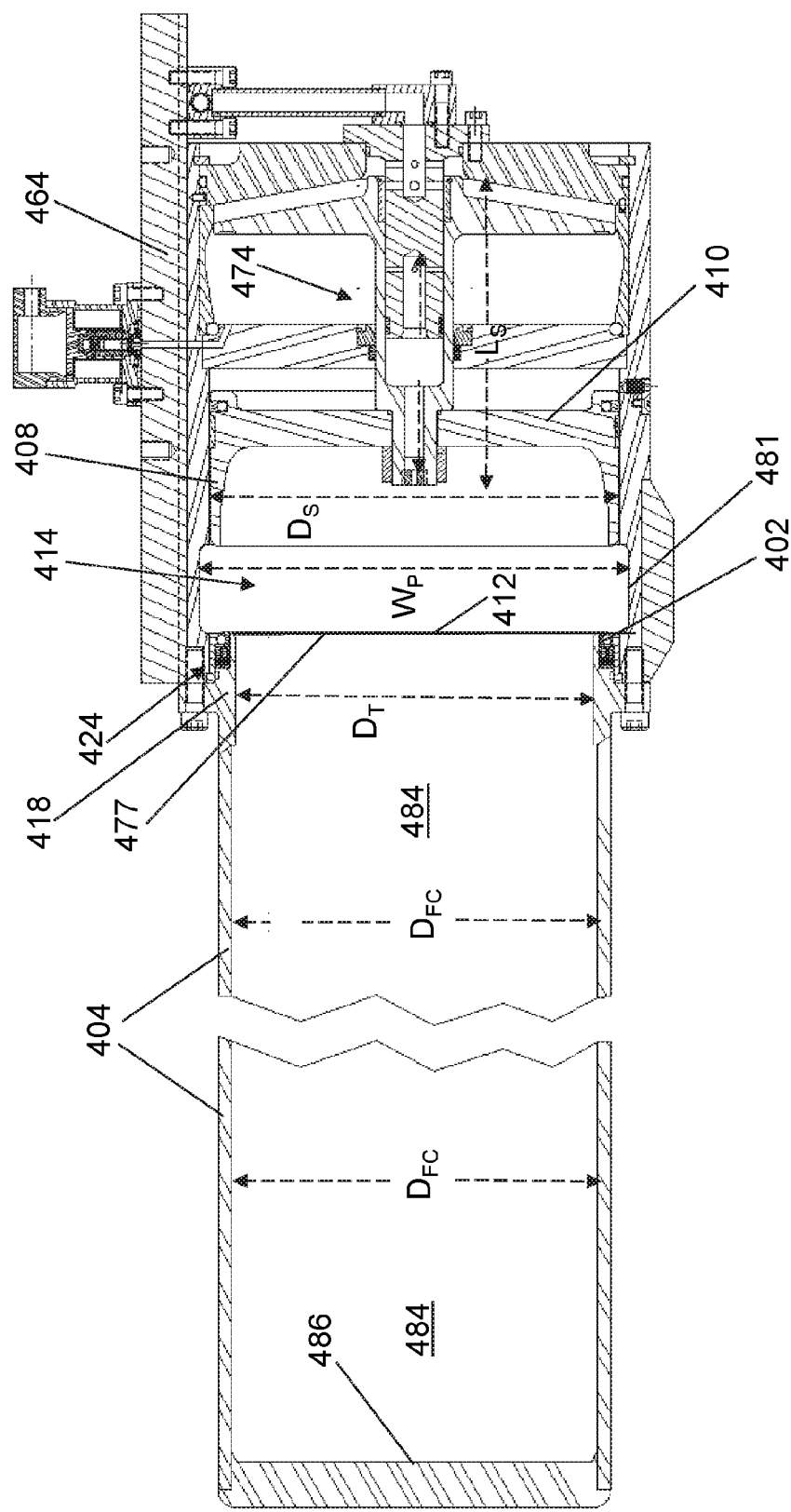
FIG. 24B is an embodiment of an air gun of the present invention with the shuttle valve assembly in the open fired position.

Other features in embodiments of the air gun 400 of the present invention are an internal bore 484 of the firing chamber 404 that has a uniform diameter DFC and is flush or nearly so all the way to the port end 477 that in embodiments of the air gun 400 is adjacent to and seals the firing piston 410 to the firing seal 402 at the inner edge 412 of the discharge ports 414. By having the firing piston 410 seal at the discharge ports 414, the air gun 400 of the present invention also provides zero acceleration distance and therefore a wider coupling of the surface area of the compressed air from the firing chamber to water when fired. The throat 485 has little or no restrictions or projections from the cylindrical housing 416 or from the firing seal retainer assembly 424, so that when the air gun 400 is fired the compressed air from within the bore 484 of the firing chamber 404 flows through the discharge ports 414 without being redirected thereby reducing any turbulence or hissing that may produce undesirable high frequencies. In an embodiment of the air gun 400 of the present invention shown in a closed position in FIG. 24A and in an open position in FIG. 24B, the diameter DFC of the internal bore 484 of the firing chamber 404 is less than 1.1 times the diameter DT at the throat 485 providing a substantially consistent diameter at the widest portion of the firing chamber 404 and at the firing seal retainer assembly 424 where the firing piston 410 in a closed position seals against the firing seal 402.

In embodiments of the air gun 400 of the present invention, as shown in FIGS. 25A and 25B, the diameter $D_S$ of the cup shaped piston flange 408 is for example 28.4 cm (11.2 in) while the length $L_R$ of the shuttle assembly shaft 480 between the outside edges of the firing piston bearing 488 and the bearing 492 within the hollow shaft 480 is 18.4 cm (7.3 in) while the total length of the shuttle assembly 474 is 25.7 cm (10.1 in) thus making the shuttle assembly 474 shorter than the diameter $D_S$ of the cup shaped piston flange 408. By having a larger diameter $D_S$ of the firing piston 410 and extending the width $W_P$ of the discharge ports 414 beyond the outer diameter $D_S$ of the firing piston 410, the shuttle assembly shaft 480 may be shorter reducing the overall length and weight of the shuttle assembly 474.

As shown in FIGS. 25A and 25B, embodiments of the air gun 400 of the present invention provide a port exit area that is a linear function of the position of the shuttle assembly 474 over the gas-release cycle. The air gun 400 of the present invention also creates a port exit area at a rate of that is greater than or equal to 50 cm$^2$/ms with an average rising slope that is less than 0.4 bar-m/ms and may more specifically be in a range of 0.05 bar-m/ms to 0.30 bar-m/ms. In embodiments of the air gun of the present invention, the rectangular shaped ports 414 have a width $W_P$ of 29.89 cm (11.77 in) and a length $L_P$ along the non-machined out portions 462 of the cylindrical housing 416 of the milled out channel 415 of the discharge ports 414 of 6.35 cm (2.50 in) which for two such ports 414 will provide a total port exit area of 379.60 cm$^2$ (58.85 in$^2$). If the firing piston 410 fully opens in 3 milliseconds, for example, the port exit area is created at a rate of 379.60 cm$^2$/3 ms (58.85 in$^2$/3 ms) equaling a port exposure rate of 126.53 cm$^2$/ms (19.62 in$^2$/ms); if for example, the ports open in 4 milliseconds the port exit area is created at a rate of 379.60 cm$^2$/4 ms (58.85 in$^2$/4 ms) equaling a port exposure rate of 94.90 cm$^2$/ms (14.71 in$^2$/ms); if the rise time of the primary pressure pulse is tuned to open the ports 414 in 6 milliseconds the port exit area is created at a rate of 379.60 cm$^2$/6 ms (58.85 in$^2$/6 ms), equaling a port exposure rate of 63.27 cm$^2$/ms (9.81 in$^2$/ms). Therefore, the air gun 400 of the present invention provides an increase in port exposure rate and a zero acceleration distance and large coupling of the release of air to water The air gun 400 of the present invention also suppresses the transmission of undesirable high frequencies from the primary pressure pulse.

Figure 26A:
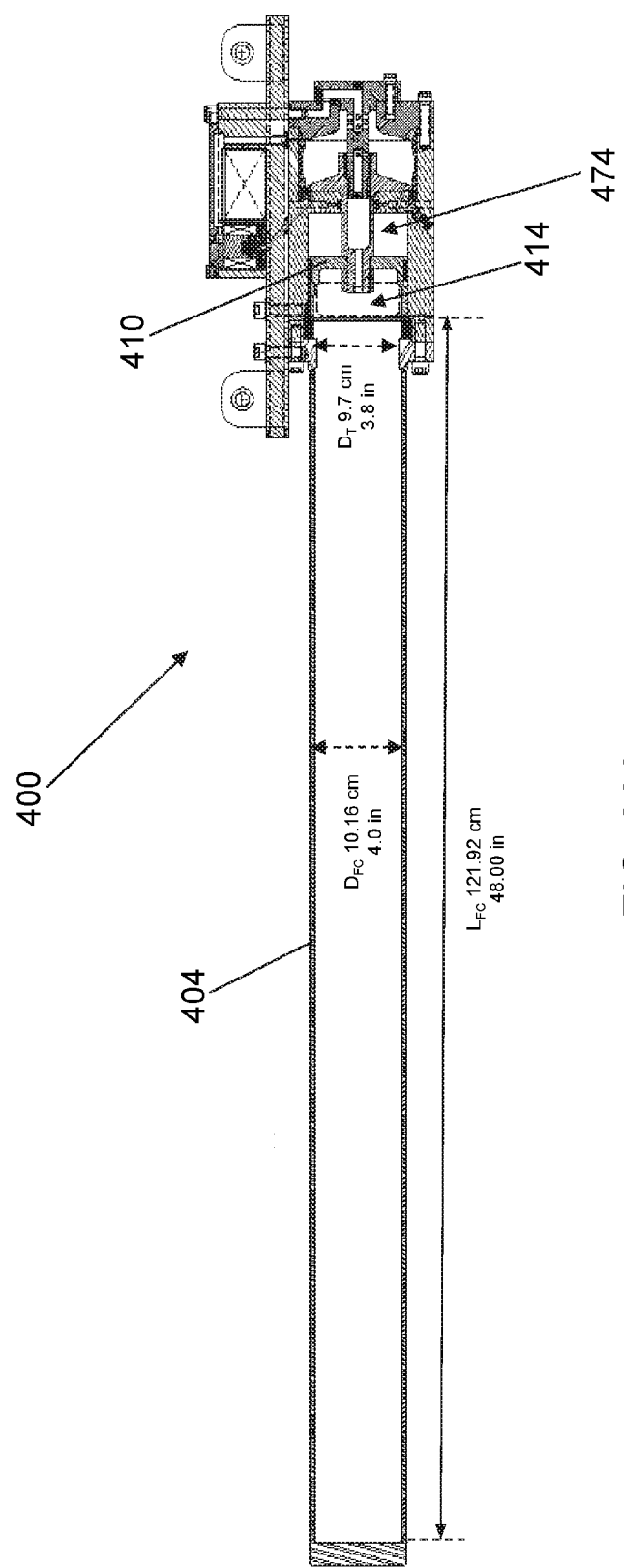
FIG. 26A is a further embodiment of an air gun of the present invention with a firing air chamber having a length of 121.92 cm (48 inches) with the shuttle valve assembly in the closed ready to trigger position.
Figure 26B:
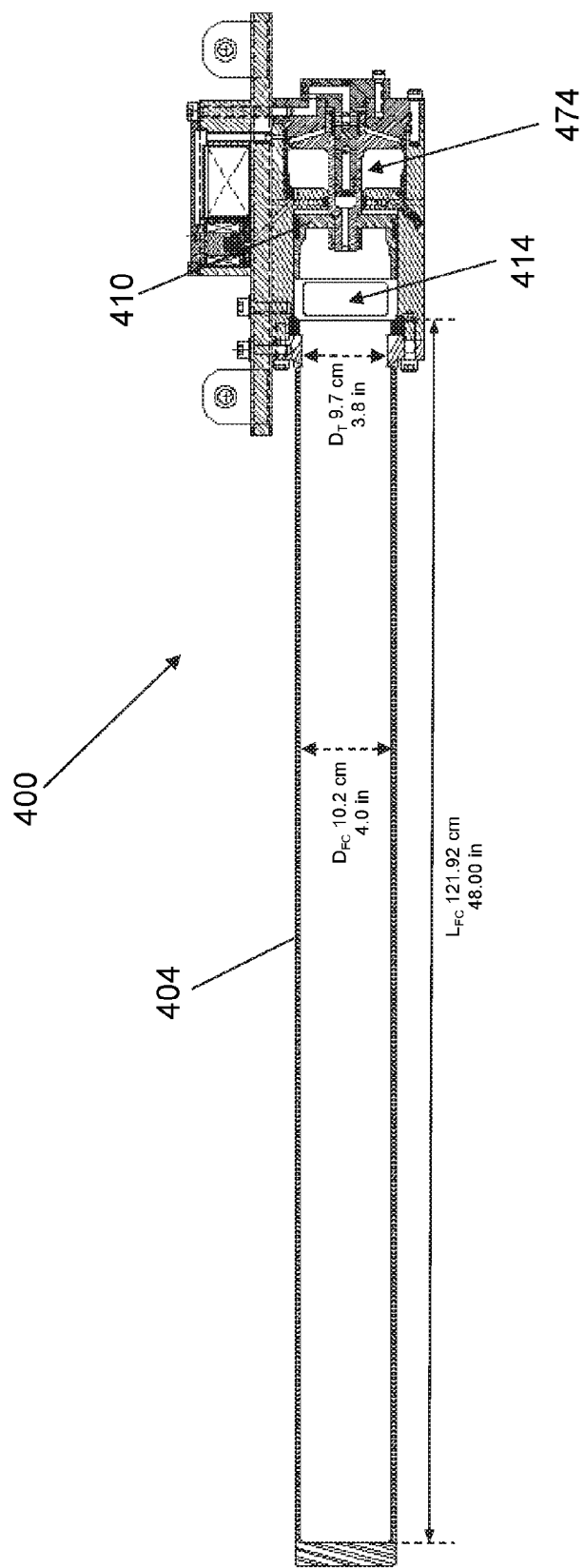
FIG. 26B is a further embodiment of an air gun of the present invention with a firing air chamber having a length of 121.92 cm (48 inches) with the shuttle valve assembly in the open fired position.
Figure 27:
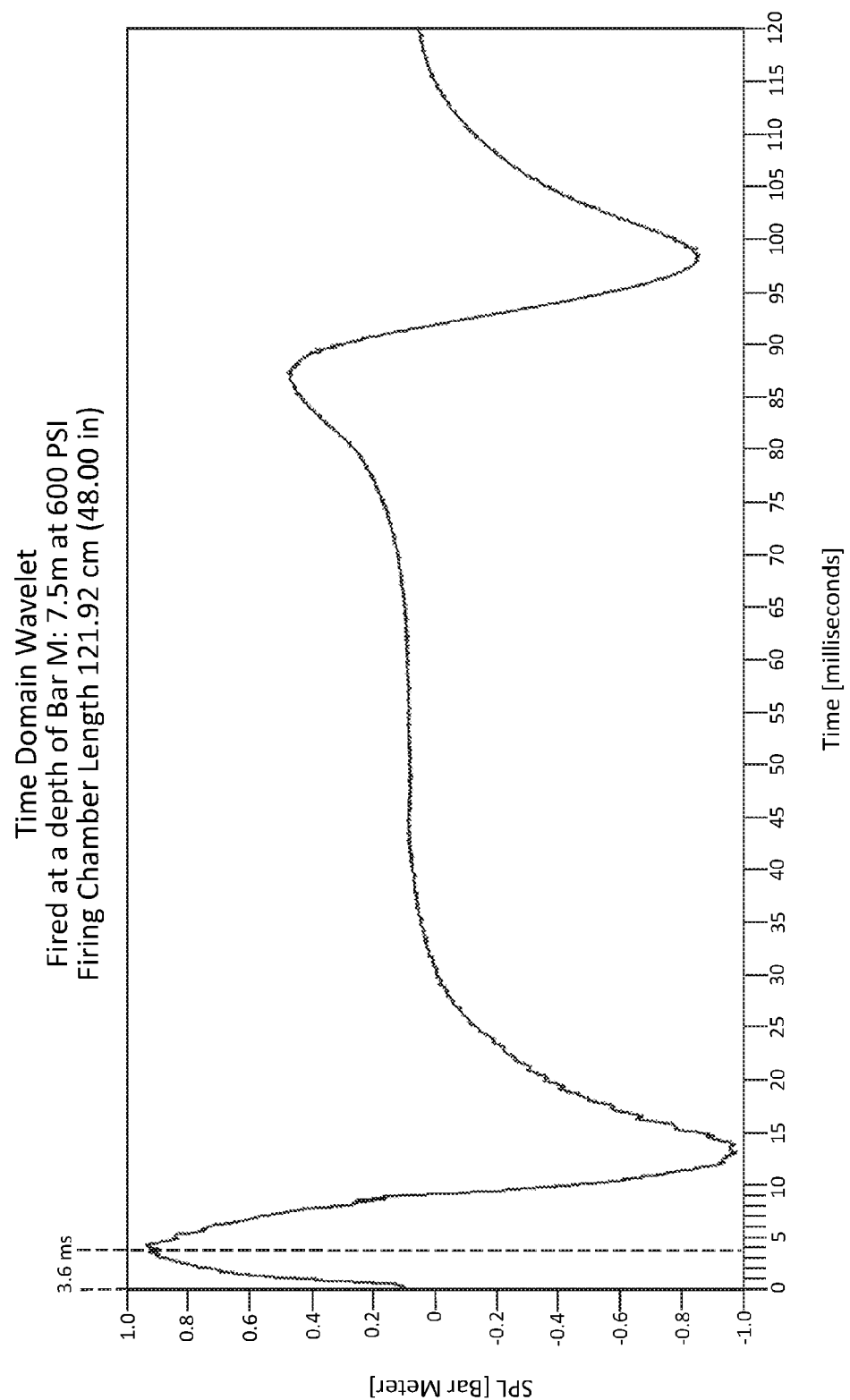
FIG. 27 is a recorded time domain wavelet illustrating the signature of an embodiment of the air gun of the present invention having a firing air chamber having a length of 121.92 cm (48 inches) fired at an operating pressure of 600 psi.
Figure 28:
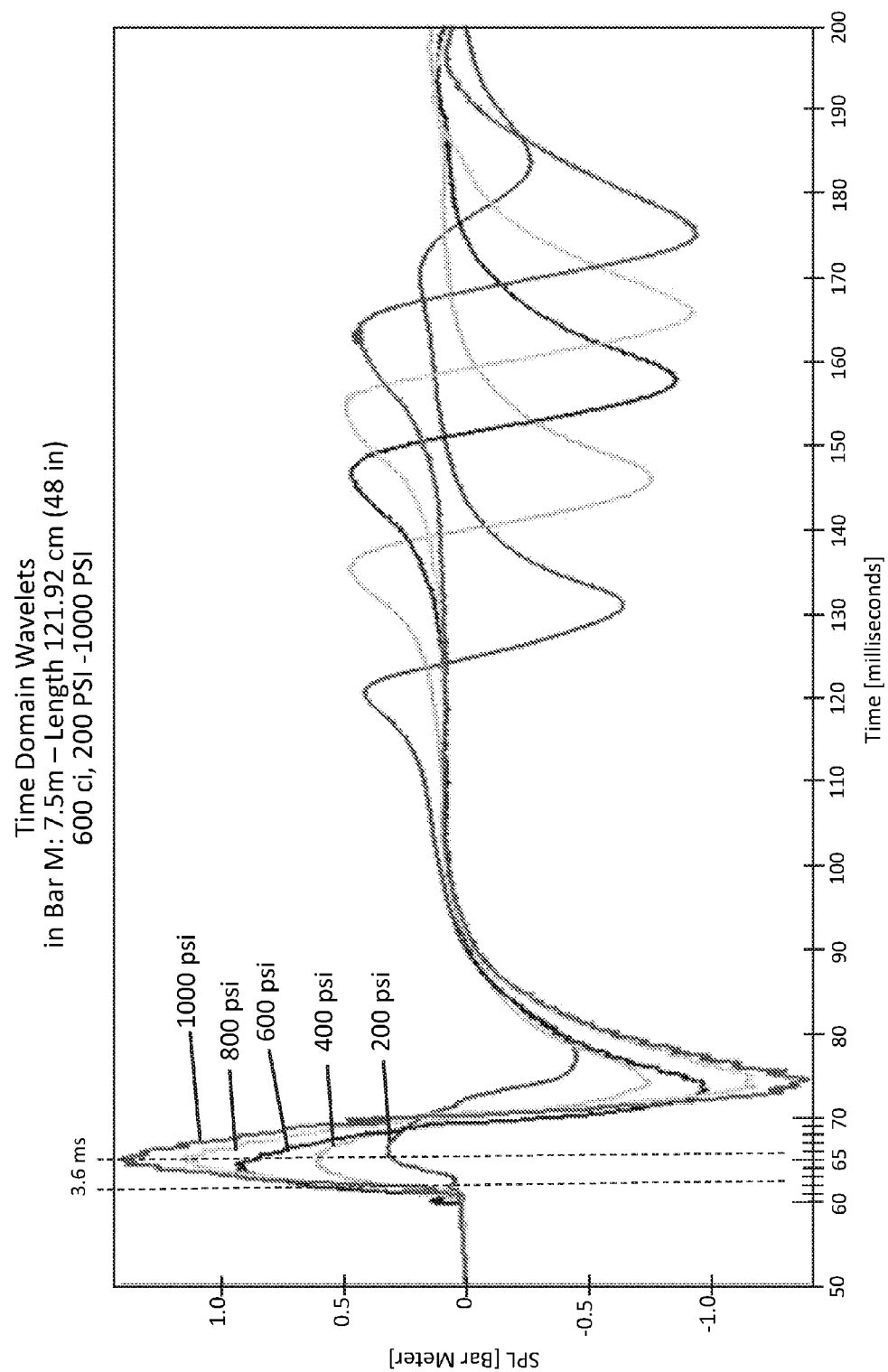
FIG. 28 are recorded time domain wavelets illustrating the signatures of an embodiment of the air gun of the present invention having a firing air chamber having a length of 121.92 cm (48 inches) fired at various operating pressures from 200 psi to 1000 psi.
Figure 29:
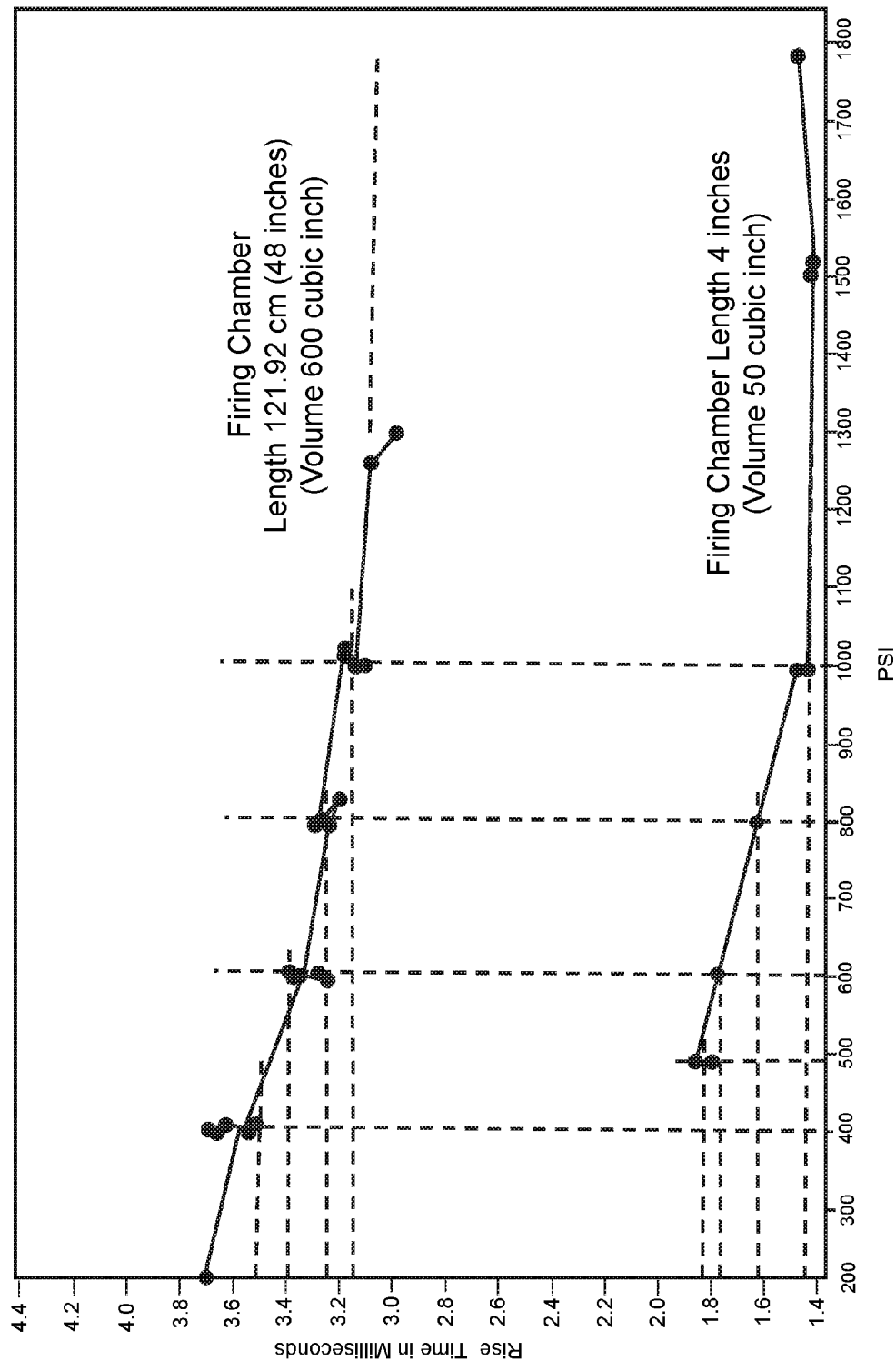
FIG. 29 is a graph illustrating the measured rise time of the initial or primary pressure pulse of an embodiment of the air gun of the present invention having the 121.92 cm (48 inches) firing chamber fired at various operating pressures from 200 psi to 1000 psi and the measured rise time of the initial or primary pressure pulse of an air gun having a conventional firing chamber of a length of 10.16 cm (4 in) fired at various operating pressures from 500 psi to 1800 psi.

In embodiments of the air gun of the present invention, the firing chamber 404 tunes the rise time of the primary pressure pulse because when the air gun is fired air is exiting from the firing chamber 404 at a rate of 0.343 m/ms (1.126 ft/ms). The rise time of the primary pressure pulse is therefore proportional to the length of the firing chamber and the rise time may be increased or decreased by adjusting the length of the firing chamber 404. An embodiment of the air gun 400 as shown in FIGS. 26A and 26B, was test fired beneath a boat at a depth of approximately 7.5 meters (35 feet) at Seneca Lake, N.Y. The length $L_{FC}$ of the firing chamber of the air gun 400 was selected as 121.92 cm (48.00 in) with a diameter of 10.16 cm (4.00 in) therefore the firing chamber volume is 9832.24 cm$^3$ (600 in$^3$). Hydrophones hanging below the air gun 400 picked up the sound pulses from the air gun 400 which were recorded on an electronic digital recorder. As shown in FIG. 27, the rise time of the primary pressure pulse is measured at around 3.6 ms at an operating pressure of 600 psi comparable to the calculated rise time of 3.55 ms using the accepted speed of sound in air of 0.343 m/ms (1.126 ft/ms). The air gun 400 was then fired at operating pressures of 200 psi, 400 psi, 600 psi, 800 psi, 1000 psi. As shown in FIG. 28, when overlaying the primary pressure pulses, the measured rise time remains relatively constant and very close to the calculated rise time of 3.55 ms even when operating the air gun at operating pressures from 200 psi to 1000 psi and should be constant at higher operating pressures as well. Some embodiments of the present invention may be designed to fire at very low pressures of around 200 psi or at very high pressures of 2000 psi or higher, for example. Therefore, the formula of dividing the firing chamber length $L_{FC}$ by the speed of sound in air of 0.343 m/ms (1.126 ft/ms) quite accurately predicts the rise time of the initial or primary pressure pulse of the air gun 400 when firing the firing chamber that is 121.92 cm (48.00 in) in length with a diameter of 10.16 cm (4.00 in). As shown in FIG. 29, the average measured rise time of the observed primary pressure pulse when firing the air gun several times at 200 psi is about 3.7 milliseconds, at 400 psi the rise time is about 3.6 milliseconds, at 600 psi the rise time is about 3.3 milliseconds, and at 800 psi and 1000 psi the rise time is measured at about 3.2 milliseconds.

In further testing, the 121.92 cm (48.00 in) in length firing chamber 404 was replaced with a 10.16 cm (4.00 in) in length with a diameter of 10.16 cm (4.00 in) and therefore a volume of 819.35 cm$^3$ (50 in$^3$) firing chamber similar to the firing chamber 352 shown in FIG. 19 as an example of firing chambers from the prior art. The air gun was also immersed to a depth of 7.5 meters (35 feet) and fired. The sound pulses from the 10.16 cm (4.00 in) in length firing chamber 352 were recorded at pressures of 500 psi, 600 psi, 800 psi, 1000 psi, 1500 psi, and 1800 psi. The rise time of the initial pulse according to the formula for a 10.16 cm (4.00 in) in length firing chamber is 0.102 m (0.33 feet) divided by 0.343 m/ms (1.126 ft/ms) which equals 0.296 ms. The average measured rise time of the 10.16 cm (4.00 in) in length firing chamber 352 when firing the air gun several times at the different operating pressures is also shown in FIG. 29. The rise time of 1.8 milliseconds was measured at 500 psi, a rise time of 1.7 milliseconds was measured at 600 psi, a rise time of 1.6 milliseconds was measured at 800 psi, and a rise time of 1.4 milliseconds was measured at 1500 psi. These results are similar to rise time measurements taken from signatures of conventional air guns of the prior art such as the Bolt Technology 1500 LL that has a firing chamber with a cubic volume of 600 cubic inches, with a diameter of 25.4 cm (10.0 in) and a length of only 15.2 cm (6 in).

As shown in FIG. 29, the results from the shorter 10.16 cm (4.00 in) in length firing chamber 352 show considerably longer rise times than the calculated rise time of 0.296 ms particularly at pressures below 1000 psi. Therefore, the formula did not predict the rise time of the short firing chamber 352 having a length of 10.16 cm (4.00 in), a diameter of 10.16 cm (4.00 in), and a volume of 819.35 cm$^3$ (50 in$^3$). This is likely because when the air gun is fired with such a short firing chamber, the air pressure within the firing chamber drops very quickly with the movement of the firing piston thus the force acting on the mass of the shuttle assembly drops rapidly causing the shuttle to accelerate at a slower rate thus extending the opening time of the firing piston resulting in a longer rise time than the calculated rise time of the initial pulse. To have the rise time tune properly using the formula, the length should be at least two times the diameter of the firing chamber 404 in order to minimize the effect of the mass of the shuttle assembly. It is anticipated that in embodiments of production models of the present invention, the length of the firing chambers may be at least four times the diameter to ensure that the firing chamber pressures do not drop to a level which will adversely affect the timing of the initial pulse.

Figure 30A:
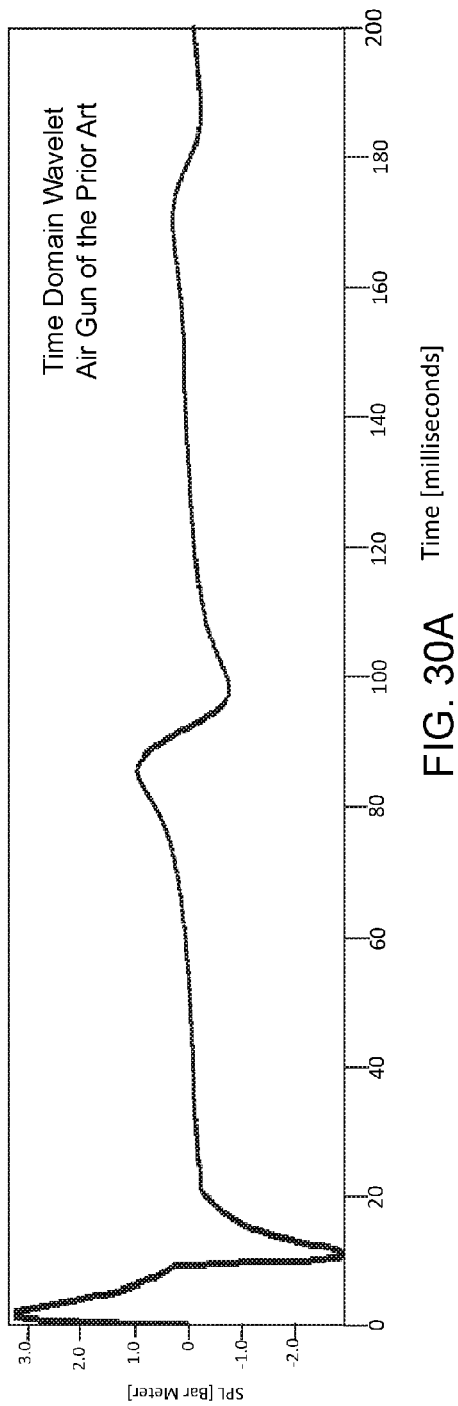
FIG. 30A is a recorded time domain wavelet illustrating the signature of a conventional air gun of the prior art having a firing chamber with a length of 25.4 cm (10 in) and a volume for example 9832.24 cm$^3$ (600 in$^3$) fired at 2000 psi.
Figure 30B:
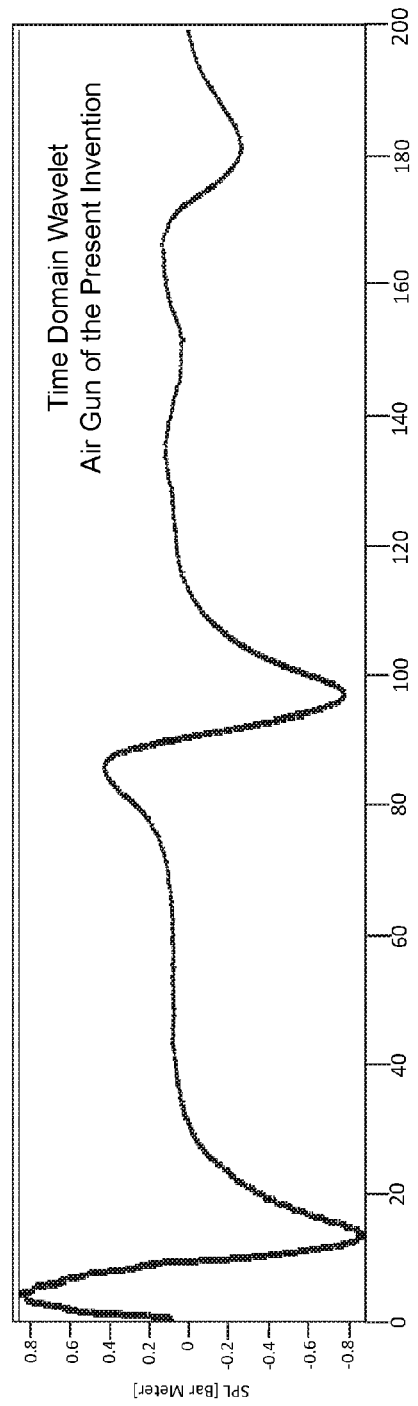
FIG. 30B is a recorded time domain wavelet illustrating the signature of an embodiment of the air gun of the present invention having a firing air chamber with a length of 121.92 cm (48 inches) fired at an operating pressure of 600 psi and a volume 9832.24 cm$^3$ (600 in$^3$)
Figure 31A:
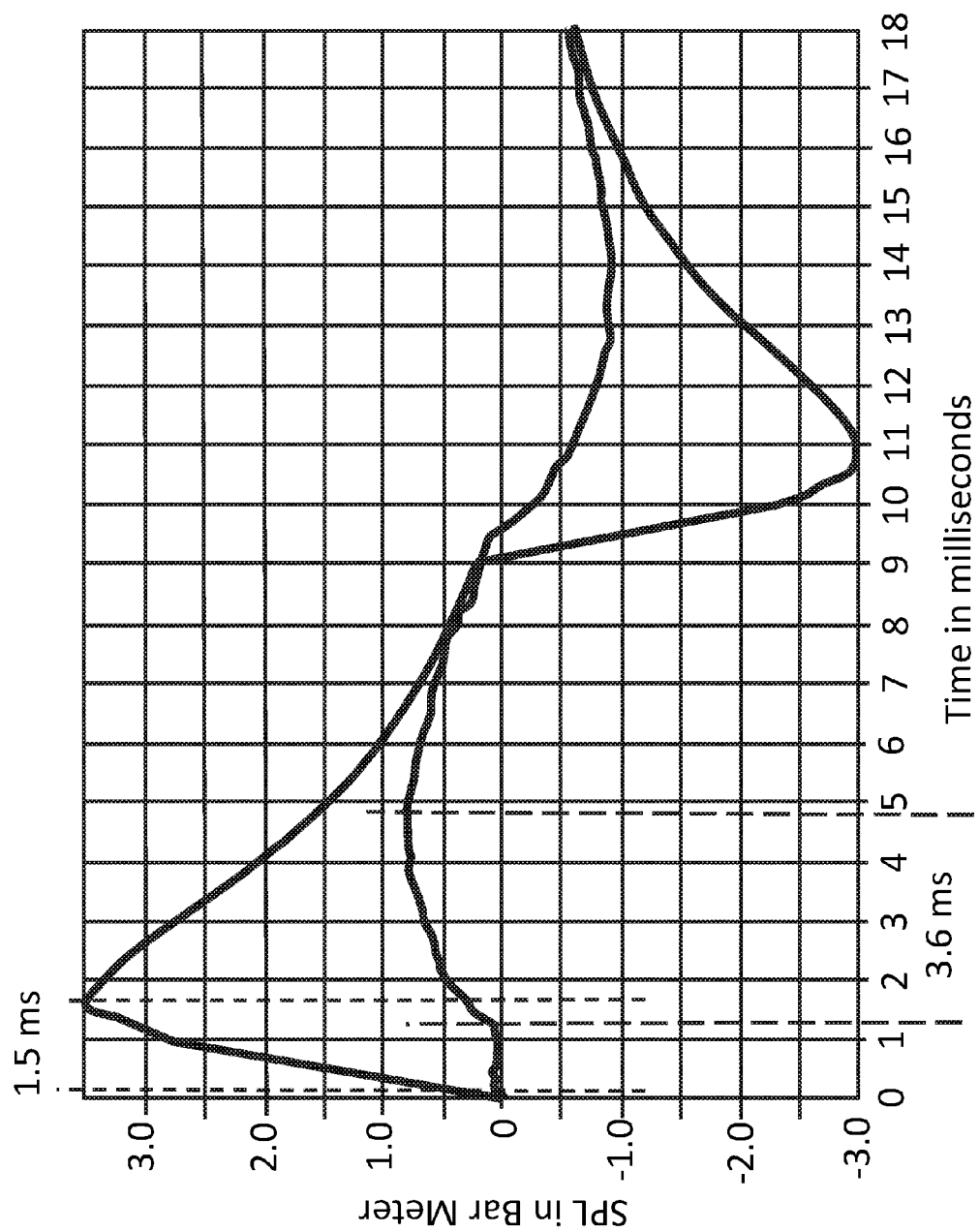
FIGS. 31A and 31B are graphs of the plotted slopes of the initial pulses of a conventional air gun of FIG. 30A and from an embodiment of the air gun of the present invention of FIG. 30B.
Figure 31B:
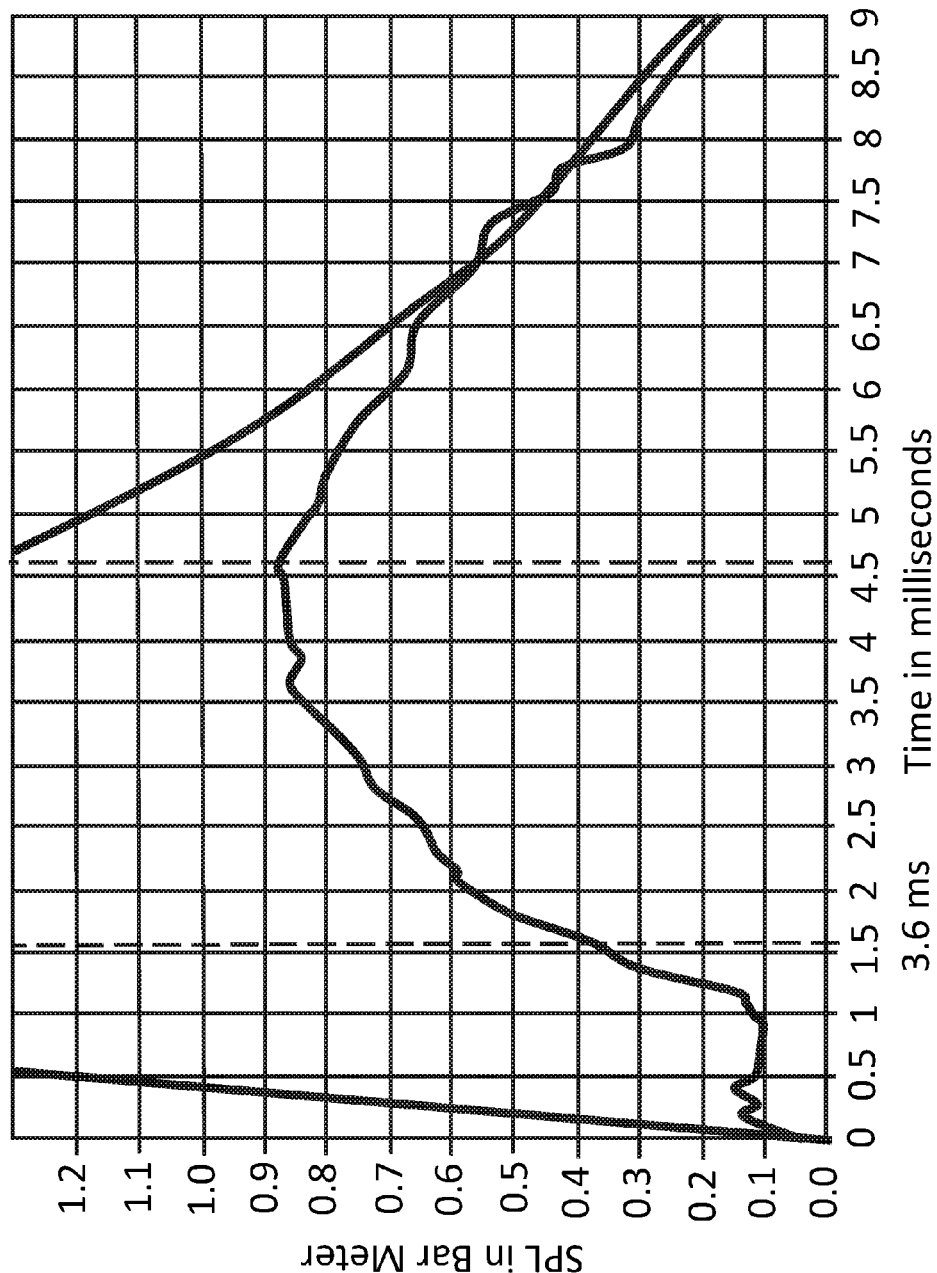

As shown in FIG. 30A, the output pulse of a conventional air gun demonstrates a rise time of the primary pressure pulse that is much quicker and a slope that is much steeper than the primary pressure pulse of the air gun 400 of the present invention. In conventional air guns, the rise time of the primary pressure pulse is typically between 1.5 to 2.0 milliseconds at pressures of around 2000 psi. The very quick rise time of the conventional air gun produces a slope of between 1.5-3.0 bar-m/ms, as shown in FIG. 31A. The slope is the ratio of the peak sound pressure level (SPL) divided by the rise time. The slope provides a measure of environmental impact by indicating the ratio of energy in low frequency to energy in high frequency and provides a measure of geophysical quality. The much steeper slope of conventional air guns may be a source of undesirable high frequencies. As shown in FIG. 31B, the air gun of the present invention has an initial pulse that has a slower rise time and much lower slope that produces a lower sound pressure level (SPL) and produces more low frequencies and less undesirable high frequencies. The slope is calculated as the difference between 90% of the pulse peak and 10% of the pulse peak divided by the rise time. From tests at Seneca Lake. N.Y. using an air gun having a firing chamber of 121.92 cm (48.00 in) in length with a diameter of 10.16 cm (4.00 in), the slope of the primary pressure pulse is measured as 0.28 bar-m/ms, as shown in FIG. 31C.

Figure 32:
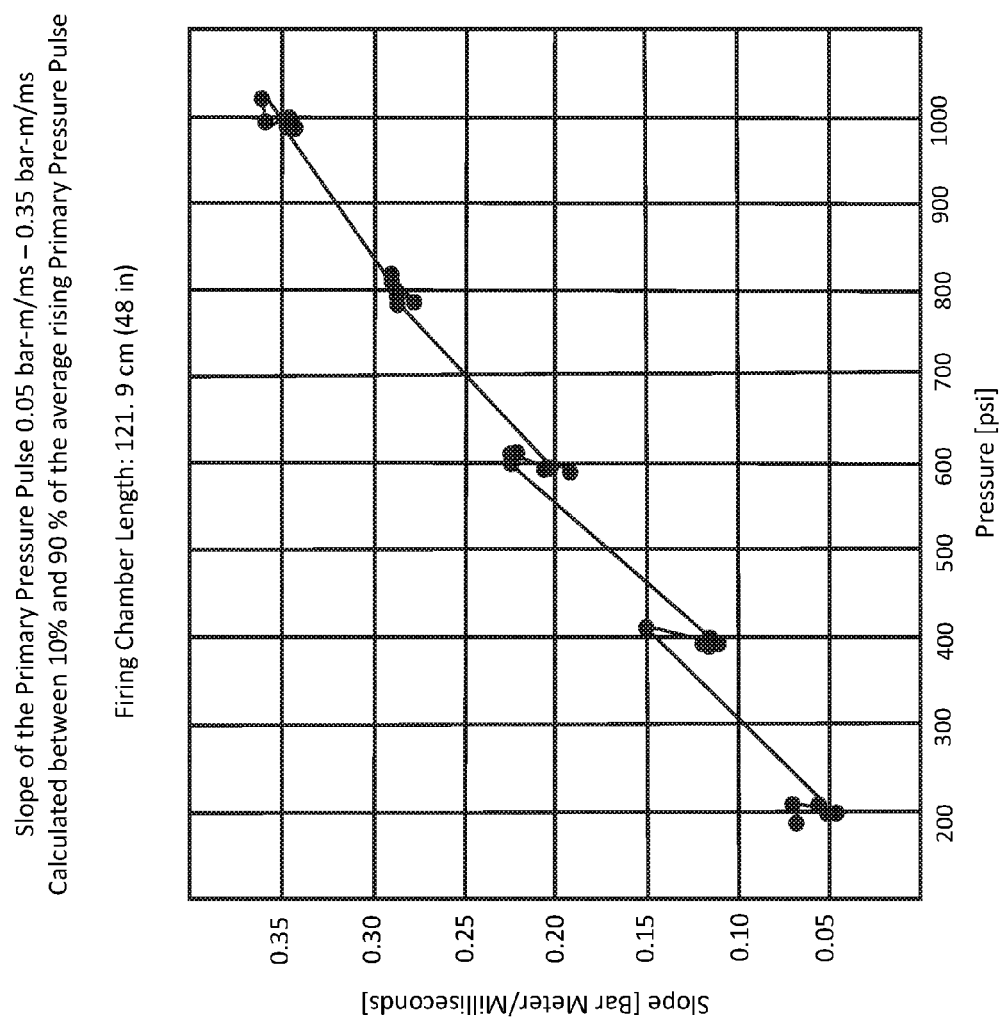
FIG. 32 is a graph of the plotted slopes of the signatures recorded from an embodiment an air gun of the present invention having a firing air chamber with a length of 121.92 cm (48 inches) fired at a depth of 7.5 meters at firing pressures of 200 psi, 400 psi, 600 psi, 800 psi and 1000 psi.

In the graph shown in FIG. 32, the results of which are plotted from the same tests at Seneca Lake, N.Y., the average slope of the initial pulse from multiple shots of the air gun 400 of the present invention fired at a water depth of 7.5 meters and at a firing chamber pressure of 200 psi is about 0.06 bar-m/ms, at a firing chamber pressure of 600 psi the slope is about 0.23 bar-m/ms and at a firing chamber pressure of 1000 psi the slope is 0.37 bar-m/ms. These results have a margin of error of +/−0.01 bar-m/ms. As shown and described herein, the new and novel design of the tubular construction of the firing chamber of the present invention provides for tuning of the rise time which may as desired increase low frequencies and reduce cavitation and high frequencies of the primary pressure pulse. By providing for the selection of the length of the firing chamber in addition to the desired stored energy and operating pressure, a desired rise time and slope are achievable. The air gun of the present invention also provides a greater percentage of low frequencies than conventional air guns of the prior art reducing the disruption and harm to the marine ecosystem.

Although specific embodiments of the invention have been disclosed herein in detail, it is to be understood that this is for purposes of illustration. This disclosure is not to be construed as limiting the scope of the invention, since the described embodiments may be changed in details as will become apparent to those skilled in the art in order to adapt the air guns to particular applications, without departing from the scope of the following claims and equivalents of the claimed elements.

What is claimed is:

1. An air gun, comprising:
   a housing having an operating chamber and discharge ports;
   a firing piston movable within the housing;
   a firing chamber attached to the housing, the firing chamber having a firing chamber seal adjacent an inner edge of the discharge ports providing zero acceleration distance and the firing chamber having a length that is at least two times greater than the diameter of the firing chamber; and the average rising slope of the primary pressure pulse from firing the air gun is less than 0.4 bar-m/ms.

2. The air gun of claim 1 wherein the average rising slope of the primary pressure pulse is in a range of 0.05 bar-m/ms to 0.30 bar-m/ms.

3. The air gun of claim 1 wherein the port exit area is created at a rate greater than or equal to 50 square centimeters per millisecond.

4. The air gun of claim 2 wherein the port exit area is created at a rate greater than or equal to 50 square centimeters per millisecond.

5. The air gun of claim 1 wherein the rise time from zero to peak pressure of the primary pressure pulse is greater than 1.2 milliseconds.

6. The air gun of claim 2 wherein the rise time from zero to peak pressure of the primary pressure pulse is greater than 1.2 milliseconds.

7. The air gun of claim 3 wherein the rise time from zero to peak pressure of the primary pressure pulse is greater than 1.2 milliseconds.

8. The air gun of claim 4 wherein the rise time from zero to peak pressure of the primary pressure pulse is greater than 1.2 milliseconds.

9. The air gun of claim 1 wherein the rise time of the primary pressure pulse is tuned by selecting a specific length of the firing chamber based on a length of approximately 0.343 meters per millisecond (1.126 feet per millisecond) of desired rise time to peak of the primary pressure pulse.

10. The air gun of claim 2 wherein the rise time of the primary pressure pulse is tuned by selecting a specific length of the firing chamber based on a length of approximately 0.343 meters per millisecond (1.126 feet per millisecond) of desired rise time to peak of the primary pressure pulse.

11. The air gun of claim 3 wherein the rise time of the primary pressure pulse is tuned by selecting a specific length of the firing chamber based on a length of approximately 0.343 meters per millisecond (1.126 feet per millisecond) of desired rise time to peak of the primary pressure pulse.

12. The air gun of claim 4 wherein the rise time of the primary pressure pulse is tuned by selecting a specific length of the firing chamber based on a length of approximately 0.343 meters per millisecond (1.126 feet per millisecond) of desired rise time to peak of the primary pressure pulse.

13. The air gun of claim 8 wherein the rise time of the primary pressure pulse is tuned by selecting a specific length of the firing chamber based on a length of approximately 0.343 meters per millisecond (1.126 feet per millisecond) of desired rise time to peak of the primary pressure pulse.

14. The air gun of claim 1 wherein the rise time of the primary pressure pulse is tuned by selecting a specific length of the firing chamber based on a length of approximately 0.343 meters per millisecond (1.126 feet per millisecond) of desired rise time to peak of the primary pressure pulse and the rise time remains constant at operating pressures from 200 psi to 1000 psi.

15. The air gun of claim 1 wherein the length of the firing chamber is measured from the discharge ports to the longest internal length of the firing chamber.

16. The air gun of claim 13 wherein the length of the firing chamber is measured from the discharge ports to the longest internal length of the firing chamber.

17. The air gun of claim 1 comprising a shuttle assembly movable with the firing piston; and wherein a port exit area is a linear function of the position of the shuttle assembly over the gas-release cycle.

18. The air gun of claim 1 wherein the discharge ports have constant width along the length of the discharge ports.

19. The air gun of claim 1 wherein the discharge ports are rectangular in shape when viewed from the side of the air gun.

20. The air gun of claim 1 wherein the discharge ports have a width that is wider than the diameter of the firing piston.

21. The air gun of claim 1 comprising a firing chamber seal that seals on the inside diameter of the firing piston.

22. The air gun of claim 1 comprising an air cushion chamber and a sliding seal on the outside diameter of the firing piston to seal the air cushion chamber.

23. The air gun of claim 1 wherein the diameter of the firing chamber is no more than 1.2 times the throat diameter where the firing chamber attaches to the housing.

24. An air gun for seismic exploration, comprising:
an air gun having a firing chamber; and
wherein the rise time to peak of the initial pulse is tuned by varying the length of the firing chamber and a specific length of the firing chamber is selected based on a length of approximately 0.343 meters per millisecond (1.126 feet per millisecond) of desired rise time to peak of the initial pulse.

25. The air gun for seismic exploration of claim 24 comprising:
discharge ports.

26. The air gun for seismic exploration of claim 24 wherein the rise time remains constant at operating pressures from 200 psi to 1000 psi.

27. The air gun for seismic exploration of claim 25 wherein the length of the firing chamber is measured from the discharge ports to the longest internal length of the firing chamber.

28. The air gun for seismic exploration of claim 24 wherein increasing the internal length of the firing chamber increases the rise time of the initial pulse to reach peak pressure.

29. The air gun for seismic exploration of claim 24 wherein shortening the internal length of the firing chamber decreases the rise time of the initial pulse to reach peak pressure.

30. The air gun for seismic exploration of claim 24 wherein the length of the firing chamber is at least two times the diameter of the firing chamber.

31. The air gun for seismic exploration of claim 25 wherein the firing chamber is of uniform diameter and flush all the way to the discharge ports with little or no restriction.

32. The air gun for seismic exploration of claim 24 comprising a shuttle assembly having a firing piston and the length of the shuttle assembly is shorter than the diameter of the firing piston.

33. The air gun for seismic exploration of claim 32 wherein the firing piston having a cup shaped shuttle piston flange.

34. The air gun for seismic exploration of claim 33 comprising an air cushion chamber and a sliding seal on the outside diameter of the firing piston cup shaped shuttle piston flange to seal the air cushion chamber.

35. The air gun for seismic exploration of claim 34 wherein the sliding seal is placed in a groove along the outside diameter of the firing piston.

36. A method of adjusting the rise time and the frequency content of the initial pulse of an air gun comprising:

tuning the rise time of the initial pulse by selecting a length of the firing chamber to a length approximately 0.343 meters per millisecond (1.126 feet per millisecond) of desired rise time to peak of the initial pulse.

37. The method of adjusting the rise time and the frequency content of an air gun, of claim 36 comprising producing an average rising slope of the initial pulse from firing the air gun that is less than 0.4 bar-m/ms.

38. The method of adjusting the rise time and the frequency content of an air gun, of claim 36 comprising producing an average rising slope of the initial pulse from firing the air gun in a range of 0.05 bar-m/ms to 0.30 bar-m/ms.

39. The method of adjusting the rise time and the frequency content of an air gun, of claim 36 comprising producing a port exit area at a rate greater than or equal to 50 square centimeters per millisecond.

40. The method of adjusting the rise time and the frequency content of an air gun, of claim 36 comprising producing a rise time from zero to peak pressure of the initial pulse that is greater than 1.2 milliseconds.

41. The method of adjusting the rise time and the frequency content of an air gun, of claim 36 comprising producing a port exit area that is a linear function of the position of a shuttle assembly over the gas-release cycle.

42. The method of adjusting the rise time and the frequency content of an air gun, of claim 36 comprising producing an average rising slope of the initial pulse from firing the air gun in a range of 0.05 bar-m/ms to 0.30 bar-m/ms, a port exit area at a rate greater than or equal to 50 square centimeters per millisecond, and a rise time from zero to peak pressure of the initial pulse that is greater than 1.2 milliseconds.

43. The method of adjusting the rise time and the frequency content of an air gun, of claim 36 comprising sealing the firing chamber along an inner edge of the discharge ports providing zero acceleration distance; and
wherein the length of the firing chamber is at least two times the diameter of the firing chamber and the rise time remains constant at operating pressures from 200 psi to 1000 psi.

44. A method of tuning the rise time of the primary pressure pulse of an air gun, comprising:
selecting a length of a firing chamber that is at least two times greater than the diameter of the firing chamber;
sealing the firing chamber along an inner edge of the discharge ports providing zero acceleration distance;
producing an average rising slope of the primary pressure pulse from firing the air gun in a range of 0.05 bar-m/ms to 0.30 bar-m/ms;
producing a port exit area at a rate greater than or equal to 50 square centimeters per millisecond; and
producing a rise time from zero to peak pressure of the primary pressure pulse that is greater than 1.2 milliseconds.

45. The method of tuning the rise time of the primary pressure pulse of an air gun, of claim 44 comprising selecting the length of the firing chamber to a length approximately 0.343 meters per millisecond (1.126 feet per millisecond) of desired rise time to peak of the primary pressure pulse.

46. The air gun of claim 24 comprising a firing chamber seal adjacent an inner edge of the discharge ports providing zero acceleration distance.

* * * * *